(12) United States Patent
Szatmary et al.

(10) Patent No.: US 9,412,064 B2
(45) Date of Patent: Aug. 9, 2016

(54) EVENT-BASED COMMUNICATION IN SPIKING NEURON NETWORKS COMMUNICATING A NEURAL ACTIVITY PAYLOAD WITH AN EFFICACY UPDATE

(71) Applicant: QUALCOMM TECHNOLOGIES INC., San Diego, CA (US)

(72) Inventors: Botond Szatmary, San Diego, CA (US); Micah Richert, San Diego, CA (US); Oleg Sinyavskiy, San Diego, CA (US); Eugene Izhikevich, San Diego, CA (US)

(73) Assignee: QUALCOMM TECHNOLOGIES INC., San Diego, CA (US)

( * ) Notice: Subject to any disclaimer, the term of this patent is extended or adjusted under 35 U.S.C. 154(b) by 358 days.

(21) Appl. No.: 13/868,944

(22) Filed: Apr. 23, 2013

(65) Prior Publication Data

US 2014/0317035 A1 Oct. 23, 2014

(51) Int. Cl.
*G06F 15/18* (2006.01)
*G06N 3/04* (2006.01)

(52) U.S. Cl.
CPC ........................................ *G06N 3/049* (2013.01)

(58) Field of Classification Search
CPC .................................................. G06N 3/049
USPC ...................................................... 706/12, 45
See application file for complete search history.

(56) References Cited

U.S. PATENT DOCUMENTS

| | | | |
|---|---|---|---|
| 5,063,603 A | 11/1991 | Burt | |
| 5,355,435 A | 10/1994 | DeYong | |
| 5,638,359 A | 6/1997 | Peltola | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |
| 6,458,157 B1 | 10/2002 | Suaning | |
| 6,545,705 B1 | 4/2003 | Sigel | |
| 6,545,708 B1 | 4/2003 | Tamayama | |
| 6,546,291 B2 | 4/2003 | Merfeld | |

(Continued)

FOREIGN PATENT DOCUMENTS

| | | |
|---|---|---|
| CN | 102226740 A | 10/2011 |
| JP | 4087423 | 3/1992 |

(Continued)

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages,cwi,n11-sbolltedmblica6ond)hdthesislxif>.

(Continued)

*Primary Examiner* — David Vincent
(74) *Attorney, Agent, or Firm* — Seyfarth Shaw LLP

(57) ABSTRACT

Apparatus and methods for event based communication in a spiking neuron network. The network may comprise units communicating by spikes via synapses. The spikes may communicate a payload data. The data may comprise one or more bits. The payload may be stored in a buffer of a pre-synaptic unit and be configured to accessed by the post-synaptic unit. Spikes of different payload may cause different actions by the recipient unit. Sensory input spikes may cause postsynaptic response and trigger connection efficacy update. Teaching input spikes trigger the efficacy update without causing the post-synaptic response.

11 Claims, 31 Drawing Sheets

(56) References Cited

U.S. PATENT DOCUMENTS

| | | | |
|---|---|---|---|
| 6,581,046 | B1 | 6/2003 | Ahissar |
| 7,536,374 | B2 | 5/2009 | Au |
| 7,849,030 | B2 | 12/2010 | Ellingsworth |
| 8,015,130 | B2 | 9/2011 | Matsugu |
| 8,103,602 | B2 | 1/2012 | Izhikevich |
| 8,315,305 | B2 | 11/2012 | Petre |
| 8,447,714 | B2 * | 5/2013 | Breitwisch et al. ............ 706/33 |
| 8,467,623 | B2 | 6/2013 | Izhikevich |
| 8,655,813 | B2 * | 2/2014 | Ananthanarayanan et al. 706/25 |
| 2002/0038294 | A1 | 3/2002 | Matsugu |
| 2003/0050903 | A1 | 3/2003 | Li Aw |
| 2004/0193670 | A1 | 9/2004 | Langan |
| 2005/0015351 | A1 | 1/2005 | Nugent |
| 2005/0036649 | A1 | 2/2005 | Yokono |
| 2005/0283450 | A1 | 12/2005 | Matsugu |
| 2006/0161218 | A1 | 7/2006 | Danilov |
| 2006/0224533 | A1 | 10/2006 | Thaler |
| 2007/0176643 | A1 | 8/2007 | Nugent |
| 2007/0208678 | A1 | 9/2007 | Matsugu |
| 2009/0043722 | A1 | 2/2009 | Nugent |
| 2009/0287624 | A1 | 11/2009 | Rouat |
| 2010/0086171 | A1 | 4/2010 | Lapstun |
| 2010/0166320 | A1 | 7/2010 | Paquier |
| 2011/0016071 | A1 | 1/2011 | Guillen |
| 2011/0106741 | A1 | 5/2011 | Denneau |
| 2011/0119214 | A1 | 5/2011 | Breitwisch |
| 2011/0119215 | A1 | 5/2011 | Elmegreen |
| 2011/0137843 | A1 * | 6/2011 | Poon et al. ............... 706/33 |
| 2011/0160741 | A1 | 6/2011 | Asano |
| 2012/0011090 | A1 | 1/2012 | Tang |
| 2012/0109866 | A1 | 5/2012 | Modha |
| 2012/0303091 | A1 | 11/2012 | Izhikevich |
| 2012/0308076 | A1 | 12/2012 | Piekniewski |
| 2012/0308136 | A1 | 12/2012 | Izhikevich |
| 2013/0073484 | A1 | 3/2013 | Izhikevich |
| 2013/0073491 | A1 | 3/2013 | Izhikevich |
| 2013/0073492 | A1 * | 3/2013 | Izhikevich et al. ............ 706/23 |
| 2013/0073495 | A1 * | 3/2013 | Izhikevich et al. ............ 706/25 |
| 2013/0073496 | A1 | 3/2013 | Szatmary |
| 2013/0073497 | A1 * | 3/2013 | Akopyan et al. ............ 706/27 |
| 2013/0073498 | A1 * | 3/2013 | Izhikevich et al. ............ 706/27 |
| 2013/0073499 | A1 | 3/2013 | Izhikevich |
| 2013/0073500 | A1 | 3/2013 | Szatmary |
| 2013/0151450 | A1 | 6/2013 | Ponulak |
| 2013/0218821 | A1 | 8/2013 | Szatmary |
| 2013/0251278 | A1 | 9/2013 | Izhikevich |
| 2013/0297539 | A1 | 11/2013 | Piekniewski |
| 2013/0297541 | A1 | 11/2013 | Piekniewski |
| 2013/0297542 | A1 | 11/2013 | Piekniewski |
| 2013/0325768 | A1 | 12/2013 | Sinyavskiy |
| 2013/0325773 | A1 | 12/2013 | Sinyavskiy |
| 2013/0325774 | A1 | 12/2013 | Sinyavskiy |
| 2013/0325775 | A1 | 12/2013 | Sinyavskiy |
| 2013/0325777 | A1 | 12/2013 | Petre |
| 2014/0012788 | A1 * | 1/2014 | Piekniewski ............... 706/16 |
| 2014/0032458 | A1 | 1/2014 | Sinyavskiy |
| 2014/0032459 | A1 | 1/2014 | Sinyavskiy |

FOREIGN PATENT DOCUMENTS

| | | |
|---|---|---|
| RU | 2108612 C1 | 10/1998 |
| RU | 240610502 C2 | 12/2010 |
| RU | 242456102 C2 | 7/2011 |
| WO | 2008083335 A2 | 7/2008 |
| WO | 2008132066 A1 | 11/2008 |

OTHER PUBLICATIONS

Brette et al., Brian: a simple and flexible simulator for spiking neural networks, The Neuromorphic Engineer, Jul. 1, 2009, pp. 1-4, doi: 10.2417/1200906.1659.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10. vol. 2, Article 11.

Djurfeldt, Mikael, The Connection-set Algebra a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Floreano et al.. 'Neuroevolution: from architectures to learning' Evol. Intel. Jan 2008 1:47-62, [retrieved Dec. 30, 2013] [retrieved online from URL: <http://inforscience.epfl.ch.record/112676/files/FloreanoDuerrMattiussi2008.p df>.

Gewaltig et al., 'NEST (Neural Simulation Tool)', Scholarpedia, 2007, pp. 1-15, 2(4): 1430, doi: 1 0.4249/scholarpedia.1430.

Gleeson at al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinforrnatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, 'Polychronization: Computation with Spikes', Neural Computation, 84 25, 2006, 18, 245-282.

Izhikevich, 'Simple Model of Spiking Neurons', IEEE Transactions on Neural Networks, vol. 14, No. 6, Nov. 2003, pp. 1569-1572.

Izhikevich et al., 'Relating STDP to BCM', Neural Computation (2003) 15, 86 1511-1523.

Karbowski et al., 'Multispikes and Synchronization in a Large Neural Network with Temporal Delays', Neural Computation 12, 1573-1606 (2000).

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee-uta.edu/eeweb/IP/Courses/SPR/Reference/Khotanzad.pdf>.

Laurent, 'The Neural Network Query Language (NNOL) Reference' [retrieved on Nov. 12, 2013]. Retrieved from the Internet: <URL'https://code.google.com/p/nnql/issues/detail?id=1>.

Laurent, 'Issue 1—nnql—Refactor Nucleus into its own file—Neural Network Query Language' [retrieved on Nov. 11, 2013]. Retrieved from the Internet: URL:https://code.google.com/p/nnql/issues/detail?id=1.

Nichols, A Re configurable Computing Architecture for Implementing Artificial Neural Networks on FPGA, Master's Thesis, The University of Guelph, 2003, pp. 1-235.

Pavlidis et al. Spiking neural network training using evolutionary algorithms. In: Proceedings 2005 IEEE International Joint Conference on Neural Networkds, 2005. LICNN'05, vol. 4, pp. 2190-2194 Publication Date Jul. 31, 2005 [online] [Retrieved on Dec. 10, 2013] Retrieved from the Internet <URL:http://citeseerx.ist.psu.edu/viewdoc/download?doi=10.1.1.5.4346&rep=rep1&type=pdf.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10. 2013]. Retrieved from the Internet <URL: http://www.kip.uni-heidelberg.de/veroeffentlichungen/download.egi/4620/ps/1774.pdf>.

(56) References Cited

OTHER PUBLICATIONS

Simulink.RTM. model [online], [Retrieved on Dec. 10, 2013] Retrieved from < URL: http://www.mathworks.com/ products/simulink/index.html>.
Sinyavskiy at al. 'Reinforcement learning of a spiking neural network in the task of control of an agent in a virtual discrete environment' Rus. J. Nonlin. Dyn., 2011, vol. 7, No. 4 (Mobile Robots), pp. 869-875, chapters 1-8 (Russian Article with English Abstract).
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.
PCT International Search Report for PCT/US2013/052127 dated Dec. 26, 2013.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Gluck, Stimulus Generalization and Representation in Adaptive Network Models of Category Learning [online], 1991 [retrieved on Aug. 24, 2013]. Retrieved from the Internet:<URL:http://www.google.com/url?sa=t&rct=j&q=Gluck+%22STIMULUS+GENERALIZATION+AND+REPRESENTATION+IN+ADAPTIVE+NETWORK+MODELS+OF+CATEGORY+LEARNING%22.
Fidjeland et al. 'Accelerated Simulation of Spiking Neural Networks Using CPUs' WCCI 2010 IEEE World Congress on Computational Intelligence, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.
PCT International Search Report and Written Opinion for Int'l application No. PCT/US2012/055933, dated Dec. 4, 2012.
PCT International Search Report for PCT/US2013/055381 dated Nov. 14, 2013.
PCT International Search Report for PCT/US2013/032546 dated Jul. 11, 2013.
Graham "The Surf Hippo User Manual Version 3.0 B". Unite de Neurosiences Integratives et Computationnelles Institut Federatif de Neurobiologie Alfred Fessard, Cnrs. France. Mar. 2002. [retrieved Jan. 16, 2014]. [retrieved biomedical univ-paris5.fr].
Sinyavskiy O. Yu.: 'Obuchenic s podkrepleniem spalkovoy neiroiniy set: v zadache upravleniya agentom v diskretnoy virtualnoy srede.' Nelineinaya Dinamika vol. T. 7., No. 24, 2011, pp. 859-875.
Aleksandrov (1968), Stochastic optimization, Engineering Cybernetics, 5, 1116.
Baras et al., (2007), Reinforcement learning, spike-time-dependent plasticity, and the BCM rule, Neural Comput 19, 22452279.
Bartlett et al., (2000), A biologically plausible and locally optimal learning algorithm for spiking neurons, Retrieved from http://arp.anu.edu.au/ftp/papers/jon/brains.pdf.gz.
Baxter et al., (2000), Direct gradient-based reinforcement learning, In Proceedings of the International Symposium on Circuits and Systems, (pp. III-271-274).
Bohte et al., (2000), SpikeProp: backpropagation for networks of spiking neurons, In Proceedings of ESANN'2000, (pp. 419-424).
Bohte (2005), A computational theory of spike-timing dependent plasticity: achieving robust neural responses via conditional entropy minimization, SEN-E0505.
Booij (2005), A Gradient Descent Rule for Spiking Neurons Emitting Multiple Spikes, Information Processing Letters n. 6, v.95, 552558.
El-Laithy (2011), A reinforcement learning framework for spiking networks with dynamic synapses, Comput Intell Neurosci.
Fletcher (1987), Practical methods of optimization, New York, NY: Wiley-Interscience.
Florian (2005), A reinforcement learning algorithm for spiking neural networks SYNASC '05 Proceedings of the Seventh International Symposium on Symbolic and Numeric Algorithms for Scientific Computing.

Fu (2008), What You Should Know About Simulation and Derivatives Naval Research Logistics, vol. 55, No. 8 , 723-736.
Gerstner (2002), Spiking neuron models: single neurons, populations, plasticity, Cambridge, U.K.: Cambridge University Press.
Fu et al, (1995), "Likelihood ratio gradient estimation for regenerative stochastic recursion", Advances in Applied Probability, 27, 4, 1019-1053.
Glynn (1995), Likelihood ratio gradient estimation for regenerative stochastic recursions, Advances in Applied Probability, 27, 4, 10191053.
Izhikevich (2007), Solving the distal reward problem through linkage of STDP and dopamine signaling, Cerebral Cortex, vol. 17, pp. 244352.
Kiefer (1952), Stochastic Estimation of the Maximum of a Regression Function, Annals of Mathematical Statistics 23, #3, 462466.
Pfister (2003), Optimal Hebbian Learning: A Probabilistic Point of View, In ICANN Proceedings. Springer.
Larochelle et al., (2009), Exploring Strategies for Training Deep Neural Networks, J. of Machine Learning Research, v. 10, pp. 1-40.
Klampfl (2009), Spiking neurons can learn to solve information bottleneck problems and extract independent components, Neural Computation, 21(4), pp. 911-959.
Pfister (2006), Optimal Spike-Timing Dependent Plasticity for Precise Action Potential Firing in Supervised Learning, Neural computation ISSN 0899-7667, 18(6).
Reiman et al. (1989). Sensitivity analysis for simulations via likelihood ratios. Oper Res 37, 830844.
Robbins (1951), A Stochastic Approximation Method, Annals of Mathematical Statistics 22, #3, 400407.
Kleijnen et al., "Optimization and sensitivity analysis of computer simulation models by the score function method", Invited Review European Journal of Operational Research, Mar. 1995.
Rumelhart et al., (1986), Learning representations by back-propagating errors, Nature 323 (6088) , pp. 533536.
Rumelhart (1986), Learning internal representations by error propagation, Parallel distributed processing, vol. 1 (pp. 318362), Cambridge, MA: MIT Press.
Sinyavskiy, et al. (2010), "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007). Optimality Model of Unsupervised Spike-Timing Dependent Plasticity: Synaptic Memory and Weight Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 52395244).
Weber et al., (2009), Goal-Directed Feature Learning, In: Proc, International 139 Joint Conference on Neural Networks, 3319 3326.
Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.
Williams (1992), Simple Statistical Gradient-Following Algorithms for Connectionist Reinforcement Learning, Machine Learning 8, 229256.
Yi (2009), Stochastic search using the natural gradient, ICML '09 Proceedings of the 26th Annual International Conference on Machine Learning. New York, NY, USA.
Rosenstein et al., (2002), Supervised learning combined with an actor-critic architecture, Technical Report 02-41, Department of Computer Science, University of Massachusetts, Amherst.
Amari (1998), Why natural gradient?, Acoustics, Speech and Signal Processing, (pp. 1213-1216). Seattle, WA, USA.

(56) References Cited

OTHER PUBLICATIONS

Gluck, "Stimulus Generalization and Representation in Adaptive Network Models of Category Learning" Psychological Science, vol. 2, No. 1, Jan. 1991, pp. 50-55.

Fyfe et al., (2007), Reinforcement Learning Reward Functions for Unsupervised Learning, ISNN '07 Proceedings of the 4th international symposium on Neural Networks: Advances in Neural Networks.

Gluck, Stimulus Generalization and Representation in Adaptive Network Models of Category Learning [online], 1991 [retrieved on Aug. 24, 2013]. Retrieved from the Internet:<URL:http://www.google.com/url?sa=t&rct=j&q=Gluck+%22STIMULUS+GENERALIZATION+AND+REPRESENTATION+I N+ADAPTIVE+N ETWORK+MODELS+OF+CATEGORY+LEARN I NG%22+ 1991.

* cited by examiner

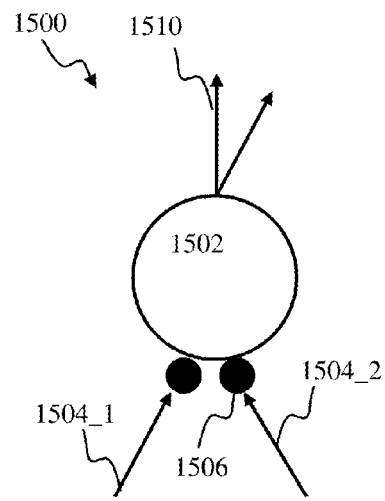
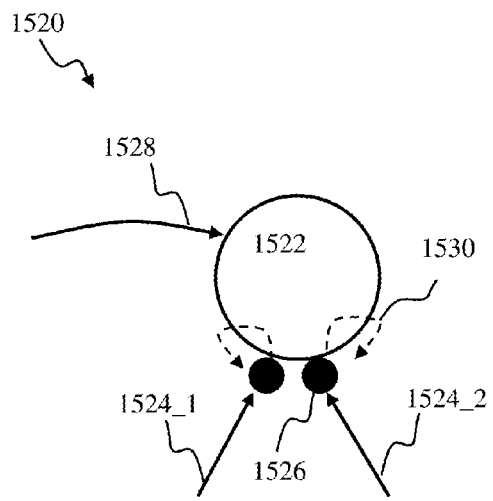
FIG. 15A  FIG. 15B
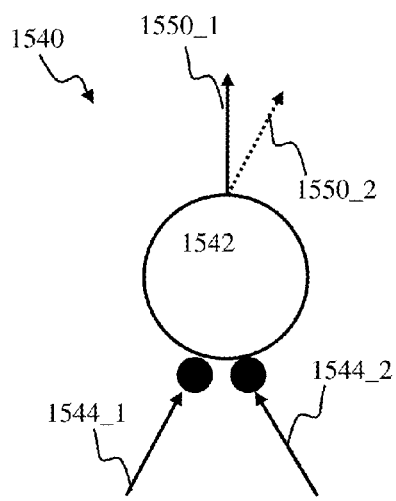
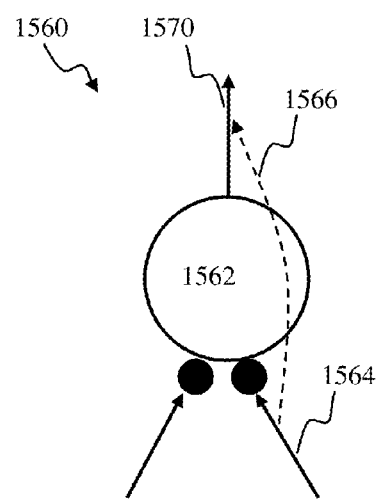
FIG. 15C  FIG. 15D

```
1  //    Pre Unit
2  //    --------
3        The unit triggers an event at every _PERIOD_ time.
4        This unit event triggers/queues the PRESYNAPTIC_EVENT_RULE
5            for the unit's outgoing synapses.
6  */
7  DEFINE UNIT Rate_Unit
8  {
9      INIT
10     {
11         float input = 0;
12         float rate = 0;
13     }
14     UPDATE_RULE
15     {
16         // assume update_rate() is defined somewhere externally
17         rate = update_rate(rate, input);
18     }
19     EVENT_RULE
20     {
21         EXEC_CONDITION
22         {
23             // Generate an event, i.e. a spike, at every _PERIOD_
24             Sys.Now % _PERIOD_ == 0
25         }
26     }
27 }
28
29 /*
30     Rate Synapse
31     ------------
32     The Presynaptic_Rule defines spike delivery,
33         i.e., how to update the input of the post-unit
34     The Update_Rule defines the potential plasticity mechanism
35 */
36 DEFINE RULE Rate_Synapse_Presynaptic_Rule
37 {
38     CODE
39     {
40         // Spike delivery is updating post-unit variables.
41         // Is triggered when pre-unit spikes. This can access
42         // pre-unit, synapse, and post-unit variables:
43         // post.var = some_function(pre.var, syn.var, post.var)
44         // E.g.:
45         post.input += w * pre.rate;
46
47         // Some plasticity mechanism triggered when pre-unit
    spikes ...
48     }
49 }
50 DEFINE SYNAPSE Rate_Synapse
51 {
```

FIG. 20A

```
52      INIT
53      {
54          float w = 1;
55      }
56      DELAY { 1 }
57      PRESYNAPTIC_EVENT_RULE { Rate_Synapse_Presynaptic_Rule }
58 }
59
60 /*
61      Network
62      -------
63 */
64 CREATE 2 Rate_Unit AS Example, Unit;
65 CONNECT FROM Example Unit TO Example Unit WITH Rate_Synapse;
```

FIG. 20A
(Continued)

```
1  DEFINE UNIT Rate_Unit
2  {
3      INIT
4      {
5          float input = 0;
6          float rate = 0;
7          float old_rate = 0;
8          const float trsh = 0.1;
9      }
10     UPDATE_RULE
11     {
12         // assume update_rate() is defined somewhere externally
13         old_rate = rate;
14         rate = update_rate(rate, input);
15     }
16     EVENT_RULE
17     {
18         EXEC_CONDITION
19         {
20             // Generate an event, when rate changed significantly
21             Math.Abs(rate - old_rate) > trsh
22         }
23     }
24 }
```

FIG. 20B

```
1  DEFINE UNIT A_B_Bool_Spike_Unit
2  {
3      INIT
4      {
5          bool a_spike = false;
6          bool b_spike = false;
7          bool payload = false;
8      }
9      UPDATE_RULE {}
10     EVENT_RULE
11     {
12         EXEC_CONDITION
13         {
14             a_spike || b_spike
15         }
16         CODE
17         {
18             // In this example, this unit is configured such
19             // that the payload carries the information whether
20             // it was a a_spike or not
21             payload = a_spike;
22
23             a_spike = false;
24             b_spike = false;
25         }
26     }
27 }
28
29 DEFINE UNIT Bool_Spike_Unit
30 {
31     INIT
32     {
33         bool spike = false;
34     }
35     UPDATE_RULE {}
36     EVENT_RULE
37     {
38         EXEC_CONDITION
39         {
40             spike
41         }
42         CODE
43         {
44             spike = false;
45         }
46     }
47 }
48
49 // A Input Synapse
50 DEFINE SYNAPSE A_Input_Synapse
51 {
52     INIT ( ... )
```

FIG. 20C

```
53      PRESYNAPTIC_EVENT_RULE
54      {
55          // spike delivery
56          post.a_spike = true;
57
58          // Placeholder (not detailed here) for some user defined
59          // plasticity mechanism triggered when pre-unit spikes
...
60      }
61 }
62
63 // B Input Synapse
64 DEFINE SYNAPSE B_Input_Synapse
65 {
66      INIT { ... }
67      PRESYNAPTIC_EVENT_RULE
68      {
69          // spike delivery
70          post.b_spike = true;
71
72          // Placeholder (not detailed here) for some user defined
73          // plasticity mechanism triggered when pre-unit spikes
...
74      }
75 }
76
77 // Synapse carrying payload
78 DEFINE SYNAPSE Payload_Synapse
79 {
80      PRESYNAPTIC_EVENT_RULE
81      {
82          // Spike delivery that can be configured to depend on
83          // pre-unit, post-unit and synapse memory/variable
84          // In this example, it is only transmitting the payload:
85          post.spike = pre.payload;
86 }
87
88 // Network
89 DEFINE OBJECT Complex
90 {
91      CREATE 1 A_B_Bool_Spike_Unit AS In;
92      CREATE 1 Bool_Spike_Unit AS Out;
93      CONNECT FROM In TO Out WITH Payload_Synapse;
94 }
95 CREATE 1 Complex AS AB;
96
97 // "..." is not detailed here
98 CONNECT FROM ... TO AB Complex.In WITH A_Input_Synapse;
99 CONNECT FROM ... TO AB Complex.In WITH B_Input_Synapse;
100     CONNECT FROM AB Complex.Out TO ... WITH ...;
```

FIG. 20C
(Continued)

```
1  DEFINE UNIT Some_Unit
2  {
3      INIT
4      {
5          int last_spike = 0;
6      }
7      EVENT_RULE
8      {
9          EXEC_CONDITION
10         {
11             // not detailed here
12         }
13         CODE
14         {
15             // The spiking time is stored in the unit (last_spike variable)
16             last_spike = Sys.Now;
17         }
18     }
19 }

20 DEFINE SYNAPSE Lean_Synapse
21 {
22     INIT
23     {
24         float w = 0;
25         int delay = 1;
26     }
27     PRESYNAPTIC_EVENT_RULE
28     {
29         // This rule gets triggered when the pre-synaptic unit spikes
30         // This rule is configured to access pre-unit, post-unit, and
31         // synapse variables.
32         // Example - spike-timing dependent update rule, where
33         // stdp() is a user defined function
34         w = stdp(pre.last_spike, post.last_spike, w, delay);
35     }
36 }
37 // Network
38 CREATE 2 Some_Unit AS Example, Unit;
39 CONNECT FROM Example Unit TO Example Unit WITH Lean_Synapse;
```

FIG. 20D

```
1  DEFINE SYNAPSE Some_Synapse
2  {
3      INIT
4      {
5          float w = 0;
6      }
7      PRESYNAPTIC_EVENT_RULE
8      {
9          // This rule gets triggered when the pre-synaptic unit spikes
10         // This rule is configured to access pre-unit, post-unit, and
11         // synapse variables.
12
13         // Example - the rule to update synapse variable w depends on
14         // a pre-unit variable
15         switch (pre.payload)
16         case A:
17             w = rule_A(...);
18         case B:
19             w = rule_B(...);
20         ...
21     }
22 }
```

FIG. 20E

```
1  DEFINE GLOBAL HW_Constants
2  {
3      INIT
4      {
5          int32_t HwMaxSynapseDelay = 32;
6          int32_t HwSpikeHistoryLength = 64;
7          int32_t HwStdpEventDelay = 40;
8          int32_t HwSynapseUpdatePeriod = 1024;
9      }
10 }

11 DEFINE GLOBAL TS_Global
12 {
13     INIT
14     {
15         int16_t inv_num = INVALID_NUMBER;
16     }

17 // ---------------- Proxy_Input_Unit ---------------- //
18 //
19 DEFINE UNIT Proxy_Input_Unit
20 {
21     INIT
22     {
23         int32_t input = 0;
24         int32_t spiking_threshold = 5;
25         int64_t last_spike = TS_Global.inv_num;
26         int8_t isi_history = 4;
27         int64_t isi_index = 0;
28         int16_t isis[] = {TS_Global.inv_num,
   TS_Global.inv_num, TS_Global.inv_num, TS_Global.inv_num};
29     }
30     EVENT_RULE
31     {
32         EXEC_CONDITION
33         {
34             input > spiking_threshold
35         }
36         CODE
37         {
38             input = 0;
39             // register the time of the spike & update isi
   history
40             if (last_spike != TS_Global.inv_num)
41             {
42                 isi_index++;
43                 isi_index %= isi_history;
44                 isis[isi_index] = Sys.Now - last_spike;
45             }
46             last_spike = Sys.Now;
47         }
48     }
```

FIG. 20F

```
49 }
50 //
51 // ---------------- Binary_Unit ---------------- //
52 //
53 DEFINE UNIT Binary_Unit
54 {
55     INIT
56     {
57         delayed bool_t spike = false;
58     }
59     EVENT_RULE
60     {
61         EXEC_CONDITION
62         {
63             spike
64         }
65     }
66 }
67 //
68 // ---------------- IO_Input_Unit ---------------- //
69 //
70 DEFINE UNIT IO_Input_Unit
71 {
72     INIT
73     {
74         delayed bool_t teaching_signal_input = 0;
75         delayed int32_t ff_input = 0;
76         int32_t ff_input_buffer = 0;
77         int32_t ff_spike_threshold = 128;
78         // These are here for testing purposes only
79         bool_t teaching_signal_spike = 0;
80         bool_t feed_forward_spike = 0;
81     }
82     UPDATE_RULE
83     {
84         CODE
85         {
86             ff_input_buffer = ff_input;
87         }
88     }
89     EVENT_RULE
90     {
91         EXEC_CONDITION
92         {
93             (teaching_signal_input) || (ff_input > ff_spike_threshold)
94         }
95         CODE
96         {
97             // register the color/type of the spike
98             teaching_signal_spike = teaching_signal_input;
```

FIG. 20F
(Continued)

```
 99                     feed_forward_spike = ff_input >
   ff_spike_threshold;
100                 }
101             }
102         }
103         //
104         // ----- Synapse between IO_Input_Unit and IO_Output_Unit //
105         //
106         DEFINE SYNAPSE IO_SynapseJunction
107         {
108             INIT
109             {
110                 bool_t is_active = true;
111             }
112             SPIKE_EVENT_RULE
113             {
114                 if (is_active)
115                 {
116                     post.spike = pre.ff_input_buffer >
   pre.ff_spike_threshold;
117                 }
118             }
119         }
120         //
121         // -------- Spike_Delivery rule used by all Synapses --------
   //
122         //
123         DEFINE CODE_MACRO Spike_Delivery
124         {
125             CODE
126             {
127                 // spike delivery
128                 if (is_active)
129                 {
130                     post.ff_input += w;
131                 }
132             }
133         }
134         //
135         // ----------- Nearest-Neighbor STDP RULE -------------- //
136         //
137         DEFINE CODE_MACRO Nearest_Neighbor_STDP
138         {
139             CODE
140             {
141                 // plasticity
142                 if (is_plastic && is_active)
143                 {
144                     int32_t delta_post_then_pre,
   delta_pre_then_pre, delta_pre_then_post;
145                     delta_post_then_pre = EarlierSpikeDelta(1,
   HW_Constants.HwStdpEventDelay - delay + 1);
```

FIG. 20F
(Continued)

```
146                    delta_pre_then_pre =
    pre.isis[pre.isi_index];
147                    if (delta_pre_then_pre >
    delta_post_then_pre || delta_pre_then_pre == TS_Global.inv_num)
148                    {
149                        w +=
    post_then_pre[Math.Min(delta_post_then_pre - 1, max_t - 1)];
150                    }
151                    delta_pre_then_pre =
    pre.isis[pre.isi_index] - delay;
152                    delta_pre_then_post = delta_pre_then_pre -
    delta_post_then_pre;
153                    for (int32_t early_index = 2;
    delta_post_then_pre < delta_pre_then_pre && early_index <
    HW_Constants.HwSpikeHistoryLength && delta_post_then_pre !=
    HW_Constants.HwStdpEventDelay + 1; early_index++)
154                    {
155                        delta_post_then_pre =
    EarlierSpikeDelta(early_index, HW_Constants.HwStdpEventDelay -
    delay + 1);
156                        if (delta_pre_then_pre >
    delta_post_then_pre)
157                        {
158                            delta_pre_then_post =
    delta_pre_then_pre - delta_post_then_pre;
159                        }
160                    }
161                    if (delta_pre_then_post > 0)
162                    {
163                        w += pre_then_post[
    Math.Min(delta_pre_then_post - 1, max_t - 1)];
164                    }
165                }
166            }
167        }
168    //
169    // ------------- Nearest-Nearby-Feed-Forward Synapse //
170    //
171    DEFINE SYNAPSE Nearest_Neighbor_FeedForward_Synapse
172    {
173        INIT
174        {
175            bool_t is_plastic = false;
176            bool_t is_active = true;
177            int32_t w = 0;
178            const int8_t max_t = 32 + 1;
179            const int32_t pre_then_post[] =
    Vectorize(curve='t + 1', max_t=max_t, last_zero=true);
180            const int32_t post_then_pre[] =
    Vectorize(curve='-(t + 1)', max_t=max_t, last_zero=true);
181        }
182        DELAY { 1 }
```

FIG. 20F
(Continued)

```
183          SPIKE_EVENT_RULE
184          {
185                Nearest_Neighbor_STDP;
186                Spike_Delivery;
187          }
188      }
189      //
190      // ------------------------- Teaching Synapse //
191      //
192      DEFINE SYNAPSE Teaching_Synapse
193      {
194          INIT
195          {
196                // synapse variables
197                bool_t is_active = true;
198          }
199          DELAY { 1 }
200          SPIKE_EVENT_RULE
201          {
202                if (is_active)
203                {
204                      post.teaching_signal_input = true;
205                }
206          }
207      }
208      //
209      // ------------------------- Anatomy ------------------------- //
210      //
211      CREATE TS_INPUT_COUNT Binary_Unit AS Teaching, Input;
212      CREATE FF_INPUT_COUNT Proxy_Input_Unit AS Regular, Input;
213      DEFINE OBJECT IO_Unit()
214      {
215          CREATE 1 IO_Input_Unit SET ff_spike_threshold = 32 AS
   Input;
216          CREATE 1 Binary_Unit AS Output;
217          CONNECT FROM Input TO Output With IO_SynapseJunction;
218      }
219      CREATE RECEIVER_COUNT IO_Unit AS ObjectUnit;
220      CONNECT FROM Teaching Input TO IO_Unit.Input WITH
   Teaching_Synapse SET delay = TS_DELAY AS TS;
221      CONNECT FROM Regular Input TO IO_Unit.Input WITH
   Nearest_Neighbor_FeedForward_Synapse
222          SET delay = FF_DELAY, w = post.ff_spike_threshold + 1
223          AS FF, Nearest_Neighbor;
```

FIG. 20F
(Continued)

EVENT-BASED COMMUNICATION IN SPIKING NEURON NETWORKS COMMUNICATING A NEURAL ACTIVITY PAYLOAD WITH AN EFFICACY UPDATE

CROSS-REFERENCE TO RELATED APPLICATIONS

This application is related to co-owned U.S. patent application Ser. No. 13/239,123, filed Sep. 21, 2011 and entitled "ELEMENTARY NETWORK DESCRIPTION FOR NEUROMORPHIC SYSTEMS", co-owned U.S. patent application Ser. No. 13/239,148, filed Sep. 21, 2011 and entitled "ELEMENTARY NETWORK DESCRIPTION FOR EFFICIENT LINK BETWEEN NEURONAL MODELS AND NEUROMORPHIC SYSTEMS," U.S. patent application Ser. No. 13/239,155, filed Sep. 21, 2011 and entitled "ELEMENTARY NETWORK DESCRIPTION FOR EFFICIENT MEMORY MANAGEMENT IN NEUROMORPHIC SYSTEMS," U.S. patent application Ser. No. 13/239,163, filed Sep. 21, 2011 and entitled "ELEMENTARY NETWORK DESCRIPTION FOR EFFICIENT IMPLEMENTATION OF EVENT-TRIGGERED PLASTICITY RULES IN NEUROMORPHIC SYSTEMS," U.S. patent application Ser. No. 13/239,255, filed Sep. 21, 2011 and entitled "APPARATUS AND METHODS FOR SYNAPTIC UPDATE IN A PULSE-CODED NETWORK,", U.S. patent application Ser. No. 13/239,259, filed Sep. 21, 2011 and entitled "APPARATUS AND METHODS FOR PARTIAL EVALUATION OF SYNAPTIC UPDATES BASED ON SYSTEM EVENTS," U.S. patent application Ser. No. 13/588,774, filed Aug. 17, 2011 and entitled "APPARATUS AND METHODS FOR IMPLEMENTING EVENT-BASED UPDATES IN SPIKING NEURON NETWORK", each of the foregoing applications being commonly owned and incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present innovation relates generally to parallel distributed computer systems for simulating neuronal networks that perform neural computations, such as visual perception and motor control.

2. Description of Related Art

Artificial spiking neural networks may be used to process signals, to gain an understanding of biological neural networks, and for solving artificial intelligence problems. These networks typically may employ a pulse-coded mechanism, which encodes information using timing of the pulses. Such pulses (also referred to as "spikes" or 'impulses') are short-lasting (typically on the order of 1-2 ms) discrete temporal events. Several exemplary implementations of such encoding are described in commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety.

Some existing approaches, such as described in co-owned U.S. patent application Ser. No. 13/239,123, filed Sep. 21, 2011 and entitled "ELEMENTARY NETWORK DESCRIPTION FOR NEUROMORPHIC SYSTEMS", incorporated supra, utilize Elementary Network Description (END) framework in order to describe and simulate large-scale neuronal models using parallelized processing.

Some existing END implementations may utilize multi-compartment neurons and/or junctions. However, junctions may require to be operated using clock-based update rules (e.g., cyclic updates). Junctions may be provided with access to pre-synaptic network parameters in order to facilitate data communication between pre-synaptic and post-synaptic sides of the junction. As a result, cyclic updates of a network with junctions may become computationally intensive as described in U.S. patent application Ser. No. 13/239,259, filed Sep. 21, 2011 and entitled "APPARATUS AND METHODS FOR PARTIAL EVALUATION OF SYNAPTIC UPDATES BASED ON SYSTEM EVENTS", incorporated supra.

SUMMARY OF THE DISCLOSURE

One aspect of the disclosure relates to a computerized neuron apparatus. The apparatus may comprise one or more processors configured to execute computer program modules. The computer program modules may be configured to effectuate a neuronal network. The neuronal network a first unit, a second unit, and a connection. The first unit may comprise a first unit memory. The second unit may comprise a second unit memory configured to be updated according to the first update rule. The connection may operably couple the first unit with the second unit. The connection may comprise a connection memory configured to be updated according to a second update rule. The connection may be configured to communicate at least one bit stored in the first unit memory to the second unit responsive to an event associated with the first unit.

In some implementations, the second unit memory may be configured to be updated in accordance with the first update rule based on the least one bit. The first unit may be configured to generate a spiking output comprising spikes. Individual spikes may be characterized by one of two or more spike types. Communication of an individual spike from the first unit to the second unit may comprise communication of the at least one bit. The at least one bit may be configured to communicate information related to one of the two or more spike types.

In some implementations, an individual spike may be characterized by an area configured to encode the at least one bit.

In some implementations, the two or more spike types may comprise a first spike type and a second spike type. The first spike type may be configured to cause (i) response generation by the second unit and (ii) execution of the connection memory update in accordance with the second update rule. The second spike type may be configured to cause execution of the connection memory update in accordance with the second update rule. The connection memory update may be characterized by an absence of the response.

In some implementations, the connection may be characterized by connection efficacy. The connection efficacy may be configured to be adjusted in accordance with the second update rule and the at least one bit. An adjustment of the connection efficacy may be configured to advance time of a response by the second unit generated based on the at least one bit.

In some implementations, the connection may be characterized by a connection efficacy. The connection efficacy may be configured to be adjusted in accordance with the second update rule and the at least one bit. An adjustment of the connection efficacy may be configured to delay time of a response by the second unit generated based on the at least one bit.

In some implementations, the second update rule may comprise two or more spike timing dependent plasticity (STDP) rules configured based on a time of the event. Individual ones of the two or more STDP rules may be used independent from one another. The at least one bit is configured to indicate one and only one rule of the two or more STDP rules for use in the efficacy adjustment.

Another aspect of the disclosure relates to a method of operating a neuronal network. The method may comprise: interconnecting, using one or more processors, a presynaptic unit and a postsynaptic unit via a connection configured to modify memory of the postsynaptic unit responsive to an event associated with the presynaptic unit, the connection comprising a memory configured to be updated based on an occurrence time of the event; and enabling, using one or more processors, the connection to access memory contents of the presynaptic unit. The memory modification may be configured based on the memory contents. The postsynaptic unit may be configured to generate a response based on the memory modification.

In some implementations, the connection memory may be configured to be updated based on memory contents of the postsynaptic unit comprising an occurrence time of the response.

In some implementations, the response generation by the postsynaptic unit may be configured in accordance with a learning process based on an external signal comprising at least one spike indicative of a target response for the postsynaptic unit. The event may be based on an arrival of the at least one spike to the postsynaptic unit. The connection memory update may be characterized by an absence of the response by the postsynaptic unit within a time interval prior to the update.

In some implementations, the connection may be configured to provide at least two bits of the memory content to the postsynaptic unit. The response generation by the postsynaptic unit may be configured in accordance with a response process configured to adjust unit excitability. The memory modification may be configured based on the memory content comprises: adjusting the excitability in accordance with first excitability adjustment rule responsive to first value of the content; and adjusting the excitability in accordance with second excitability adjustment rule responsive to second value of the content.

In some implementations, the event may comprise a response generated by the presynaptic unit. The response may be configured to be delivered to a target unit within the network. The one or more bits communicate a delay associated with delivery of the response. The target may comprise a given neuron of a plurality of neurons within the neuronal network. The delay may be configured based on a parameter of the given neuron.

Yet another aspect of the disclosure relates to a method for communicating data via a connection from a presynaptic unit to a postsynaptic unit in a spiking neuron network. The method may comprise: communicating, using one or more processors, the data to the postsynaptic unit based on a response generated by the presynaptic unit, the data comprising one or more bits, the response comprising a plurality of spikes characterized by a spike rate; and executing, using one or more processors, a memory modification rule associated with the postsynaptic unit based on at least a first bit of the one or more bits, the first bit being configured to communicate data related to the spike rate.

In some implementations, the execution of the memory modification rule associated with the postsynaptic unit may be configured to advance time of another response generatable by the postsynaptic unit responsive to the receipt of the data.

In some implementations, the execution of the memory modification rule associated with the postsynaptic unit may be configured to delay time of another response generatable by the postsynaptic unit responsive to the receipt of the data.

In some implementations, the memory modification rule may be configured based on (i) memory content of the postsynaptic unit and (ii) an occurrence time of the response. The memory content may comprise data related to the another response being generated by the postsynaptic unit based on the receipt of the data.

In some implementations, the execution of the memory modification rule associated with the postsynaptic unit may be characterized by an applicability parameter indicating whether to effectuate modification of the postsynaptic unit memory based on receipt of individual ones of the plurality of spikes. At least one of the one or more bits may be configured to communicate the applicability parameter configured to cause the postsynaptic unit to maintain unchanged content of the postsynaptic unit memory subsequent to receipt of at least one of the plurality spikes by the postsynaptic unit.

In some implementations, the applicability parameter may be configured to suppress the execution of the memory modification rule subsequent to the receipt of the at least one of the plurality spikes by the postsynaptic.

In some implementations, individual ones of the plurality of spikes may be characterized by an area characterized by at least one of (i) height parameter and (ii) width parameter. One or both of the height parameter or the width parameter may be configured to encode the one or more bits.

In some implementations, a state of the presynaptic unit may be characterized by an excitability parameter. The at least one of the one or more bits may be configured to communicate the excitability parameter to the postsynaptic unit. An increased value of the excitability parameter may correspond to an increased probability of the response being generated.

In some implementations, an increase in the value of the excitability parameter may be configured to advance the response generation time. A decrease in the value of the excitability parameter may be configured to delay the response generation time. The connection may be configured to read memory of the presynaptic and the postsynaptic units and to modify memory of at least one of the presynaptic and the postsynaptic units.

Still another aspect of the disclosure relates to a spiking neuron robotic controller apparatus comprising a non-transitory computer-readable medium having instructions embodied thereon. The instructions may be executable by a processor to perform a method. The method may comprise: executing a neuron process configured to cause generation of a target output based on input into the neuron via one or more synapses; and detecting an event and determining whether the event corresponds to the input or is based on a teaching signal into the neuron. Responsive to the event corresponding to the input, the method may comprise: updating state of the neuron process in accordance with the input; generating a response based on the updated state; and triggering execution of a plasticity rule configured to update efficacy of at least one synapse of the one or more synapses. Responsive to the event being based on the teaching signal into the neuron, the method may comprise executing the plasticity rule, wherein execution of the plasticity rule is characterized by an absence of the response being generated subsequent to the event and prior to the rule execution.

In some implementations, the neuron process may comprise a supervised learning process configured to determine a relationship between the input and the teaching signal. The teaching signal may comprise the target output. The plasticity mechanism may be configured based on a difference between a time of the event and a time of at least one other event associated with the postsynaptic unit.

In some implementations, the neuron process may comprise a reinforcement learning process configured based on the teaching signal. The teaching signal may be configured based on a measure between neuron output and the target output.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 15A is a graphical illustration depicting post-synaptic response generation responsive to an input spike into a neuron, in accordance with one or more implementations.

FIG. 15B is a graphical illustration depicting plasticity update triggered by a teaching signal event, in accordance with one or more implementations.

FIG. 15C is a graphical illustration depicting delivery rule modification for a post-synaptic response by a payload associated with an input spike into a neuron, in accordance with one or more implementations.

FIG. 15D is a graphical illustration depicting post-synaptic rule modification by a payload delivered to the neuron by a spike, in accordance with one or more implementations.

FIG. 20A is a program listing illustrating rate encoding implementation in a spiking neuron network using spikes with payload, in accordance with one or more implementations.

FIG. 20B is a program listing illustrating rate-dependent event rule in a spiking neuron network using spikes with payload, in accordance with one or more implementations, in accordance with one or more implementations.

FIG. 20C is a program listing illustrating unit update based on spike payload, in accordance with one or more implementations.

FIG. 20D is a program listing illustrating providing spike parameters via spike payload, in accordance with one or more implementations.

FIG. 20E is a program listing illustrating an update rule within a spiking neuron network being configured based on a spike payload, in accordance with one or more implementations.

FIG. 20F is a program listing illustrating use of spike payload for communicating data in a spiking network, in accordance with one or more implementations.

Figure 1:
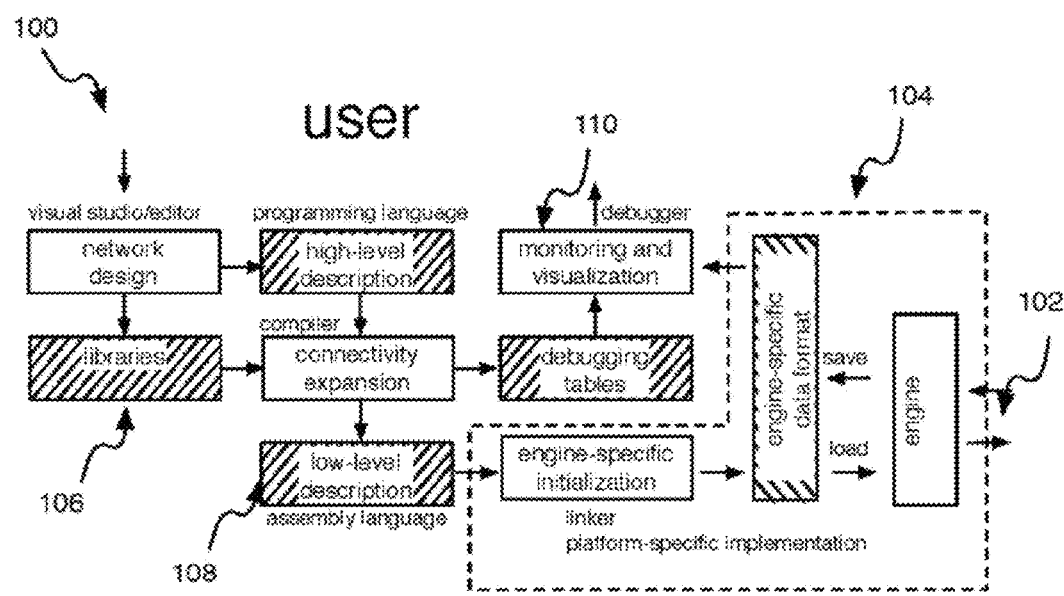
FIG. 1 is a block diagram depicting neural simulator, according to one implementation.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2 ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2 ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/ virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

The present disclosure provides, among other things, a computerized apparatus and methods for facilitating learning by spiking neuron networks by implementing event-based updates. Exemplary implementations may provide improved network description framework in order to reduce processing load and/or energy consumption associated with processing data using spiking neuron models. In one or more implementations, the network may be configured using elementary network description (END) for neuromorphic systems. In some implementations, the END description may comprise multiple event types configured to effectuate event-based functionality.

In some implementations, a pre-synaptic event may be defined to modify an input connection. An example of such an input connection modification may include adjusting synaptic weights using pre-synaptic plasticity rule of a neuron based on pre-synaptic activity of the connection. In one or more implementations, the pre-synaptic event may be configured based on a pre-synaptic input (e.g., a pre-synaptic spike) delivered via the connection.

In some implementations, a dendritic (or an internal) event may be defined to modify input connections of a neuron. The internal event may be triggered by an external signal and/or internally by the neuron. In one or more implementations, the dendritic event may be triggered by a timer or an overflow indicator associated with a buffer that may store neuron spiking history (pre-synaptic and/or post-synaptic), internally generated by the neuron, and/or provided to the neuron externally (e.g., via a reinforcement connection). In one or more implementations, the dendritic event may be configured not to cause post-synaptic response by the neuron, but rather the connection plasticity adaptation.

In some implementations, an axonic (or delivery) event may be defined to cause distribution of post-synaptic response of a neuron to appropriate destinations. In one or more implementations, the axonic event may be triggered by the neuron spike response process (e.g., the super-threshold condition). In some implementations, the dendritic and the axonic events may be implemented sequentially with one another as a single complex event.

In some implementations, the scope of the internal event may comprise the respective neuron and does not extend to other neurons of the network. Conversely, the scope of the external event may extend to other neurons of the network via, for example, post-synaptic spike delivery.

In some implementations, a custom event may be defined to implement custom event rule of the END.

In some implementations, two or more custom events may be defined. In one or more implementations, the two or more custom events may comprise a specific name (e.g., event tag).

In some implementations, connections (e.g., synapses) may be configured to subscribe to one or more such custom events based on the tags to appropriately handle custom events.

In one or more implementations, the dendritic events may be utilized to facilitate reinforcement learning by the network. By way of illustration, upon receipt of reinforcement input (a 'dendritic spike), plasticity of incoming synapses of the neuron may be adjusted without delivering the post-synaptic response to post-synaptic targets. Responsive to the neuron state reaching super-threshold condition, the axonal event may be used to deliver neuron post-synaptic response to the desired destinations.

In one or more implementations, the dendritic and the axonic events may be combined to obtain a composite event. An example of such a composite event may include the post-synaptic spike used in the elementary neuromorphic description (END) framework v1, v2, and v3.

Detailed descriptions of the various embodiments and implementations of the apparatus and methods of the disclosure are now provided. Although certain aspects of the disclosure can best be understood in the context of processing visual information using spiking neural networks, the disclosure is not so limited, and implementations of the disclosure may also be used in a wide variety of other signal processing applications, including for instance in processing of other sensory signal modalities (e.g., sound waves, radio frequency waves, etc.) and/or implementing connection adaptation in pulse-code neural networks.

Implementations of the disclosure may be for example deployed in a hardware and/or software realization of a neuromorphic computer system. In one such implementation, a robotic system may include a processor embodied in an application specific integrated circuit, which can be adapted and/or configured for use in an embedded application. Examples of embedded applications may include a prosthetic device and/or or other embedded applications.

Referring now to the example depicted in FIG. 1, one configuration of a neural simulator development environment 100 is shown and described in detail. In this example, network design, connectivity expansion, monitoring and visualization, engine-specific initialization, and engine blocks may comprise software tools while labeled libraries, high level description, debugging tables, low level description and engine-specific data format blocks may be implemented as data structures in specific formats which are described in more detail herein.

The neural simulator development environment of FIG. 1 allows a user to define an arbitrary neural system model and to execute the model on an arbitrary computational platform (the engine). Neural simulator development 100 may comprise a number of software tools (transparent blocks in FIG. 1) that interact with each other via data structures configured in some formats, and a computational engine 104, which can be embodied in a single computer, a computer cluster, GPU, or a specialized hardware. In some implementations, the computational engine 104 may be a part of computerized control/sensory input processing apparatus and exchanges data with the rest of the apparatus via a pair of arrows 102 in FIG. 1. By way of example, the computational engine 104 receives sensory information from the "real world" via the input 102 and sends motor commands to any appropriate actuators (not shown) of the control apparatus via the output 103 enabling the control/processing respond to the sensory inputs via a set of drivers.

A user may specify the desired network layout of the neural simulator 100 using a GUI network design tool, e.g., similar to Microsoft Visual Studio™. In some implementations, the neural simulator employs specialized libraries, configured to implement various specialized functions. Some specific library modules may be, for example, described briefly as "retina+thalamus+V1 with 1 M neurons". In some implementations, the library modules may be described in more detail, providing initialization of various default parameters (as appropriate) that define one or more of plasticity, neuronal dynamics, cortical micro circuitry, and/or other information associated with a default parameter. The GUI network design tool saves the network layout of the neural simulator 100 in a "high-level description" format. In some implementations, the GUI network design tool is configured to modify the libraries 106 in FIG. 1.

The high-level description of the network layout is compiled into a low-level description (Elementary Network Description—END) 108 using the libraries 106. For example, the high-level description may comprise description of cortical areas V1 and V2 (not shown) and may require connecting them according to an appropriate connectivity rule stored in the library 106. The compiler allocates neurons, establishes the connections between the neurons, and saves the network layout 100 in a low-level description that is similar to an assembly language. In some implementations, the compiler may provide appropriate tables for monitoring and visualization tool during debugging.

Figure 2:
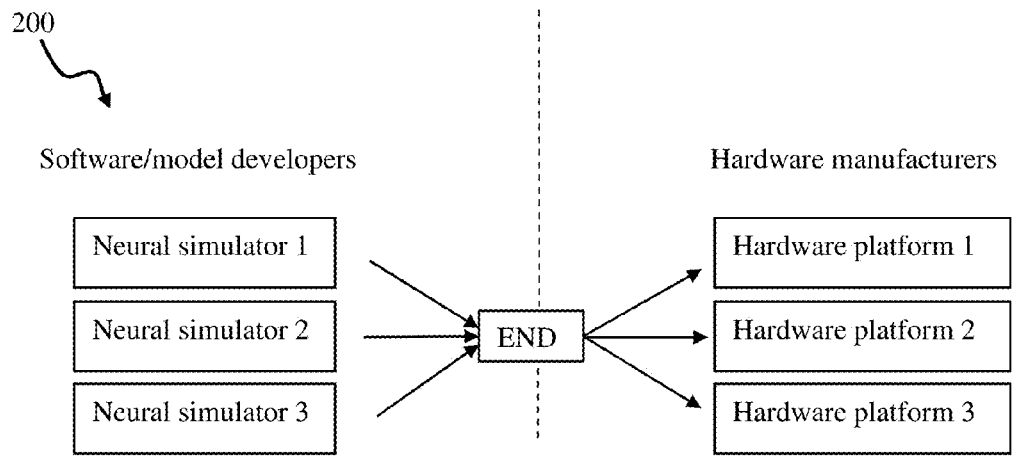
FIG. 2 is a block diagram illustrating model development workflow, in accordance with one implementation.

The Elementary Network Description (END) representation acts as an intermediary bottleneck (i.e., a link) between simulator tools and hardware platform implementations as illustrated in FIG. 2. The END representation provides an abstraction layer that isolates developing environment from the underlying hardware. One objective of END is to isolate the step of developing neural network models from hardware simulation tools, as illustrated in FIG. 2. The END approach may operate to partition implementation of neural models (such as the model of FIG. 1) into two steps. At the first step, neuroscientists create neural models of varying complexity using high-level description language and END representation. At the second step, developers (programmers and hardware engineers) modify and adapt underlying implementation blocks to adapt and optimize model operation for a particular hardware/software platforms. In this architecture, the END format performs the same services as LLVM (low-level virtual machine) or Java bytecode; however, the END format can be optimized for parallel representation and execution of neuronal systems.

The low-level description of the model is converted to the engine-specific binary form suitable for upload to the computational engine 104, as shown in FIG. 1. The computational engine is capable of saving its current state in the same format for subsequent re-uploading. The binary data is used by the monitoring and visualization block 110 of FIG. 1 during debugging and visualization of computation results and monitoring of the system. As described above, the computational engine interacts with the real world via sensors and actuators (connected to the hardware by drivers) as depicted by the arrows 102 in FIG. 1.

The elementary network description (END) of the network may comprise the lowest-level platform-independent model depiction. In one implementation, such description is configured similarly to assembly language description, commonly used in computer programming arts. However, while most existing computer assembly language implementations may be processor-dependent, the END description is hardware-agnostic.

The END description may operate as a platform-independent link between a high-level description and the platform-specific implementation of the neural model, as illustrated in FIG. 2. In FIG. 2, blocks 210 (Neural simulators 1-3) denote various network development tools (such as, NEURON, GENESIS, NEST), while blocks 220 (Hardware platform 1-3) denote different hardware implementations (e.g., CPU, multiprocessor computers (workstations, desktop, server, mainframe, ASICs, FPGA, and/or other hardware implementations) that are used to execute the respective neural simulator models.

In one implementation of the END implementation, input neural simulator model data may be provided in an XML format (or any other convenient structured data format), or in a relational database normal form, aimed at providing minimal set of input data that is sufficient to specify one or more aspects of neural simulation model. A given aspect of the neural simulation module may include one or more of a neuron, dendritic tree, synapse, neuronal and synaptic classes, plasticity rules, neuronal dynamics, and/or other aspects. This set of input data is configured via multiple relations between the above items. This set of input data may be configured in a variety of ways: (i) a collection of multiple files, individual ones of which describing a single data structure, e.g., a neuron; (ii) a single file (that may be compressed); or (iii) hierarchical directory/folder/file structure; or a combination thereof.

In some implementations, the fundamental (atomic) computational unit of the network simulation model is a neuron, referred to as a "unit". In some implementations, the unit may comprise a neuronal compartment where the units may be linked by junctions to form dendritic trees, which form neurons. In these examples, the synapses comprise connections from one unit to another, thereby enabling to describe unit (node) interconnections via a connectivity graph. Such graphs do not necessarily comprise trees connected to trees through synapses coming from somas.

In order to obtain operational network description, individual units (e.g., neuron, compartment) and individual synapses may be subject to a set of rules that govern its dynamics. In some implementations, some of these rules comprise clock-based rules that apply to neuronal units and junctions, while other rules may be event-based and apply to synapses.

By way of example, individual neuronal units may be subject to a set of rules that describe spike-generation mechanism for that unit, comprising: (i) the condition for firing a spike; and (ii) a set of modifications that may be applied to the unit dynamic state variables after the spike is fired. Similarly, individual synapses may be subject to spike rules that determine a set of actions performed on the synapse when a pre-synaptic unit fires and a set of actions performed on the synapse when a post-synaptic unit fires.

In one implementation, the END format may be used to generate a C code that implements the computational engine (e.g., the engine 104 in FIG. 1). In this implementation, which is referred to herein as END 1.0, the description of rules may comprise code strings that may be inserted into a C-code template in order to provide the neuronal model with arbitrary expandable functionality, as illustrated by the examples below.

END 1.0 may implement an object inheritance structure that may comprise object classes unit_class, junction_class, synaptic_class, and event_rule with possible subclasses. Individual ones of such classes may have instances, i.e., units, junctions, synapses, and rules.

END 1.0 can be configured to separate the data (units, junctions, synapses) from the methods (update and spike rules), thereby enabling the computational engine (e.g., the linker 112 of the engine 102 in FIG. 1) to implement data ↔ methods interconnections. In some implementations of the computational engine, the computational operations may be grouped by data (e.g., for individual synapses, some or all of the actions (rules) are executed for that synapse). In other commonly used implementations of the computational engine, e.g., useful with GPU hardware, computational operations may be grouped by methods (e.g., for individual update rules, outstanding requests for some or all synapses that are subject to that update rule are executed). The END can be configured to operate equally well with any of the above operational grouping configurations.

When implementing large-scale models of complex real-life systems such as, for example, a mammalian visual system, some data structures described by the END format may consume the majority (in some implementations up to 99%) of the network model resources (memory or CPU, or both). Implementation of these data structures, typically referred to as "canonical structures", greatly benefits from the use of specialized hardware, such as an ASIC or FGPA optimized to simulate such canonical structures. Similarly, in some implementations where some rules and methods consume majority of CPU processing resources (e.g., take the most time to execute); development of specialized hardware accelerators may provide a substantial increase in processing of canonical methods. Different hardware implementations can hard-wire different methods, leading to a diversity of hardware platforms.

One of the goals attained with the END description may be to provide the minimal instruction set that is sufficient for describing neuronal models of arbitrary complexity. Herein, the following notation is used in describing the END format: class or type definition type is encased in angle brackets < . . . >; the fields within the class (or type) may be indented, with respect to the class definition, as shown in the Definition 1 example, below.

In the above definition, the statement <unit of (unit_class)> denotes definition of an instance of the class "unit_class" having fields "unit_id" and "Initialization" as follows:

```
<unit of (unit_class)>
    unit_id
    Initialization
```

This class defines a neuron or a compartment, but in principle, can be any neural unit, that may be executed by the model at a predefined model execution time step (e.g., 1 ms). The unit may be an instantiation of the object unit_class that specifies the operations performed at individual ones of the model time steps. The fields of the unit_class may be defined as follows:
    unit_id
is a unique label, e.g., a number or a string that identifies individual units. The unit_id may be a Perl or PHP or RegEx, or MATLAB expression that specifies a range of valid ids, and the actual id may be assigned during model build by the linker. For example, 'exc(1:1000)' or 'exc 1:exc 1000'.
    Initialization
may be a structure containing initial values of the class fields that may be different from the default values in the definition of the class. Some or all of these may be declared and initialized with default values in the unit_class.

```
<unit_class of (unit_class)>
    unit_class_id
    execution_condition
    update_rule
```

-continued

```
    event_condition
    after_event_rule
    initialization
``` provides a generic definition of a neuronal model class that specifies neuronal dynamics, allocates neuronal variables, defines spike processing rules, and/or other information associated with the neural model class. The class <unit_class> is an object (as in object-oriented programming) that can be derived from another object of unit_class. The fields of the <unit_class> object may be defined as follows:
    unit_class_id
is a unique name of the object class (string), E.g., 'exc' or 'p23soma' or 'p4cmprtmnt3'. These object names may be used by the neuronal model as names of vectors to refer to the units, e.g., in background processes or in I/O processes.
    execution_condition
the condition that is evaluated at individual model execution time steps in order to determine whether or not to execute units of this class, for example: 'now %10==0'; or 'DA>0.1'. If the execution_condition is absent (the field is blank), then respective unit may be executed at individual model time steps (i.e., the system clock step cycle). When a class (subclass) may be derived from a base class (superclass), then the derived class execution condition overrides the base class execution condition.
    update_rule
defines a code string that will be converted by the linker to executable code. In some implementations, the code string may comprise a forward Euler numerical method notation, such as, for example:

| | |
|---|---|
| `x(t+1) = x(t) + tau*(F(x(t)) ).  | 'I += g*(E-V); g += tau*(-g)/5; |
| v += tau*( 2*(v+70)*(v+50)-u+I)/20; | u += tau*0.1*(2*(v+70)-u);` . |

In some implementations, the code string specifies mapping x(t+1)='x(t)+tau*(f(x(t))' or a C-executable code (function or subroutine) that may be performed at individual steps of model execution. When the class is derived from a base class, then the object update_rule of the subclass may be executed first, followed by the base class rule, thereby allowing for update of certain variable by the subclass rule execution.
    event_condition
defines a logical statement needed to detect spikes. E.g. 'v>30'. It may be executed at individual clock cycles (model time step). When the class is derived from a base class, then the event_condition of the subclass replaces the event_condition of the base class.
    after_event_rule
the code that is executed when a spike may be detected. E.g. 'v=−65;u=u−8;' For a derived subclass, the subclass after_event_rule may be executed before the after_event_rule of the base class.
    initialization
sets the initial values of some or all variables and parameters of the unit. E.g., 'float v=0; float u=0; float g_AMPA=0;'. Different unit classes may have a different number of synaptic conductance types and/or assigned different variable names. The initialization string parsed by the linker in order to obtain names of some or all of the variables during build. Derived object classes may add new variables. For a derived subclass, the initialization of the base class may be executed first, and then this initialization later, as it may change some of the default parameters. The initialization may change the default parameter values inherited from the base class. By way of example, the initialization string 'float g_NMDA=1; g_AMPA=1' create a new variable g_NMDA and resets the value of the existing variable g_AMPA.

Similarly, junctions and synapses can be described using the same methodology as above.

```
<junction of (junction_class)>
    unit_id1
    unit_id2
    initialization
``` provides a generic definition of a neuronal model class that provides connectivity between pairs of units. The field junction_class refers to the name of the parent object class, for example, "gap_junction" or "dendritic_tree". The class fields may be as follows:

unit_id1, unit_id2
specifies the ids of the two connected neuronal units.
initialization
Sets the initial values for the parameters and variables. The class junction_class may be used as the base to define a subclass <junction_class of (junction_class)> and may be declared as follows:

```
<junction_class of (junction_class)>
    junction_class_id
    execution_condition
    unit_class_1
    unit_class_2
    update_rule
    initialization
``` where
junction_class_id
is a unique identification label that specifies the class that can be derived from another class.
execution_condition
the condition that is evaluated at individual model execution time steps in order to determine whether or not to execute units of this class, for example: 'now %10==0'; or 'DA>0.1'. If the execution_condition is absent (the field is blank), then respective unit may be executed at individual model time steps. When a class (subclass) is derived from a base class (superclass), then the derived class execution condition overrides the base class execution condition.
unit_class_1
the class identifier of the unit_1;
unit_class_2
the class identifier of the unit_2; if omitted, the junction may be assumed to be applied to some or all unit classes.
update_rule
defines a code string that will be converted by the linker to executable code. In some implementations, the code string may comprise a forward Euler numerical method notation, such as, for example:
'g_2to1*(V2−V1), g_1to2*(V1−V2)'.
In some implementations, applicable to Ohmic junctions, one can skip the _class part and just specify the conductance g_2 to1 and g_1to2 in the <junction>. When the class is derived from a base class, then the object update_rule of the subclass may be executed first, followed by the base class rule, thereby allowing for update of certain variable by the subclass rule execution.
Initialization
sets the initial values of variables, if any, used to execute the update_code.
The class synapse may be declared as follows:

```
<synapse of (synaptic_class)>
    pre
    post
    delay
    initialization
``` where,

```
pre
post
``` are identifiers of the pre-synaptic unit and the post-synaptic unit, respectively.
delay
specifies the axonal conduction delay value (in simulation time steps)
initialization
sets the initial parameter and variable values. Similarly to the junction class, synapse class may be derived from a base synapse class may be declared as follows:

```
<synaptic_class of (synaptic_class)>
    synaptic_class_id
    initialization
``` where,
synaptic_class_id
is the unique label that specifies the base class, which may be used as a vector identifier in order to refer to individual synapses in background processes (though the order may be scrambled). This class can be derived from another class.
initialization
sets the initial values of the parameters and variables for individual synapses, e.g., 'float w=5; float sd=0; float p=0;'. The class defining a pre-synaptic event rule that accesses synaptic variables and post_unit variables, may be declared as follows:

```
<presynaptic_event of (event_rule)>
    synaptic_class
    post_unit_class
``` where,
synaptic_class
denotes the name of the synaptic class to which this plasticity rule applies. The object event_rule may be used to specify actions performed when the pre-synaptic unit fires. The rules of the synaptic_class define the short-term plasticity (STP) and long-term potentiation (LTP) part of STDP rules for a pre-synaptic neuron (unit).
post_unit_class
specifies the class of the post-synaptic unit thereby defining the domain of the action of the event_rule thereby providing information that may be required by the STDP rule execution (e.g., the class to deliver the post-synaptic potential (PSP) and to access variables such as last_spike). The class postsynaptic_event may be declared as follows:

```
<postsynaptic_event of (event_rule)>
    synaptic_class
    post_unit_class
``` where,
    synaptic_class
specifies the name of the synaptic class to which this plasticity rule applies. The object event_rule may be used to define a list of actions that may be performed with synaptic variables when the post-synaptic unit (as referenced with respect to these synapses) fires, thereby implementing the LTP part of the STDP plasticity rule that may be executed whenever the post-synaptic unit fires a spike.
post_unit_class
specifies the class of the post-synaptic unit thereby defining an action domain for this rule. In one implementation, this rule may be configured to accesses synaptic variables. The event_rule class may be derived from a base class as follows:

```
<event_rule of (event_rule)>
    event_rule_id
    rule
    initialization
``` where,
    event_rule_id
is a unique label that specifies the rule class. Generally, the rule class may be derived from another object class event_rule.
    Rule
is a string representation of a code that specifies action performed upon occurrence of an event. By way of example, delivery of the post-synaptic potential (PSP) may be specified as"
    'g+=w' or 'I+=w' or 'g+=g*p'.
    Similarly, actions associated with a presynaptic_event may be defined as:
    'p*=STP(now−last_active); w−=LTD(now−last_spike);'
while actions associated with a postsynaptic_event may be defined as:
    'w+=STDP(now−last_active)'
where:
"last_active" is the time elapsed since a previous occasion when the synapse was active; last_spike is the time of the last spike of the post-synaptic unit, and
'now' is the current time.
    In addition, the event_rule class may specify tables, e.g., STDP, LTP, or other biologically motivated tables.
    initialization
sets the initial values of the tables as, for example: 'STDP={, . . . ,};' or 'STP={, . . . ,};LTD={ . . . }'.

```
<background_process>
    execution_condition
``` the condition that is evaluated at individual simulation time steps to determine whether or not to run the process. E.g., 'now %10==0' or 'DA>0.1'. If absent, then the process may be run at individual time steps. The name of the unit_class or synaptic_class whose local variables can be accessed. The code below will be run in a loop within the class members with an arbitrary order (possibly in parallel). If absent, it may be assumed that the process is run once per 'true' execution_condition, and individual units or synapse can be accessed using the unit or synaptic class name. E.g., the unit class 'exc' contains units exc[i] with possibly unknown order that does not necessarily correspond to the order in which they are listed
    update_rule
the code to be executed, e.g. 'DA*=0.9' or in synaptic_class domain 'w+=DA*sd; sd*=0.995;' or without domain just 'exc[rand( )].I=100;'
    initialization
initialization of global variables, e.g., 'float DA=0'.
    The time step of the simulation, and other run-time parameters, can be specified. There may be a few global variables that are accessible to everybody, e.g. "now"—the present time.
    Classes that differ by a parameter may be declared as a single class and the parameter values may be specified in the instantiations. If there are only a few (e.g., two, three, or some other number) different values of the parameter, then it may make sense to specify two different classes, individual ones having the parameter hard-wired in the equations.
    External interface of the END framework describes provision of external sensory input into neuronal network (e.g., the network 100 of FIG. 1) and delivery of outputs (via for example, the pathways 102 of FIG. 1) to external robotic apparatus. END external interface may comprise two major logical blocks: Sensory Input block, and Output and Monitoring block, described in detail below.
    This block defines connection of the external input to various units of the network model. By way of example, sensory class for an N-channel (numbered 1 to N) spiking retinal input may be declared as follows:

```
<unit_class>
    unit_class_id = 'retina'
    after_event_rule     // may be empty
```

The above class declaration informs the input driver and the computational engine where the spikes from the retina will go. The structure of the input may be defined using the following declaration of N empty units:

```
<unit>
    unit_id = 'retina(1:N)'
```

In some implementations, there may be no update rules that are required to be executed at individual network time steps. Hence, the computational engine may not spend computational resources on these empty units. However, whenever the spikes from the input channels declared as 'retina' arrive, the input driver may put the unit index into a spike queue as if it actually fired a spike (this may trigger the after_event_rule execution by the engine, if it is not empty). The synapses from the unit to other units may tell the network what to do with spikes. In the case of retinal input on LGN, the retina units may have 1-3 synapses onto some LGN cells.
    If the input channel feeds continuous signals, then the signal may update the variable "I" in individual units at a given time interval (e.g., every millisecond). In this case, one may specify the update rule and the event_condition.
    The output and monitoring block provides an output interface for the network mode. In one implementation, applicable to motor output from the model, the output block specifies connections between the network units and external motor interface or some other actuators. In some implementations, the motor interface may comprise a muscle interface. In some implementations, the motor interface may comprise a motor interface configured to control an external robotic apparatus. A unit 'neck_muscles' comprising an N-channel motor output object for interfacing with, for example, neck muscles may be declared using END framework as follows:

```
<unit_class>
    asunit_class_id = 'neck_muscles'
    initialization = 'float I=0;'
```

The above declaration informs the output driver which neurons (units) to monitor for changes in the values of the current I. The respective N empty unit objects may be then created as follows:

```
<unit>
    unit_id = 'neck_muscles'
```

During execution of the model, the computational engine ensures that at least some of the motor neurons (units) neck_muscles have non-zero (e.g., positive) synaptic projections to these neurons, so that whenever the motor neurons fire, the variable I within the unit object may be set to a positive value. The output driver, therefore, monitors the variable I at individual model time steps, and resets it to I=0 if needed. As the motor output interface does not require execution of update rules (at individual model execution time steps), the computational engine spends minimal resources on maintaining the 'neck_muscles units.

In some implementations, applicable to monitoring neural network execution, the output block specifies connections between the network units and external monitoring interface.

As described above, certain elements of the neuronal model benefit from computations that may be performed by specific hardware blocks (hardware accelerators). By way of example, consider a method update_rule of the unit unit_class that consumes a large portion (e.g., 99%) of the engine computational resources:

```
<unit_class>
    unit_class_id='simple_model'
    update_rule = 'v+=(0.04*v+5).*v+140−u+I; u+= a*(b*v−u);'
    event_condition = 'v>30'
    after_event_rule = 'v=−65;u+=d'
    initialization='float v=−65; float u=0; float a=0.1;
        float b=0.5; float d=8;'
```

Provided the implementation of the update_rule does not change from unit to unit and/or from one model run to another, then computational operations associated with the update_rule can be more efficiently executed by in a specialized hardware accelerator that may be implemented in, for example, an ASIC, FPGA, or specialized silicon. Within the END framework, a 'simple_model' class may be used to instruct the compiler to direct execution of the code, associated with, for example, the update_rule listed above to the appropriate location corresponding to the hardware accelerator interface. To create such mappings, instances of the simple_model class may be instantiated as follows:

```
<unit of (simple_model)>
    unit_id=509
    initialization 'a=0.01; d=2'
```

Such hardware accelerators (simple_model objects) may be used by the END as building blocks for constructing more complex objects. By way of example, the neuronal model with, for example, one million (1 M) of simple_model units (neurons) and, for example, one thousand (1K) neurons with an extra slow neuronal variable, 'w' may be declared using class inheritance mechanism as follows:

```
<unit_class of (simple_model)>
    unit_class_id='complex_model'
    update_rule = 'w+=0.001*(0.3*v−w); I−=w'
    after_even_rule = 'w+=1'
    initialization='float w=0'
```

A processor in the computational engine (e.g., an ARM chip) that is attached to the specialized hardware may process 1K units of the above type in order to evaluate dynamics of the variable 'w' and incorporate it into the value of the variable I. Then the hardware accelerator (analog or digital) hardware may execute 1 M+1K instances of the simple_model without even realizing that some of the instances correspond to a more complex model. The specialized hardware may contain the most commonly used implementations of neuronal models, synaptic dynamics. Users may be free to mix and match these canonical capabilities or to add to them whatever extra functionality may be needed.

The spnet may comprise N=Ne+Ni=1000 neurons, where Ne=800 excitatory neurons and Ni=200 inhibitory neurons. individual neurons may comprise M=100 synapses per neuron. Some or all excitatory synapses may be plastic (STDP), with a random delay ranging between 1 ms and D=20 ms. The inhibitory->excitatory synapses may be non-plastic with a delay of D=1 ms. There may be no inh->inh synapses. The low-level END description of the model may be expressed as follows. The first Ne units may be populated by Ne excitatory units:

```
<unit of (exc)>
    unit_id = 1:800
```

Next, Ni inhibitory units may be records of the class are populated as:

```
<unit of (inh)>
    unit_id = 801:1000
```

The spnet class may be then declared as shown in the Listing 1 below:

Listing 1.

```
<unit_class>
    unit_class_id='QIF2'
    update_rule = 'v+=0.5*((0.04*v+5).*v+140−u+I);
v+=0.5*((0.04*v+5).*v+140−u+I);'
    event_condition = 'v>30'
    after_event_rule = 'v=−65;'
    initialization = 'float v=−65; float u=0.2*v; float I=0'
```

Listing 1.

```
<unit_class of (QIF2)>
    unit_class_id='exc'
    update_rule = 'u+=0.02.*(0.2*v-u);'
    after_event_rule = 'u+=8; last_spike=now'
    initialization = 'int last_spike=-1000;'
<unit_class of (QIF2)>
    unit_class_id='inh'
    update_rule = 'u+=0.1.*(0.2*v-u);'
    after_event_rule = 'u+=2;'
    Ne*M records of the class (exc->exc)
<synapse of (GLU)>
    pre = i        // i=1:Ne
    post = j       // a random number between 1 and N
    delay // a random number between 1 and D
    Ni*M records of the class
<synapse of (GABA)>
    pre = i             // i=Ne+1:N
    post = j // a random number between 1 and Ne
<synaptic_class>
    synaptic_class_id = 'GLU'
    initialization = 'float w=6; float sd=0; int last_active=-1000;'
    delay=1 // default delay (if not specified in the instance )
<synaptic_class>
    synaptic_class_id='GABA'
    delay=1 // the same for all synapses
<presynaptic_event of (EPSP_plus_LTD)>
    synaptic_class = 'GLU'
    post_unit_class = 'QIF2'// i.e., exc and inh
<presynaptic_event of (Inhibition)>
    synaptic_class = 'GABA'
    post_unit_class = 'QIF2'// i.e., exc and inh
<postsynaptic_event of (LTP)>
    synaptic_class = 'GLU'
    post_unit_class='exc'
<event_rule>
    event_rule_id = 'EPSP_plus_LTD'
    rule = 'I+=w; sd-=LTD(now-last_spike); last_event=now'
    initialization = 'LTD = {array};'
    // exponential decay from LTP_A=1.2 to zero with LTD_tau=20 ms
<event_rule>
    event_rule_id = 'LTP'
    rule = 'sd+=LTP(now-last_active);'
    initialization = 'LTP = {array};'
<event_rule>
    event_rule_id = 'Inhibition'
    rule = 'I-=5;'
    initialization = ''
<background_process>
    id = 'Weight_update';
    execution_condition = 'now%1000==0'
    domain = 'GLU'
    update_rule = 'w += 0.01+sd; if (w<0) w=0; if (w>10) w=10; sd *= 0.9'
<background_process>
    id = 'randominput'
    update_rule = 'exc[int(floor(rand( )/RAND_MAX*N))].v=30;'
```

The low-level description of the model (such shown in Listing 1 above) may contain information that is necessary to uniquely define network architecture. The description shown in Listing 1 may not be suitable for, inter alia, performing model simulations, because it may not provide a sufficient level of detail for one or more of synapse connections for individual units, the pre-synaptic connections, post-synaptic targets, and/or other information useful for performing model simulations. A linker uses (e.g., the linker 108 in FIG. 1) the low-level END description and (i) populates some or all of the links between the units; (ii) saves the code and the data in binary or some other low-level (machine) format so that to facilitate data and code loading by the computational engine during model simulations. During simulation execution (runtime) the engine may create save-points (that is saving the engine execution state comprising for example, registers and memory content, program counter, and/or information associated with the engine execution state) in the same (or a different) format, so to enable a rapid restart of model execution from any save-point.

In one implementation, the computational engine may comprise a single-processor computer. The engine performs a number of computational cycles (steps through the network) at predetermined time step. In some implementations, the time step may be set to one millisecond.

In some implementations, the computational engine may be implemented on a multi-core processing platform, an array of single/multicore processors, an FPGA, or a programmable logic fabric with one or more embedded processor cores.

Individual <_class> instances in the low-level END description may correspond to a separate loop execution loop. Computations within individual execution loops/cycles may be performed in parallel in an order that is optimized for multi-core implementations. Some cycles may be performed in parallel with other cycles. A given_code may be "pre-compiled" and included into the appropriate place in the engine.

In order to achieve execution efficiency during model simulations, neuromorphic hardware implementing the computational engine may have one or more of the following features: (i) fast highly specialized processing of neuronal dynamics and basic synaptic events, such as synaptic release; (ii) a general purpose processor (e.g., an ARM core) for performing of computational background processes, such as slow synaptic update, turnover, rewiring, short-term plasticity, and/or other background processes; and/or other features. Such configuration enables fast execution of the basic synaptic processing (that less likely requires frequent modifications by the user) for the majority of synapses while allowing for implementation of proprietary boutique processing for a smaller fraction of synapses.

One objective of a "minimal instruction set" implementation may be to provide a low-level description format may comprise (i) unit (neuron) definitions, which declare memory allocations but do not contain actions, (ii) junctions, which couple units, but do not allocate memory of their own; and (iii) rules, which link actions with units or junctions. In some implementations, the actions may be clock-driven (that is, executed for the appropriate units at individual time steps of the neuronal mode simulation execution). In some implementations, the actions may be event-driven, (that is, the actions may be triggered by units via, for example, an event_condition declared for the unit class, which informs the simulator on the actions that are performed upon the unit firing a spike. Such events (spike), hence, trigger execution of event-based rules that may be applied to other units or junctions.

Within the END framework a synapse can be declared as a unit comprising memory configured to store various variables associated with synapse functionality, such as synaptic weight, delay, target destination, and/or other information associated with synapse functionality. A synapse can be considered as pre-synaptic machinery that is ready to release transmitter. As with unit updates, synaptic update rules (e.g., maintenance 'w+=sd; sd*=0.9') may be clock-based or event-based. The synaptic action (e.g., release of neurotransmitter) may be triggered by a spike event at the unit corresponding to the pre-synaptic neuron. The rule describing the release can perform the depression part of the STDP and any of the short-term plasticity processes. The LTP part of STDP may be effectuated by a separate, other rule that may be triggered by the unit corresponding to the post-synaptic neuron. A junction specifies a connection between a synapse and a post-synaptic unit.

The minimal instruction set example of END enables construction of a simple event-based computer that has enough descriptive capacity to define an arbitrary neural network.

The syntax and structure of the classes and variables of the minimal instruction set example of END, described below, may be similar to the END 1.0 format describes supra.

```
<unit of unit_class>
    unit_id
    initialization
<unit_class (of unit_class)>
    unit_class_id
    initialization
<junction of junction_class>
    junction_id
    unit_1
    unit_2
<junction_class (of junction_class)>
    junction_class_id
    unit_class_1
    unit_class_2
<rule of rule_class>
    subject_id
``` the id of a unit or junction that is subject to this rule
    trigger_id
the id of the unit that triggers the rule for the subject (for event-based rules). If omitted, this rule may be clock-based.
    Delay
The delay with which this rule has to be executed. If omitted, there may be no delay

```
<rule_class (of rule_class)>
    rule_class_id
    execution_condition
``` e.g. 'now %10==0'. If omitted, then the rule may be executed individual time steps
    subject_class
the class to which this rule can be applied. Notice that subject class can be a unit or a junction Listing 2

```
    code
    event_condition
    initialization
    // First, allocate memory for neurons
<unit_class>
    unit_class_id = 'neuron'
    initialization = 'float v=-65; float u=0; float I=0; int last_spike=-1000;'
<unit_class of neuron>
    unit_class_id = 'exc'
<unit_class of neuron>
    unit_class_id = 'inh'
<unit of exc>
    unit_id = 1:800
<unit of inh>
    unit_id = 1:200
    // Now, assign dynamics to neurons (clock-based rule)
<rule_class>
    rule_class_id = 'QIF'
    subject_class = 'neuron'
    code = 'v+=0.5*((0.04*v+5).v+140-u+I); v+=0.5*((0.04*v+5).*v+140-u+I);'
    event_condition = 'v>30'
<rule_class of QIF>
    rule_class_id = 'RS'
    subject_class = 'exc'
    code = 'u+=0.02.*(0.2*v-u);'
```

-continued

Listing 2

```
<rule of RS>
    subject_id = exc(1:800)
<rule_class of QIF>
    rule_class_id = 'FS'
    subject_class = 'inh'
    code = 'u+=0.1.*(0.2*v-u);'
<rule of FS>
    subject_id=inh(1:200)
    // Specify the after-spike rest (event-based rule)
<rule_class>
    rule_class_id = 'reset'
    code = 'v=-65; last_spike=now;'
<rule_class of reset>
    rule_class_id = 'RS_reset'
    subject_class = 'exc'
    code = 'u+=8;'
<rule of RS_reset>
    subject_id = exc(1:800)
    trigger_id = exc(1:800)
<rule_class of reset>
    rule_class_id = 'FS_reset'
    subject_class = 'inh'
    code = 'u+=2;'
<rule of FS_reset>
    subject_id = inh(1:200)
    trigger_id = inh(1:200)
//specify synapses.
// Inhibitory synapses are not plastic.
<rule_class>
    rule_class_id = 'inhibition'
    subject_class = 'neuron'
    rule = 'I-=6'
// 200*100 records of the form below, each specifying an inh synapse
<rule of inhibition>
    subject_id = {an exc or inh unit}
    trigger_id = {an index of inh unit}
    //Excitatory synapses are plastic, so their weights are stored
<unit_class>
    unit_class_id = 'synapse'
    initialization = 'float w=5; float sd=0; int last_active=-1000;'
<unit of synapse>
    unit_id = 1:80000
    //for each synapse, specify its target. This is done via junctions
<junction_class>
    junction_class_id = 'GLU'
    unit_class_1 = 'synapse'
    unit_class_2 = 'neuron'
// Assign the synapses, i.e., create 80000 records of the form
<junction of GLU>
    junction_id = 1:80000
    unit_1 = 1:80000
    unit_2 = {random neuron index}
    // Specify which pre-synaptic neurons trigger which synapses
<rule_class>
    rule_class_id = 'EPSP_plus_LTD'
    subject_class = 'GLU'
    code = 'I+=w;sd-=LTD(now-last_spike);last_active=now;'
    initialization = 'LTD={array}'
<rule of EPSP_plus_LTD>
    subject_id = 1:80000
    trigger_id = exc(rand(800))
    delay = rand(20)
    // Specify LTP when post-unit fires
<rule_class>
    rule_class_id = 'LTP'
    subject_class = 'synapse'
    rule = 'sd += LTP(now-last_active)'
    initialization = 'LTP={array}'
<rule of LTP>
    subject_id = 1:80000
    trigger_id = {corresponding post-synaptic neuron, though this could in principle be anything else}
    //perform the sd-update (maintenance)
```

Listing 2

```
<rule_class>
    rule_class_id = 'synaptic_maintenance'
    subject_class = 'synapse'
    execution_condition = 'now%1000==0'
    code = 'w += 0.01+sd; if (w<0) w=0; if (w>10) w=10; sd *= 0.9'
<rule of synaptic_maintenance>
    subject_id = 1:80000
    // Finally, the random thalamic input that fires a neuron per ms
of time step
<rule_class>
    rule_class_id = 'input'
    code = 'fire({random neuron});'
<rule of input> // no parameters; just need this to instantiate the
input
```

The END 2.0 format may comprise the following features when compared to the END 1.0 format described, supra:
   No inheritance (no object classes);
   No background processes (global variables are used instead);
   No separate pre-synaptic/post-synaptic rules (some or all may be part of the synaptic type)
   Individual rules may include other rules and code strings, as well as execution conditions.

```
<rule>
    name
    exec_condition
``` the condition that may be evaluated at individual steps to determine whether or not to execute this rule. This can be a string e.g., 'now %10==0' or 'DA>0.1' or a reference to a rule name (this is useful if the condition needs some global tables). If absent, then the rule applies for individual execution time steps. This condition may access any variable that is defined in the code below.
   Code
the code string or other rule name that specifies what to do when the rule occurs. E.g., 'I+=w' or 'v+=tau*(2*(v+70)*(v+50)−u+I)/20; u+=tau*0.1*(2*(v+70)−u);'. In addition, the output of the rule can be a logical (true/false) statement that may be used in spike conditions. Multiple rule names can be provided here; they may be executed in the provided order
   init
declares and sets the values of global variables used in this rule. E.g. 'STDP={, . . . ,}; DA=0' or 'STP={, . . . ,}; LTD= { . . . }'. Any instance variables may be defined in unit_type and synaptic_type; the linker checks that individual data types defined in different unit_types and synaptic_types may be consistent with respect to the rule.

```
<unit_type>
    name
    update_rule
``` code string or rule name that may be executed at individual time steps. Multiple rules can be provided here; they may be executed in the order specified.
   event_condition
logical statement or rule name needed to detect spikes, e.g., 'v>30', executed at individual time steps
   event_rule
the code or rule name that may be executed when a spike is detected. E.g. 'v=−65;u=u−8;'
   Init
declares and sets the initial values of individual variables and parameters used in the unit (i.e., instance variables). The linker (compiler) checks that these variables have consistent data types among individual unit types that use the same rules, for example, 'analog v=0; analog g_AMPA=0;'

```
<unit of unit_type>
    unit_id
    init
``` sets the parameter and variable values that may be different from the default values in the definition of the type. Individual ones or these have to be declared and already initialized with default values in the definitions of unit_type

```
<junction_type>
    name
    update_rule
    init
<junction of junction_type>
    unit_1
    unit_2
    init
<synaptic_type>
    type
    presynaptic_event_rule
``` the code or rule name that may be triggered when the presynaptic neuron fires. This takes care of LTP and PSP
   postsynaptic_event_rule
the code or rule name triggered by firing of the post-synaptic unit. This takes care of the LTD part of STDP
   update_rule
   Code string or rule name that may be executed at individual time steps (e.g., may have execution_condition and may be executed rarely). Multiple rules can be provided here; they may be executed in the order specified. This may be needed for synaptic maintenance, in lieu of background processes.

```
<synapse of synaptic_type>
    pre
    post
    delay
    init
    <global_variable>
    update_rule
```

Rule name that initializes global variables and executes the code that updates them. The code may have access to specific instances of units, junctions, or synapses. In the simplest case, the rule can be just an assignment of the value of the global variable based on a value of an instance.
   Notice that instance variables may be used in <rules> but they may be defined in <unit_type>, <junction_type>, and <synaptic_type>. It may be assumed that individual declaration of instance variables may be consistent with some or all of the rules. There may be two problems:
   Situations where a variable may be used in a rule but is not defined in unit_type or junction_type or synaptic_type may be handled as follows:
   The linker may generate an error
   The linker uses a default type of the variable, e.g., "analog"
   The linker may be instructed to look at other usage of the rule and if the variable is defined somewhere, it extends its definition.

In some implementations, a variable can be defined differently in two or more unit_types that use the same rule. Again, there may be multiple possible solutions to this:

The linker generates an error

The linker converts one of the definitions to the other one. For example, there can be a partially ordered set of definitions, e.g., int8<int16<int32<int64<analog, so that two definitions may be transformed to the common one The linker splits the rule into two rules, rule_a and rule_b, that act on different types of variables Example 2

Global Variables

```
<rule>
name = 'DA_update'
code = 'DA = exc[3].v + inh[1].u'
init = 'analog DA = 0'
<global_variable>
update_rule = 'DA_update'
```

Example 3

Spnet

The standard spnet network has N=1000 neurons; among them may be Ne=800 excitatory neurons and Ni=200 inhibitory neurons, with M=100 synapses per neuron. Some or all excitatory synapses may be plastic (STDP), with random delay between 1 and D=20 ms. The inhibitory->excitatory synapses may be non-plastic with delay D=1 ms. There may be no inh->inh synapses. The low-level description of the model is below.

```
<rule>
name='QIF2' // only the v equation defined
code = 'v+=(0.04*v+5).*v+140+I; I=4*rand( )/MAX_RAND'
<rule>
name='spike'
code = 'v>30'
<unit_type>
name = 'exc'
update_rule = 'u+=0.02*(0.2*v-u); I-=u;'
update_rule = 'QIF2'
event_condition = 'spike'
after_event_rule = 'v=-65; u+=8; last_spike=now'
init = 'analog v=-70, u=-14, I=0; int last_spike=-1000'
<unit_type>
name='inh' // inhibitory neuron
update_rule = 'u+=0.1.*(0.2*v-u); I-=u;'
update_rule = 'QIF2'
event_condition = 'spike'
after_event_rule = 'v=-65; u+=2;'
init = 'analog v=-70, u=-14, I=0; int last_spike=-1000'
//Ne records of the class
<unit of exc>
unit_id = 1:800 // i=1:Ne
//Ni records of the class
<unit of inh>
unit_id = 1:200 // i=1:Ni
<rule>
name = 'EPSP_plus_LTD'
code = 'I+=w; sd-=LTD(now-last_spike); last_active=now'
init = 'LTD = {array};'
<rule>
name = 'LTP'
code = 'sd+=LTP(now-last_active);'
init = 'LTP = {array};'
```

```
<rule>
name = 'Synaptic_Maintenance'
execution_condition = 'now%1000==0'
update_rule = 'w += 0.01+sd; if (w<0) w=0; if (w>10) w=10; sd *= 0.9'
<synaptic_type>
name = 'GLU'
presynaptic_event_rule = 'EPSP_plus_LTD'
postsynaptic_event_rule = 'LTP'
update_rule = 'Synaptic_Maintenance'
init = 'analog w=6, sd=0; int last_active=-1000;'
<synaptic_type>
name='GABA'
presynaptic_event_rule = 'I-=5'
delay=1 // Default delay; the same for all synapses
//Ne*M records of the class (exc-> exc or inh)
<synapse of GLU>
pre = exc[i]// i=1:Ne
post = exc[j] or inh[j] // random, between 1 and Ne or 1:Ni
delay // a random number between 1 and D
//Ni*M records of the class (inh->exc)
<synapse of GABA>
pre = inh[i]// i=1:Ni
post = exc[j] // a random number between 1 and Ne
```

The END format 3.0 implements several major changes when compared to the END 2.0 format. These may include:

Introduction of One-Way Junctions

Splitting of the junction update_rule into two rules: the update_rule (configured to modify junction variables); and the delivery_rule (to configured modify the post-synaptic unit variables)

Removal of the postsynaptic_event_rule

Splitting of the presynaptic_event_rule into: the prepost_rule (for LTP part of STDP); the postpre_rule (for LTD part of STDP); and the delivery_rule (for delivering PSP)

Atomic addition for the delivery_rule (for junctions and synapses)

Removal of the clock-based synaptic update rule (it can be implemented via postpre_rule)

Implementing global variables via links to instance variables.

Individual names and statements in END 3.0 may have similar meaning to those in END 2.0 unless stated otherwise. For END 3.0, the syntax exc:3 may be used to refer to the instance 3 of the type 'exc'.

The presynaptic_event_rule can comprise multiple independent rules. For the purposes of this description, the designators t1 and t2 denote the times of spikes of the pre-synaptic neuron arriving at the post-synaptic unit (i.e., conduction delay may be already incorporated into t1 and t2), where the t2 corresponds to the current simulation time (also referred to as 'now').

The prepost_rule may be executed at any time before t1 to implement the LTP part of STDP that would correspond to a pair of pulses with pre-synaptic neuron firing at t1 and a subsequent post-synaptic neuron firing after t1 but before or at t2. While the prepost_rule rule has access to the system variables prepre (now−0) and prepost (post_spike−t1), it does not have access to any post unit variables or the system variable at time t2 ('now'), as it may be not clear when this rule is called. If prepost_mode=11 (1-to-1), then individual pre-synaptic spikes trigger 1 call for prepost_rule. If prepost_mode=1A (1-to-all), then individual pre-synaptic spike triggers prepost_rule for subsequent post-synaptic spikes (with its own prepost variable), up to the moment of the next pre-synaptic spike. The parameter prepost_max (if given) may limit the span of time after the pre-synaptic spike during which to consider post-synaptic spikes for prepost_ rule. For example, if the LTP window of STDP is only 50, then there may be no point of considering pairs of pre-post spikes with the interval greater than 50. In some implementations, prepost_rule may be called when the earliest post spike after t1 occurs later than t1+prepost_max. In some implementations, the rule may be not called if the post spike never occurs during the period between t1 and t2.

The postpre_rule may be executed just before time t1 in order to update the synaptic variables based on the timing of the previous pre-synaptic spike (prepre=t2−t1) and the last post_synaptic spike (postpre). The latter variable may be provided even if a long period of time has elapsed since the previous post spike occurred. The variable 'now' points to the current time, and individual variables from the post-synaptic unit may be available for reading.

The delivery_rule may be called at time t1, but after the postpre_rule updated the synaptic weights. The delivery_rule has access to individual ones of the variables of the latter rule, plus has write access for atomic addition to the variables of the post unit.

Listing 3

```
<rule>
    name
    exec_condition
    code
    init
<unit_type>
    name
    update_rule
    event_condition
    after_event_rule
    init
<unit of unit_type>
    unit_id
    init
<junction_type>
    name
    update_rule
    delivery_rule
    init
<junction of junction_type>
    pre
    post
    init
<synaptic_type>
    type
    prepost_rule
```

In the code example shown in Listing 3, the rule may be triggered before t2 and it modifies the synapse. The rule can read and write synaptic variables but does not have access to any variables from the post-synaptic unit. The rule has access to prepre=t2−t1 and prepost (post spike−t1).

prepost_mode

Two modes may be supported, 11 (1-to-1) and 1A (1-to-all). The former calls the rule at most once, while the latter calls multiple times for individual post unit spikes after the pre unit last spike. Default: 11 prepost_max limits the scope of time after the pre unit spike to consider to form pre-post pairs. Some or all post spikes after t1+prepost_max may be ignored.

postpre_rule the code or rule name that may be triggered at t2 and modifies the synapse. It can read and write synaptic variables and has read access to variables from the post-synaptic unit. It has access to prepre, postpre, and now=t2.

delivery_rule the code or rule name that may be triggered at t2 and modifies variables of the post unit. It has read access to synaptic variables, prepre, postpre, and now=t2. This code may be atomic addition.

```
<synapse of synaptic_type>
    pre
    post
    delay
    init
```

In some implementations, it can be desirable to model short-term synaptic plasticity, which may be triggered by pre-synaptic spikes. Often, this may require having a variable or a vector of variables that may be modified by individual pre-synaptic spikes and then evolves according to some equation, but only values of this variable at the moment of pre-pulses may be needed. In this case, the variable may be part of individual synapses. However, since the value of some or all such variables is the same for all synapses, a compiler (linker) from END to an engine can remove these variables from synapses and use a single pre-synaptic variable instead, subject to a "pre-rule". The END format may have a special tag or a label, or a statement that would help the compiler to identify such pre-event triggered variables in synaptic event rules or pre-synaptic unit event rules.

If the END program is distributed among multiple engines, then individual engines can transfer the value of such variables with individual pre-synaptic spikes. In some implementations, individual engines that receive synapses from such pre-synaptic unit can keep a local copy of the variable, updating it the same way as it may be updated in the engine that hosts the pre-synaptic unit.

The spnet network may comprise N=Ne+Ni=1000 neurons, where Ne=800 excitatory neurons and Ni=200 inhibitory neurons. Individual neurons may comprise M=100 synapses per neuron. Some or all excitatory synapses may be plastic (STDP), with a random delay ranging between 1 ms and D=20 ms. The inhibitory->excitatory synapses may be non-plastic with a delay of D=1 ms. There may be no inh->inh synapses. The low-level END 3.0 description of the model may be expressed as follows.

Listing 4

```
<rule>
    name='QIF2' // only the v equation defined
    code = 'v+=(0.04*v+5).*v+140+I; I=4*rand( )/MAX_RAND'
<rule>
    name='spike'
    code = 'v>30'
<unit_type>
    name = 'exc'
    update_rule = 'u+=0.02*(0.2*v-u); I-=u;'
    update_rule = 'QIF2'
    event_condition = 'spike'
    after_event_rule = 'v=-65; u+=8;'
    init = 'analog v=-70, u=-14, I=0;'
<unit_type>
    name='inh' // inhibitory neuron
    update_rule = 'u+=0.1.*(0.2*v-u); I-=u;'
    update_rule = 'QIF2'
    event_condition = 'spike'
    after_event_rule = 'v=-65; u+=2;'
    init = 'analog v=-70, u=-14, I=0;'
    //Ne records of the class
<unit of exc>unit_id = i // i=1:Ne
    //Ni records of the class
```

-continued

Listing 4

```
<unit of inh>
    unit_id = i // i=1:Ni
<rule>
    name = 'LTD'
    code = 'sd-=LTD(postpre); w += 0.00001*prepre + sd*10*(1-
0.9999^prepre); if (w<0) w=0; if (w>10) w=10; sd *= 0.9999^prepre)'
    init = 'LTD = {array};'
    // sd'=-sd/10 sec; 0.9999^x = exp(-x/10000); the rule could be
optimized so that 0.9999^x is computed only once: w+10*sd; sd*=..;
w-=10*sd;' It could be further optimized so that 10* is removed (but
LTP and LTD tables are scaled up by 10).
<rule>
    name = 'LTP'
    code = 'sd+=LTP(prepost);'
    init = 'LTP = {array};'
<synaptic_type>
    name = 'GLU'
    prepost_rule = 'LTP'
    postpre_rule = 'LTD'
    delivery_rule = 'I+=w'
    init = 'analog w=6, sd=0;'
<synaptic_type>
    name='GABA'
    delivery_rule = 'I-=5'
    delay=1 // Default delay; the same for all synapses
    //Ne*M records of the class (exc-> exc or inh)
<synapse of GLU>
    pre = exc:i// i=1:Ne
    post = exc:j or inh:j // random, between 1 and Ne or 1:Ni
    delay // a random number between 1 and D
    //Ni*M records of the class (inh->exc)
<synapse of GABA>
    pre = inh:i// i=1:Ni
    post = exc:j // a random number between 1 and Ne
```

Elementary network interface (ENI) can be implemented as a communication protocol that implements data exchange between two simulations described in the low level description END format or any other entity that may be required to send/receive data to/from a simulation (e.g. input device, visualization/debug tool, and/or other entities). The ENI may be strongly entwined with END itself, and it can be used to partition large END files into smaller pieces, ensuring correct results. Certain parts of ENI may require detailed knowledge of the END engine handling of communication events.

Figure 3:
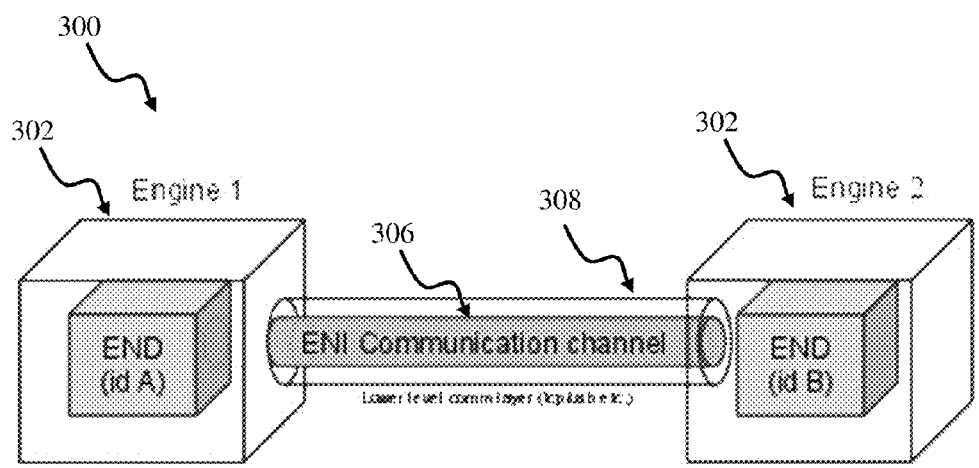
FIG. 3 is a block diagram illustrating one implementation of END simulations comprising ENI communications channel, according to the disclosure.

Referring now to FIG. 3, a generalized communication framework 300 between two computational engines 302 (individual ones running an END model simulation) is shown and described. The ENI communication protocol may be implemented in some physical means of communication (e.g. USB/Bluetooth for peripherals or Ethernet/Infiniband, for more demanding situations). Individual ones of the computational engines 302 may implement the ENI (the communications pipe denoted as 306 in FIG. 3) on top of the transport layers available (the communications pipe denoted as 308 in FIG. 3). Note that ENI forms a layer of communication between models described by END, and not between the engines 302 themselves.

In some implementations, the engines 302 may be connected by the low level transport layer may discover each other and pair automatically. Manual setup may be possible (e.g. for engines connected via IP protocol). The communication specification file (ENI file) may be supplied along with the END file to the engine. Once the engine discovers that it is paired with another engine that runs the right END file, the ENI channel may be negotiated and established (green pipe in FIG. 1). The ENI communication specification file can be regarded as a mapping, which helps both parties to understand each other and target the right units of the right classes.

Figure 4:
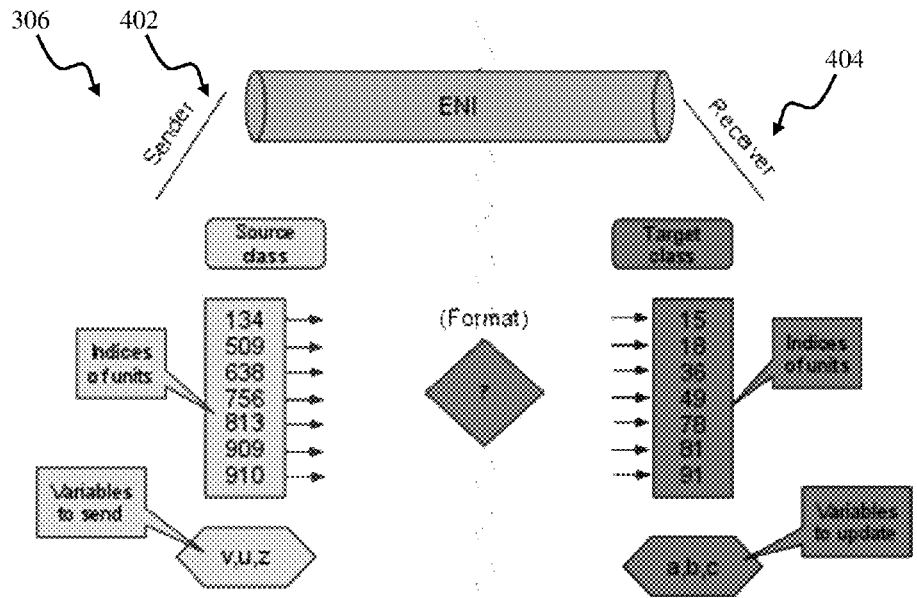
FIG. 4 is a block diagram illustrating ENI communications channel, in accordance with one implementation.

FIG. 4 shows a block diagram of ENI communications channel 306 of FIG. 3. The channel 306 may be defined by its endpoints (the IDs of the low level END description, such as the END A and END B in FIG. 3) and a set of parameters that describes how the communication is performed and what type of information may be communicated. The communication channel 306 may be unidirectional, going from left to right direction, and may be defined by the sending entity 402 and the receiving entity 404. The data transfer may be one way (though negotiation and meta information in the transport layer are not restricted).

The ENI channel parameters may include one or more of:
1. Sender and receiver END ID's and an identifier that uniquely identifies the channel;
2. Sender and receiver classes;
3. Sender and receiver class instances (enumerated by their number within the class);
4. Content: events/spike notifications or values of certain parameters;
5. Format of the data sent;
6. Modes of operation (sync, async) and their parameters (frequency, phase shift, and/or other parameters);
7. And/or other parameters.

In one implementation, the ENI communication channel may be used to exchange (i) spike (event) notifications and (ii) values of selected class parameters (variables). These two content types may require different data sent through the channel, namely:
1. Unit indices (for spike notifications)
2. The actual values of variables (of some or all instances transmitted by the channel)

In one implementation, network unit indices interleaved with values variables. Such implementation may be applicable when the values need to be sent for the units that experienced an event (spike), so as to minimize network traffic. To summarize, the following data formats may be supported:
Indices (some units) either with values or not. If the values are missing, then the data may be interpreted as a spike notification.
No indices (some or all units) but only values. (If the values are missing then the data may be interpreted as a spike notification of individual ones of the units involved).

These two content types (i.e., events and data) are not mixed in a single ENI channel instance. In some implementations, whenever the ENI channel is set to transmit events/spike notifications, the target units may be ("artificially") fired; that is, the event may be scheduled on the receivers spike queue but any post event actions like LTP or reset are not performed. In some implementations, the units that can be fired externally do not have any local incoming synapses that may be subject to plasticity rules (e.g., LTP). In some implementations, the units may be configured to respond to both the external firing triggers and plasticity rules such that whenever they may be fired externally, the post event rues are not invoked. Such configuration ensures simulation consistency and enables split-simulations produce the same outcome as a "single simulation". Therefore, when partitioned appropriately, it may be (considering the restrictions above) possible to obtain the same results with the splits simulations as with the single simulation. In some implementations, the model partitioning may be facilitated via an introduction of special fake/receiving units as required.

FIG. 4 illustrates content, formats and expected behavior in the ENI communications channel. In the case of transmitting values of variables, the channel description specifies the set of variables of the sender and receiver classes. In other words, ENI specifies which variables within the source class may be mapped to which variables in the target class. The consistency requirement may be that either the internal representation of the variables sent through the channel may be compatible between sender and receiver or the communication channel performs necessary conversions. After individual communication events, the values in the target class may be updated to the new values.

In some implementations, the ENI channel transmits data related to units in END format. In some implementations, the data related to synapses or junctions (e.g., synaptic weights or other variables) may be transmitted.

The ENI channel can introduce a mapping from certain elements of the source unit class in the END format to certain elements of the target class. Individual channels establish communication between one sender class and one receiver class. The mapping establishes the indices that may be sent through the wire (refer to the FIG. 4), if spike notifications are being sent, or the order of values if parameter values may be communicated.

The ENI channel need not send information at individual model simulation cycles. The ENI files specify the periods T1, T2 (expressed in engine model simulations cycles) of sending/receiving. The designator T1 corresponds to the sending side period (so the data may be sent only every T1 cycles), T2 describes the receiver side (data may be expected to have been delivered to the simulation every T2 cycles). The data may be delivered to the engine at any point, but the engine may keep (buffer) it and may make it available to the running simulation at the appropriate receiving point.

The ENI communication channel may be configurable to operate in two modes—synchronous and asynchronous. In synchronous mode, the transmission and delivery may be synchronized to the nearest simulation cycle. In asynchronous mode, the (input) data may be continuously provided to the computational engine and delivered to the respective units of the simulation instance whenever it is ready. While the synchronous mode ensures timely delivery of data it may cause serious performance bottlenecks for high input data rates. Conversely, the non-synchronous mode may cause undefined model behavior due to variable data delivery times.

Figure 5:
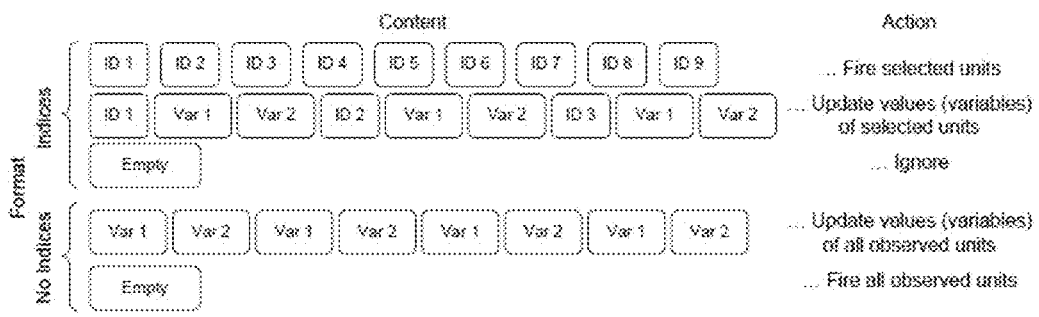
FIG. 5 is a block diagram detailing content, formats and expected behavior in ENI, in accordance with one implementation.
Figure 6:
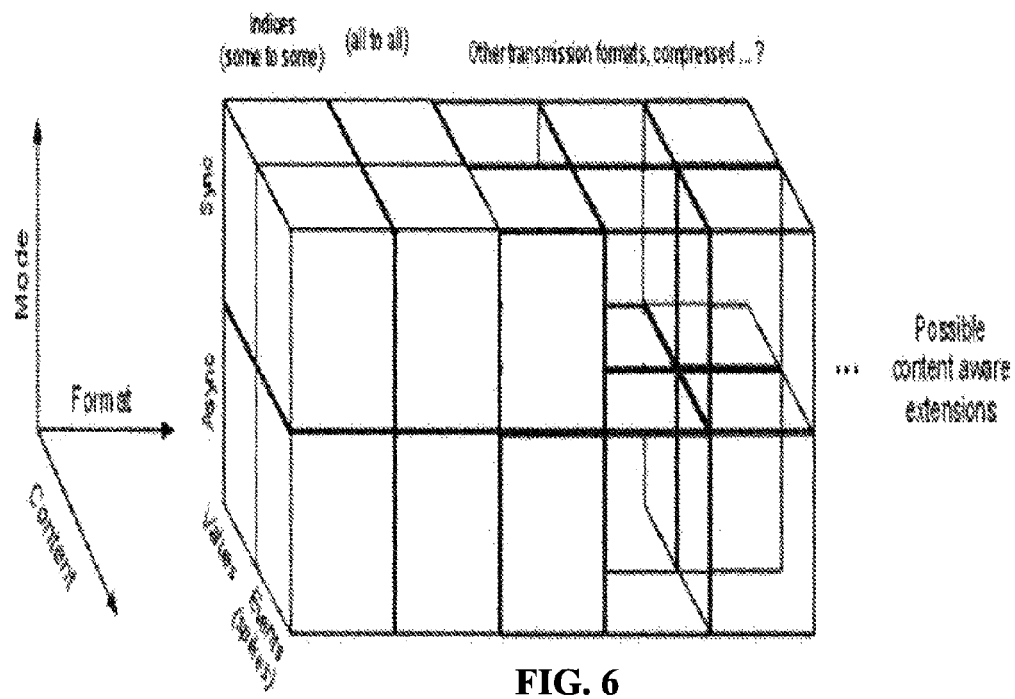
FIG. 6 is a graphical illustration depicting modes of operation of the ENI (scheme), in accordance with one implementation.

FIG. 5 presents examples of modes of operation of the ENI (scheme). Combined two formats, two content types and two modes of operation form a cube as illustrated in the implementation FIG. 6. In some implementations, the ENI may be extended in terms of possible data formats and may include content aware compression.

In one implementation of the synchronous mode, it may be assumed that the receiving engine cannot proceed through the data receiving point unless the necessary data has arrived (so the receiver synchronizes with the sender). The channel in that mode specifies additional property—namely the phase shift S. If the shift S>0 the engine may proceed with the simulation if the data packet sent S cycles ago has arrived (since engines are synchronized it does not matter whether these are sender or receiver cycles). The phase shift allows for better utilization of the communication channel whenever the actual structure of neuro-simulation allows for it (that is certain projections sent through ENI channel have delays that can be used to relax requirements for the channel and introduce the shift, see FIGS. 7A and 7B). The underlying transport may introduce priorities to channels based on their phase shift (the time required to deliver the data).

The sender can proceed with other tasks after the data may be sent without waiting for any delivery notification, however if the message may be not delivered, the next attempt to send data over the channel may hold the simulation. (The sending engine may not proceed if more than S non-confirmed deliveries occur in a synchronous channel with phase shift S).

In some implementations, particularly where applicable to the non-synchronous (i.e., asynchronous) mode, the frequency of sending and receiving data may be specified, but the engine does not stop its execution until the data may be sent. On the receiving side, the asynchronous mode does not impose any data delivery timing restrictions. In some implementations, the computational engine may be configured to receive the data arriving in indivisible chunks (block transfer). In some implementations, the data may be transferred via a stream (streaming transfer). Other examples may be possible, such as, for example, a combination of block and streamed transfer. In the block transfer sub-mode, the transmitted message may be assumed to be delivered after data within the block has been delivered to the receiver (e.g., the receiver 404 in FIG. 4) and the communication transaction may be completed. In the streaming sub-mode, the data that becomes available at the receiver may be gradually transmitted to the engine, regardless of whether the transmission transaction has completed or not.

In the asynchronous block mode it may be assumed that the latest message is actually delivered to the engine, while others received before the engine encountered the receiving point may be discarded (It might be useful when a real-time input device (like a camera) is sending data in non-synchronous mode faster than the engine can handle). The asynchronous streaming mode accumulates the data, and delivers it at the closest receiving point.

Figure 7A:
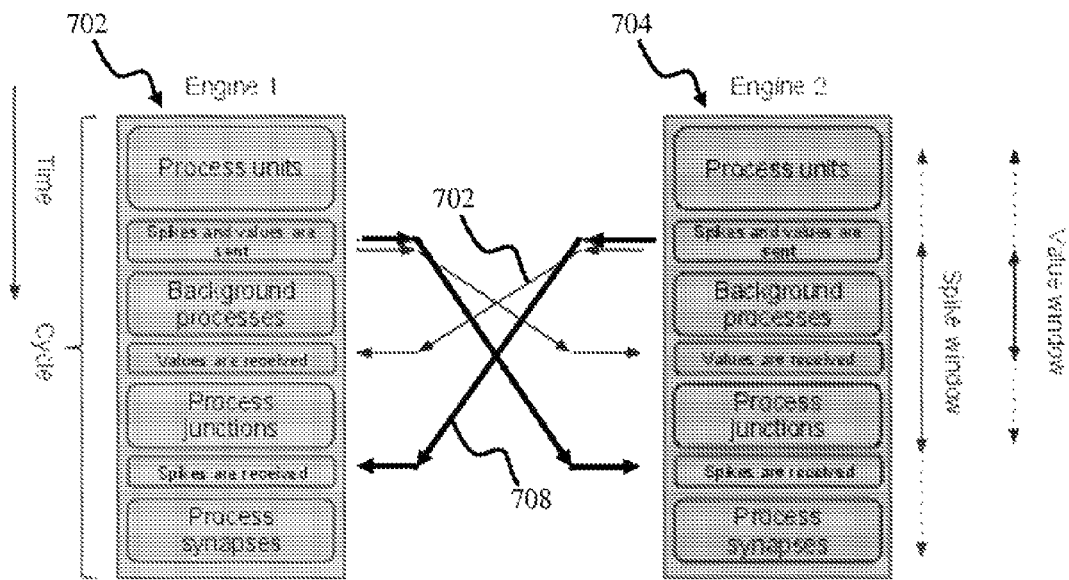
FIG. 7A is a block diagram illustrating a fully synchronous communication over the ENI channel, in accordance with one implementation.
Figure 7B:
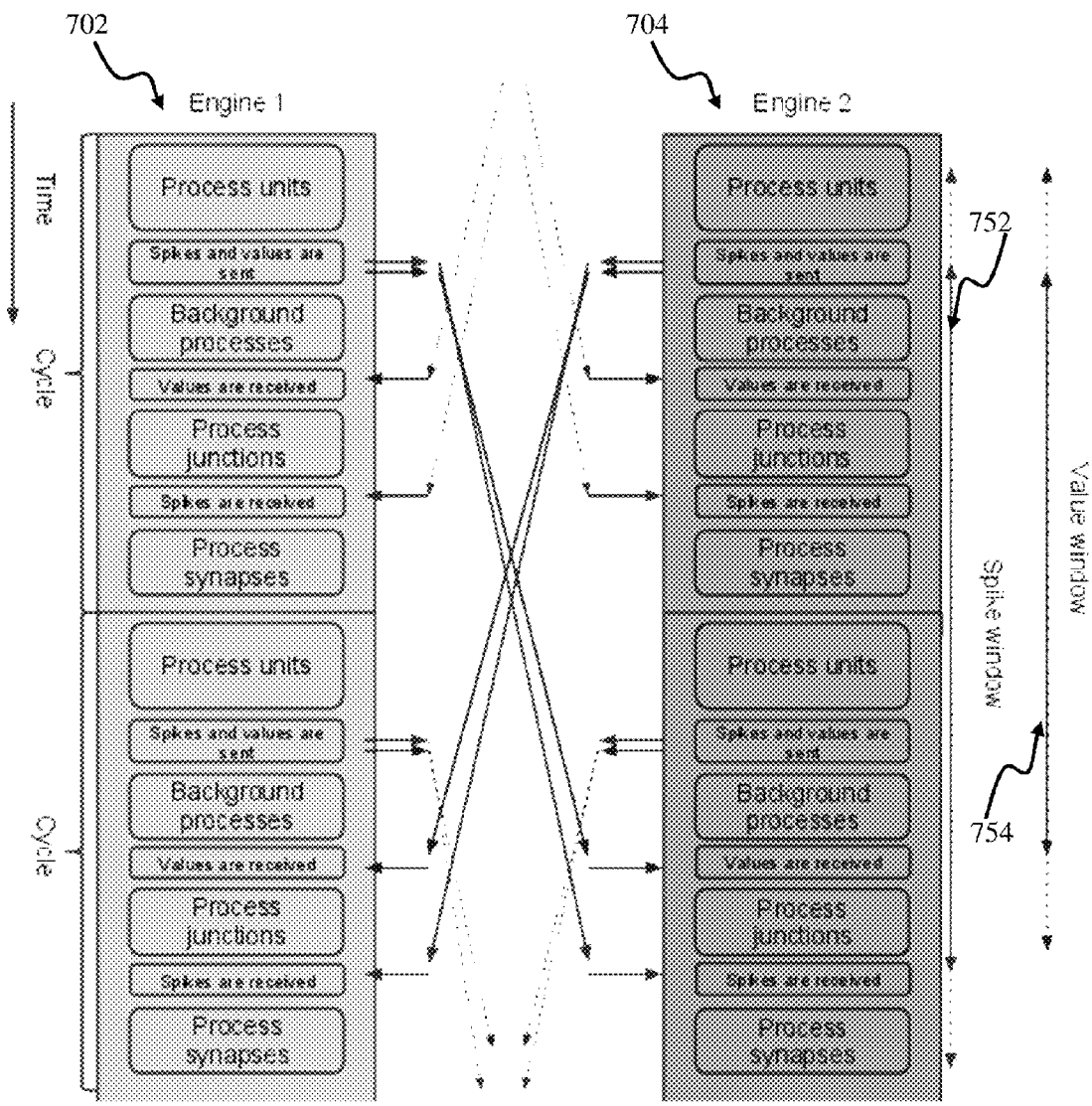
FIG. 7B a block diagram illustrating synchronous communication of the implementation of FIG. 7A with a shift (S=1 in both directions), in accordance with one implementation.

FIG. 7A illustrates one example of fully synchronous communication between two computation engines 702, 704. The implementation of FIG. 7A can ensure timely data exchange between the engines 702, 704, and can reduce communications delays, thereby minimizing potential communication channel jamming due to delays that may be associated with heavy and uneven data flows in large, real-time neuronal model simulation runs. In some implementations, various data transfer optimization may be used, which significantly expand the communication bandwidth. In FIG. 7B, the event indices and data values may be sent through separate ENI channels (denoted by the heavy and thin arrows 706, 708, respectively, in FIG. 7A), and have separate receiving points FIG. 7B illustrates one example of synchronous communication with a phase shift of one system clock cycle (simulation step) (S=1 in both directions). The communication channel is used more evenly due to the window overlap (as indicated by the vertical arrows 752, 754 in FIG. 7B, but spikes and values arrive with a delay of 1 ms/step.

The sending point refers to a logical constrict of the simulation model which may be used to describe the data and events that become available immediately after processing of units during model execution by the computational engine. Similarly, the receiving point may be used to describe data staging container used before processing junctions during individual simulation cycles. Such an arrangement may leave a short communication window but the following optional optimization may be possible:

The sending driver processes units in a priority order and sends out the data as soon as they become available while other units are still being processed by the engine in parallel.

The receiving driver executes local junctions while still awaiting for the necessary data to arrive.

If the channel sends spike notifications, the computational engine can process synapses from local units before receiving the data on spikes from non-local units. In such a case the communication window can be significantly expanded (as denoted by dotted arrows in FIG. 7B).

Listing 5 illustrates one example of an ENI definition file (known to sender/receiver drivers) useful in a network simulation that uses END. It will be appreciated by those skilled in the arts that while the examples below shows some or all of the data that may be required to set up a channel, the actual format of that file might change to XML or some other format.

Example 4 describes engine simulations where 'Retina' END file sends indices of selected units from class 'RGC' that fired to the engine running 'LGN' END file. Selected elements of class 'exc' are fired. The communication may be synchronous, synchronization points appear at individual cycles on one or both of the sender or receiver, and the channel may have no shift (delay).

Listing 5

```
ENI_ID = 'CommC'
SOURCE_ID = 'Retina'
// id of the source END file (simulation)
TARGET_ID = 'LGN'
// id of the target END file (simulation)
MODE = SYNC
T1=1
// sender sync frequency - when to send data (in simulation cycles)
T2=1
// receiver sync frequency - when to expect data (in simulation cycles)
S=0
// receiver phase shift
FORMAT = INDICES
// Only spiking units will be observed by the channel
SENDER_VALUES = NONE
// only indices will be sent, that is channel will fire target units
RECEIVER_VALUES = NONE
SENDER_CLASS = 'RGC'
RECEIVER_CLASS = 'exc'
NUMBER_OF_UNITS = 500
// How many units will be observed by the channel?
SENDER_UNITS = 84 23 395 39 201 34 ...
RECEIVER_UNITS = 33 45 67 98 18 34 19 ...
```

Example 5 illustrates engine simulations where the 'Camera' END may asynchronously send values of 'R, G, B' variables in class Pixel, to variables 'Red, Green, Blue' of class RGC in the Retina END file.

Listing 6

```
ENI_ID = 'ENI2'
SOURCE_ID = 'Camera'
// id of the source END file (simulation)
TARGET_ID = 'Retina'
// id of the target END file (simulation)
MODE = ASYNC
STREAM = NO
// the receiver will not accumulate data (only the latest data will be delivered to the engine)
T1=1
// sender sync frequency - when to send data (in simulation cycles)
T2=2
// receiver sync frequency - when to expect data (in simulation cycles)
FORMAT = NOINDICES
// All values will be sent every time
SENDER_VALUES = 'R,G,B'
// values of those variables will be sent
RECEIVER_VALUES = 'Red,Green,Blue'
// Values of those variables will be updated
SENDER_CLASS = 'Pixel'
RECEIVER_CLASS = 'RGC'
NUMBER_OF_UNITS = 1024
```

-continued

Listing 6

```
// How many units will be observed by the channel?
SENDER_UNITS = 1 2 3 4 5 6 7 8 9 10 11 ...
RECEIVER_UNITS = 33 45 67 98 18 34 19 ...
```

Figures 12, 13:
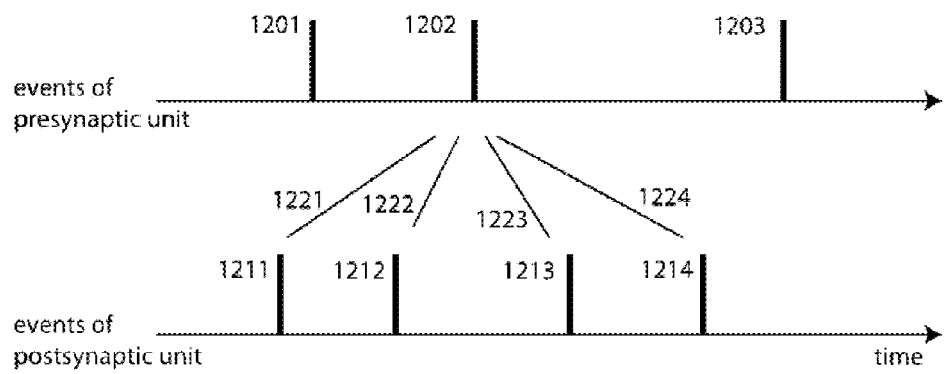
FIG. 12 is a block diagram illustrating the doublet-event rule implementing Spike-Timing Dependent Plasticity (STDP), in accordance with one implementation.
FIG. 13 comprises a table listing possible values of communications parameters, in accordance with one implementation.

The table shown in FIG. 13 lists exemplary values of communications parameters used in Listing 6:

In some implementations, many ways exist to handle a large neuro-simulation model (defined, for example, using a high level description format). In some implementations, the processing may be performed by a single processing computational engine. In some implementations, the processing may be distributed within a set of several computational engines (computing nodes). In order to achieve efficient workload distribution the model needs to be partitioned. In some implementations, one large low-level description (END file) of the model may be generated and the partitioning may be performed by the distributed computational engine. This example offers benefits of real time load adjustment and rebalancing, but is technically more complex and may require an advanced distributed load controller. In some implementations, the model may be partitioned into a set of END files and ENI communication channels, which may be executed separately from one another. There may be a way to split a neuro-simulation into parts using ENI, possibly by introducing additional "fake" units.

Figure 8:
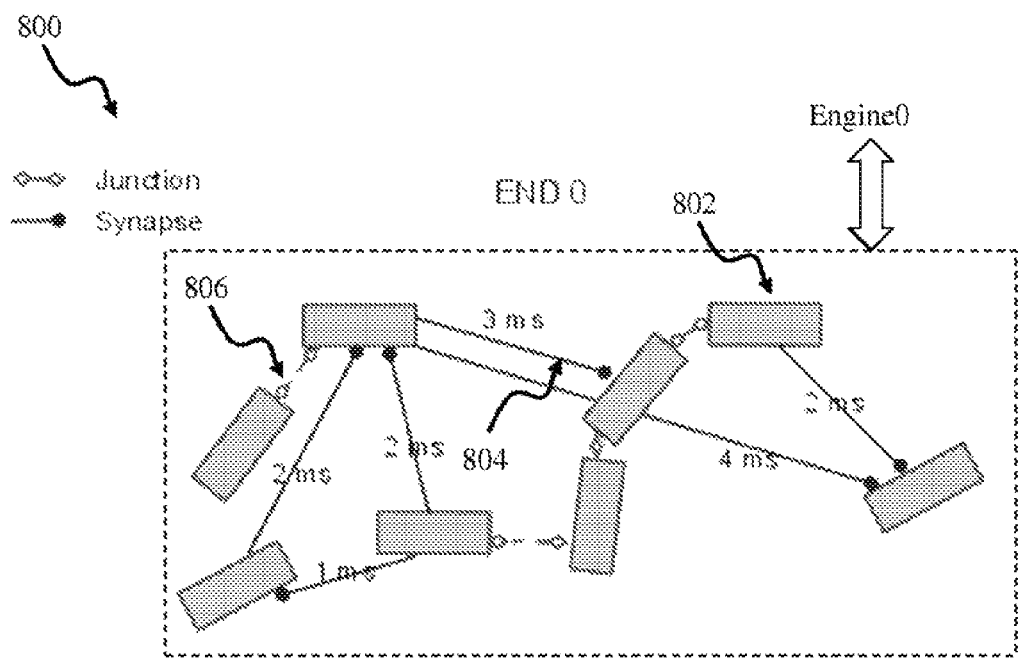
FIG. 8 is a block diagram illustrating a sample communication model with junctions and synapses with delays, in accordance with one implementation.
Figure 9:
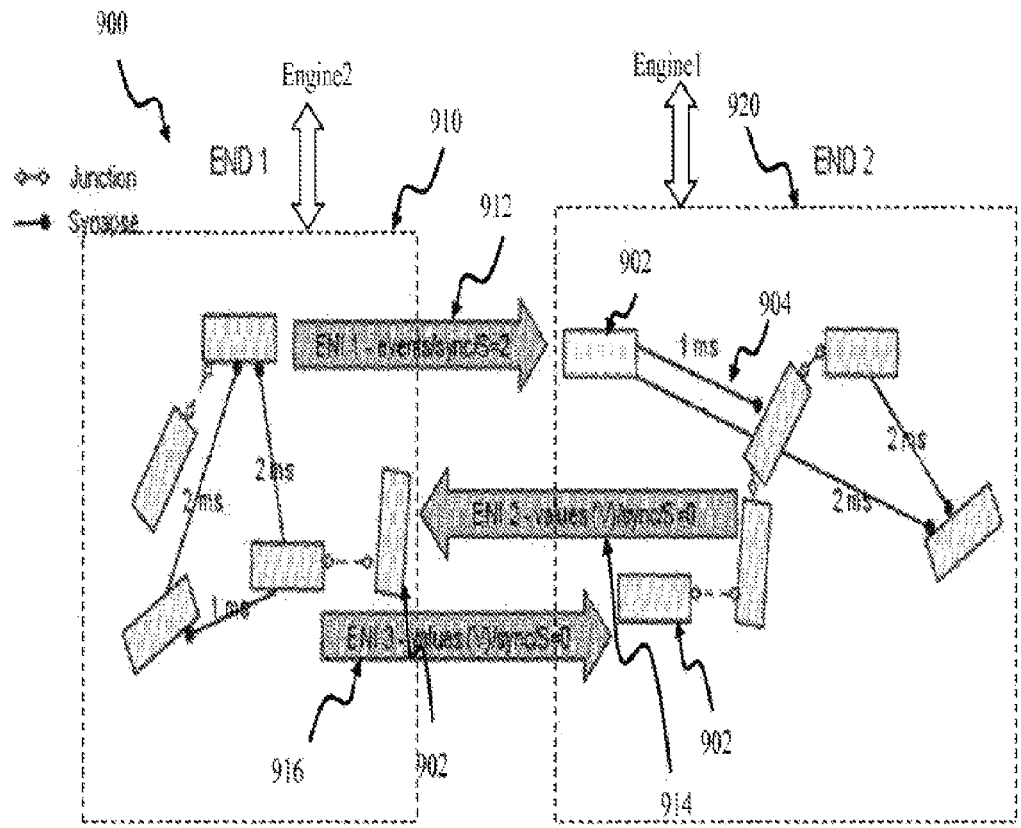
FIG. 9 is a block diagram illustrating communications model comprising ENI channels, according to one implementation.

FIGS. 8 and 9 illustrate one example of model partitioning according to certain aspects of the present disclosure. FIG. 8 shows the END model 800 comprising of several units 802, synapses 804 and junctions 806 and described using the END file END0. The numerals along the synapses 804 denote synaptic delays. The model 800 simulation may be executed using a single computational Engine0.

FIG. 9 illustrates partitioning of the model 800 into two partitions 910 and 920, described using the END files END1, END2, respectively. The partitions 910, may be interconnected using three ENI interfaces: ENI1, ENI2, ENI3, denoted as 912, 914, 916, respectively in FIG. 9. Some additional 'fake' units have been introduced (rectangles marked as 902). Because the ENI 1 channel has a phase shift S=2, the channel communication delay may be compensated by using smaller delays of the target synapses, as illustrated by a comparison of the synapses 804 and 904 in FIGS. 8 and 9, respectively. Note, that such implementation may be possible when there are no synapses of minimal delay (e.g., 0) in the original model (the model 800) along the partition line that may be replaced by an ENI channel. The compiler from a high-level definition language can take into account the delays while splitting the simulation to optimize communication (e.g. enlarge the communication window, balance the amount of data sent, and/or other operations to optimize communication). Simulation of the model 900 may be executed using two computational engines: Engine 1 and Engine 2, as illustrated in FIG. 9. The multi-partition simulation 900 may be capable of producing the same simulation results, compared to the single partition simulation implementation 800, providing the distributed computational Engine1/Engine2 has sufficient numerical precision to avoid rounding errors.

In some implementations of partitioned model (not shown), the following features may be implemented:

On the fly ENI channel setup and link negotiation (for dynamic debugging and monitoring);

Support for additional data formats, e.g., analog.

Support for dedicated hardware infrastructure to run ENI;

A convenient and intuitive way to specify ENI format

As described above with respect to the distributed model simulation (such as the partitioned mode 900 of FIG. 9), the model can be split into several partitions (e.g., the partitions 910, 920). Individual partitions may be executed on a single computational engine (engine1, Engine 2 of FIG. 9. In some implementations, the computational engine may comprise a single processing unit (CPU) implementation. Individual computational engines may comprise multiple processing units (PU), such as, for example, CPU, FPGA, MCU, running in parallel. Such parallelization enables a substantial increase in the model simulation throughput (that may scale with the number of parallel PUs). To enable parallel model execution, the simulation domain may be divided into several processing blocks (processing domains), individual blocks being assigned to individual PUs. Individual processing blocks may be configured to (i) keep track of local compartments, local spike queues, and/or other local information; (ii) store list (table) of incoming "synapses" (not applicable for END 3.0); and store s list of local junctions which can be processed without locking. Compartments may be tagged with domain id-s, which may be informed whenever they spike. When such an externally visible compartment spikes, the appropriate information may be sent to neighboring domain, which does the rest of processing (e.g., synaptic queues).

For individual steps, the voltages of compartments connected via external (remote) junctions may be sent to their target domains. Respectively, received voltages may be used to compute junction currents.

The data that the processing domains may be exchanging are one or more of: (i) the spikes; or (ii) junction voltages (or some other variables that are transmitted across junctions). Since most junctions will be of dendritic type (local), the amount of data in individual exchanges may not be large (if the domain division takes dendritic junctions into account).

In some implementations, a heterogeneous parallelized computational engine may be implemented using multi-core symmetric multiprocessors (SMP) hardware. In some implementations, the SMP implementation may contain a graphical processing unit to implement.

Figure 10:
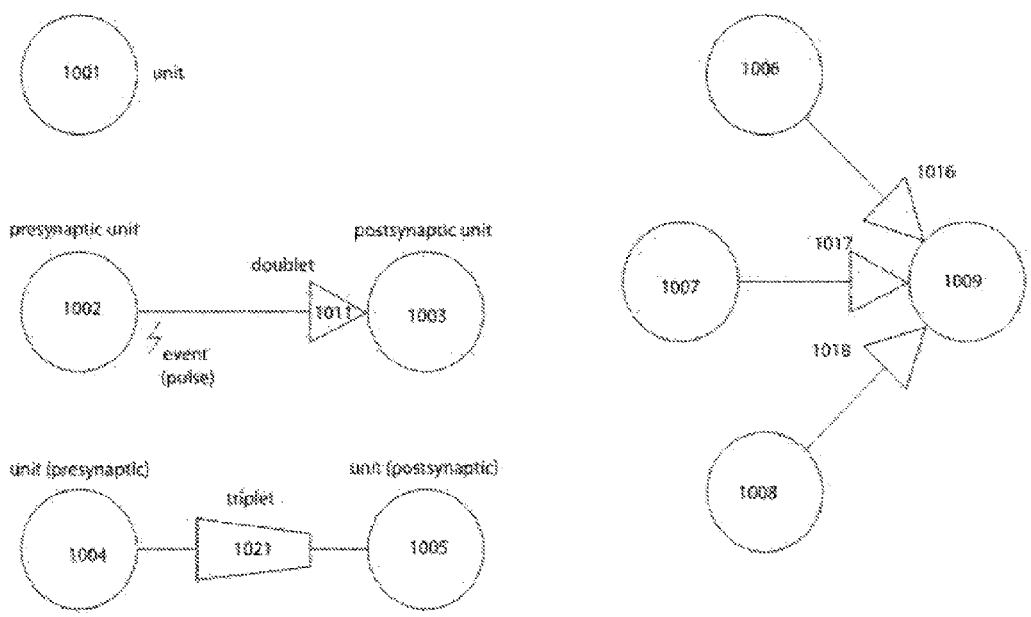
FIG. 10 is a block diagram illustrating various exemplary of the END engine, in accordance with one implementation.

FIGS. 10 through 12 describe different exemplary implementations of the disclosure that do not depend on the syntax of the END language. FIG. 10 illustrates the three basic structures of the END engine, which can be implemented on a standard CPU, GPU, or in an integrated circuit (e.g., an ASIC). These may be the "unit" 1001, the "doublet" 1011, and the "triplet" 1021. The END engine handles the execution of the unit, doublet, and triplet rules and the access to the memories of these elements. The END formats above can be treated as the hardware specification language that would configure a semiconductor circuit having such units, doublets, and triplets that executes a specified neuronal network.

In some implementations, individual basic structures (unit, doublet, and triplet) may be implemented as a single thread on a multi-thread processor. In some implementations, individual structures may be implemented as a super-unit, super-doublet, and super-triplet that may comprise dedicated circuits configured to processes units, doublets, and triplets respectively using time multiplexing (possibly, three different circuits for units, doublets, and triplets).

In some implementations, the unit 1001 represents a neuron or a part of a neuron, e.g., a dendritic compartment. In some implementations, the unit 1001 represents a population of neurons, with the activity of the neuron representing a "mean-firing rate" activity of the population or some other mean-field approximation of the activity of the population. Individual units may have their own memory variables and an update rule that describes what operations may be performed on its memory. The operations can be clock-based, i.e., executed at individual time steps of the simulation, or they can be event-based, i.e., executed when certain events may be triggered. The unit update rules may not involve variables that belong to other units. Hence the execution of the unit update rule may be independent on the order of execution of unit update rules of other units, thereby enabling parallel execution of the unit update rules.

Depending on the values of the unit variables, the units may generate events—pulses or spikes—that trigger synaptic events in other units via doublets. For example, a unit 1002 in FIG. 10 can influence unit 1003 via the doublet 1011, which represents a synapse from pre-synaptic neuron (pre-synaptic unit 1002) to post-synaptic neuron (post-synaptic unit 1003).

Units can have after event update rules that may be triggered after the event is triggered. These rules may be responsible for modification of unit variables that are due to the events, e.g., the after-spike resetting of voltage variables.

Individual doublets may have their own memory variables, and may access variables of the post-synaptic unit. The access may include read and write. Individual doublets may have a doublet event rule that makes a change to the doublet memory, to implement synaptic plasticity, and the post-synaptic unit memory, to implement delivery of pulses. The doublet event rule encompasses the synaptic rules described in the END formats above.

Since multiple doublets (e.g., 1016-1018 in FIG. 10) can connect corresponding multiple pre-synaptic units 1006-1008 to a single post-synaptic unit 1009, it may be desirable that the doublets modify the post-synaptic unit memory in parallel or in arbitrary order and the result be order-independent. This may be easy to achieve if the operation on the post-synaptic unit memory is atomic addition (as in GPUs), atomic multiplication (which is equivalent to addition via logarithmic transformation), or resetting to a value (with individual doublets trying to reset to the same value). In some implementations, the post-synaptic unit variable that is being modified by the doublet event rule may not use in the rule. The result may depend on the order of execution of doublet event rules.

In the context of neural computations, it may be desirable to have an axonal conduction delay, so that there may be a time-delay between an event generated by a pre-synaptic unit and the execution of the doublet event rule triggered by the unit. The delay can be implemented as a buffer, so that individual doublets receive the event with some delay. That is, the END engine registers an event generated by a pre-synaptic unit and puts a special marker into a delay-line queue depending on the magnitude of the delay. The delay may be counted down and then the event transmitted to the doublet for the execution of the doublet event rule.

Figure 18:
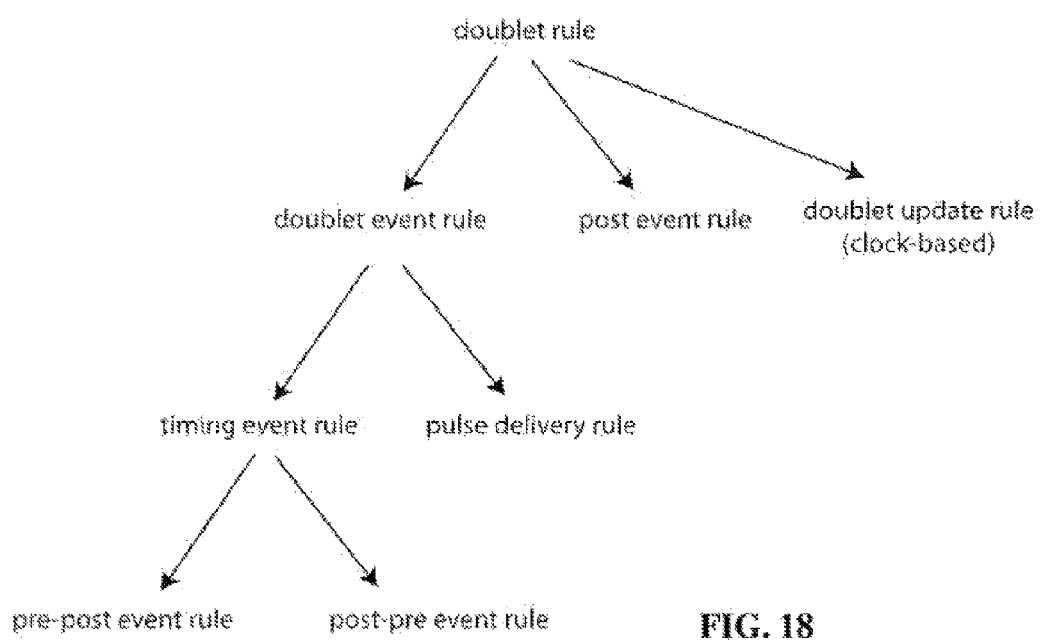
FIG. 18 is a block diagram illustrating logical flow of the doublet event rule in accordance with one implementation.
Figure 11A:
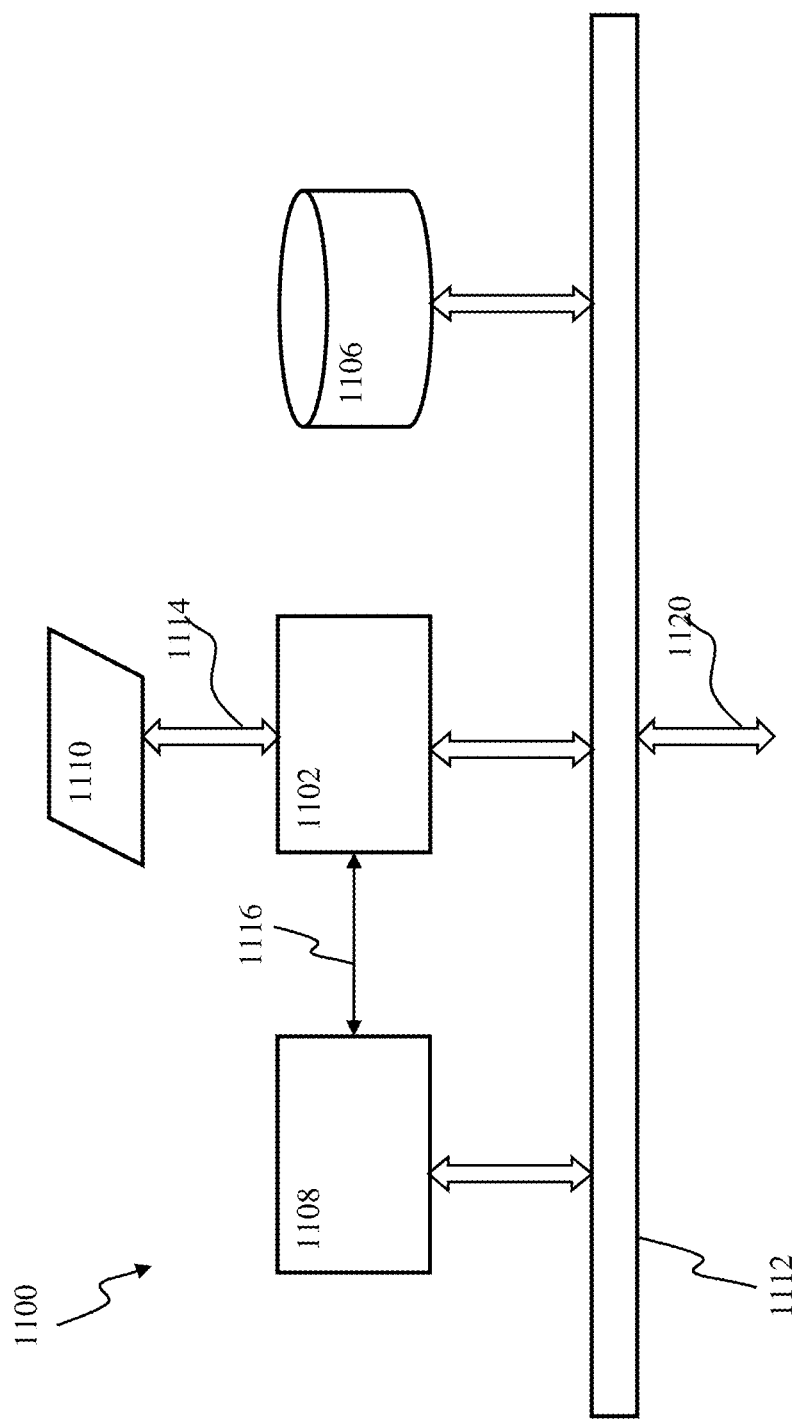
FIG. 11A is a block diagram illustrating computerized system useful for, inter alia, providing a conditional plasticity mechanism in a spiking network, in accordance with one or more implementations.
Figure 11B:
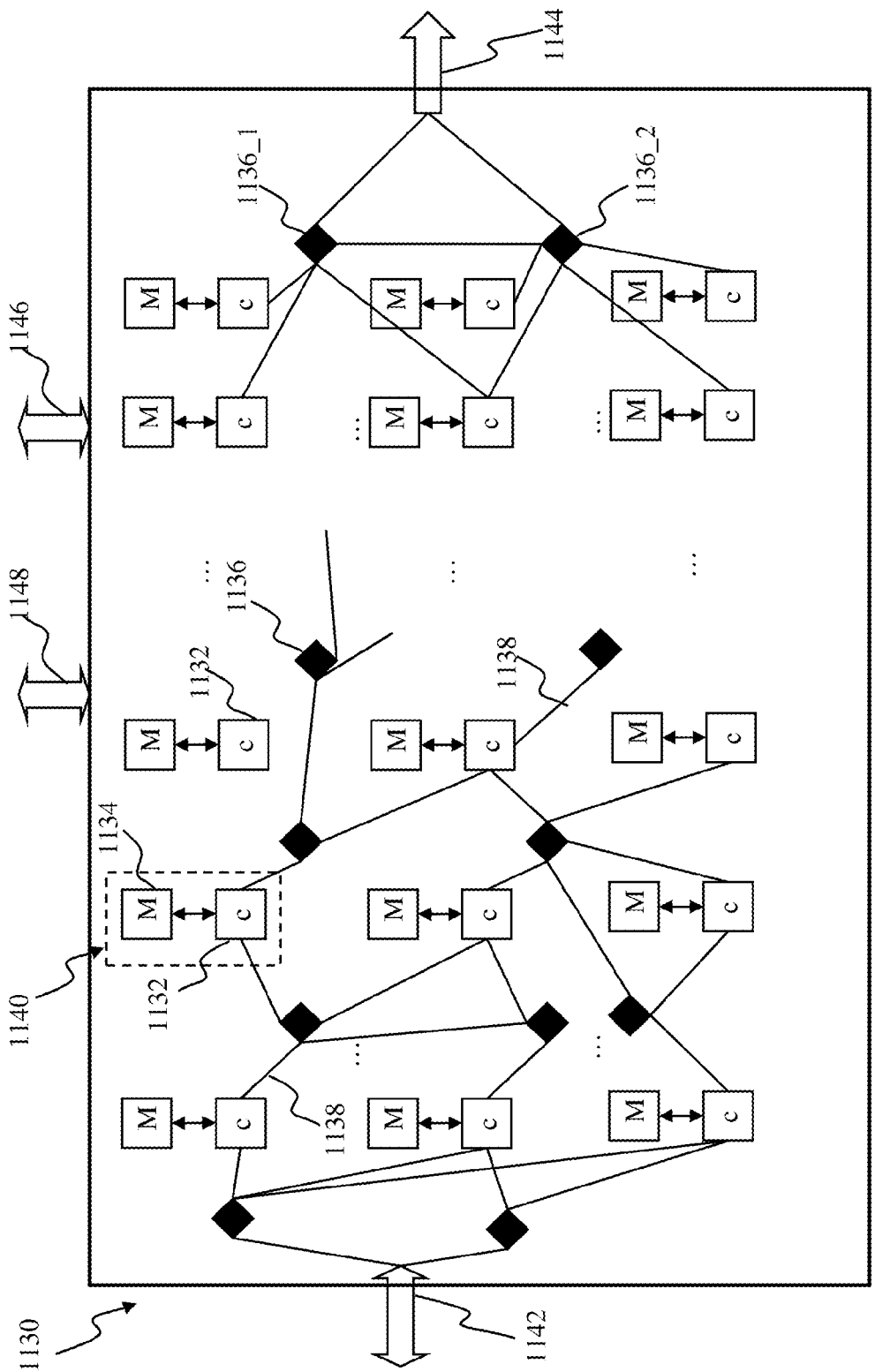
FIG. 11B is a block diagram illustrating a neuromorphic computerized system useful with, inter alia, a conditional plasticity mechanism in a spiking network, in accordance with one or more implementations.
Figure 11C:
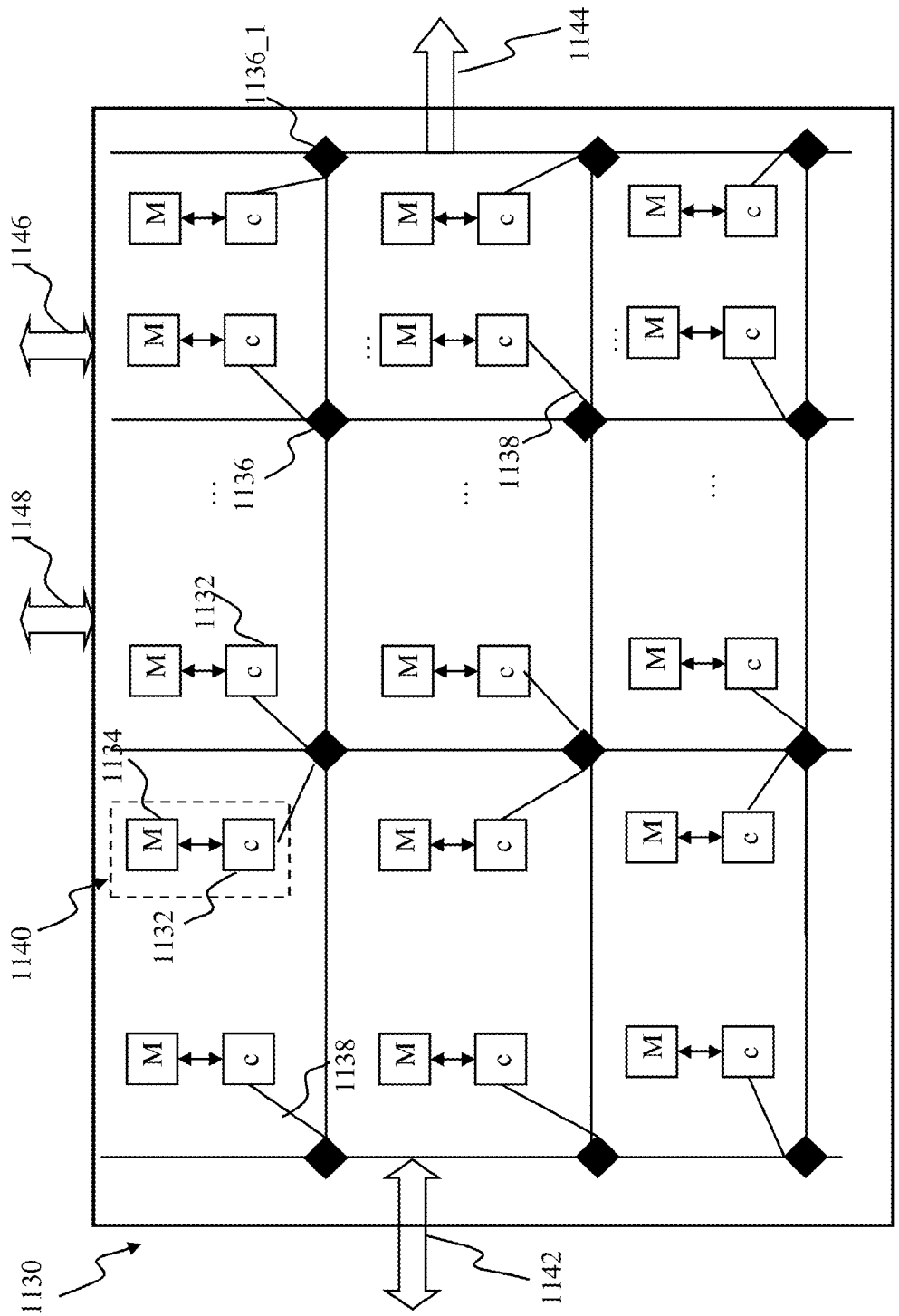
FIG. 11C is a block diagram illustrating a hierarchical neuromorphic computerized system architecture useful with, inter alia, a conditional plasticity mechanism in a spiking network, in accordance with one or more implementations.
Figure 11D:
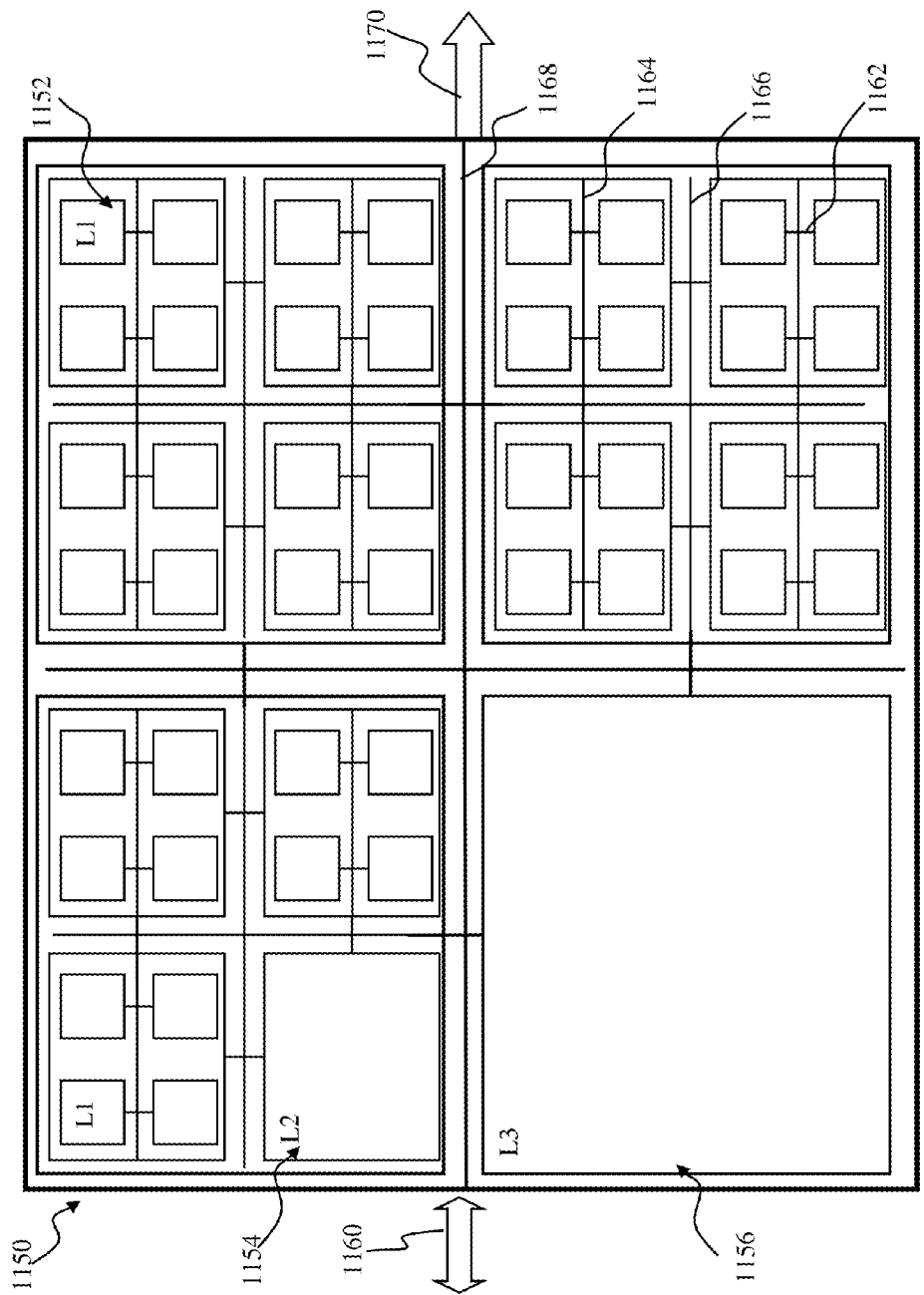
FIG. 11D is a block diagram illustrating cell-type neuromorphic computerized system architecture useful with, inter alia, a conditional plasticity mechanism in a spiking network, in accordance with one or more implementations.

In some implementations, the doublets do not have access to pre-synaptic unit variables. However, in some implementations, doublets may have access to some pre-synaptic unit variables. In some implementations, pre-synaptic unit may have variables that are modified during events triggered by the unit (i.e., event-based memory), and the modification does not depend on the values of the other pre-synaptic unit variables. In such an example, such event-based memory may reside in the pre-synaptic unit memory, or equivalently, it may be treated as if a copy of the event-triggered variables resided at individual doublets or shared among doublets The doublet event rule may be part of a class of doublet rules, which in some implementations may include post event rules and doublet update rules, as illustrated in FIG. 18. The post event rule may be a rule that is triggered by a post-synaptic unit and executed for doublets connecting to the post-synaptic unit. In some implementations, the post event rule of a doublet may depend on the timing of the immediately preceding pre-synaptic event. The doublet update rule may be a clock-based rule that is executed for individual doublets at one or more time steps (e.g., every system clock cycle within a period of time).

In the implementation illustrated in FIG. 12, the doublet event rule may comprise a timing event rule that (i) is configured based on the timing of events of the pre-synaptic and post-synaptic units; and (ii) controls the modification of doublet memory variables. The update rule, illustrated in FIG. 12, is at implementing Spike-Timing Dependent Plasticity (STDP)—standard form of plasticity in spiking networks.

The timing event rule can comprise a pre-post event rule that implements the part of the STDP that corresponds to pre-synaptic neuron firing first (or the spike arriving from the pre-synaptic neuron first) and then the post-synaptic neuron firing thereafter, e.g., the pulses 1202 generated before the pulses 1213, 1214. In the classical STDP this would correspond to the long-term potentiation (LTP) part of the STDP curve. This rule modifies the memory of the doublet based on the timings of the pre-synaptic and at least one subsequent post-synaptic firing, e.g., the pair 1202, 1213 (denoted by the line 1223); it may depend on the time difference.

The timing event rule can comprise a post-pre event rule that implements the long-term depression part of the classical STDP which occurs when the post-synaptic unit fires first and then the pre-synaptic unit fires after that, e.g., like the pulses 1211, 1212 generated before the pulse 1202. This rule modifies the doublet memory based on the relative timing of the pre-synaptic and post-synaptic firing; it may depend on the time difference, i.e., on the difference between the timing of the pulses 1212, 1202.

Both, pre-post and post-pre event rules may depend on the values of variables in the post-synaptic unit memory.

In some implementations, it may be desirable to allocate memory of doublets according to their pre-synaptic units, so that doublets having a common pre-synaptic unit may be grouped together and allocated consequently in the system memory. This approach can minimize the random access to system memory.

The doublet event rule can comprise a pulse delivery rule that modifies the values of variables of the post-synaptic unit based on the values of doublet memory and the post-synaptic unit memory.

The description of doublets can be provided by the description of synaptic variables and rules in the END format.

As depicted in FIG. 10, supra, the triplet 1021 connects two units 1004 and 1005. Such a triplet represents a junction in the END format. In some implementations, the triplet 1021 may comprise a gap-junction connection between two neurons. In some implementations, the triplet 1021 corresponds to a resistance connection that connect two adjacent dendritic compartments of a neuron. In some implementations, the triplet 1021 may be a combination of both junction types. The triplet may comprise its own memory and it has access to memories of both units. The triplet may comprise a triplet update rule that is executed at individual simulation time steps. The triplet update rule may update the memory of individual triplets and the memory of at least one unit. In some implementations, the triplet update rule can update memory of both units. Because it may be desirable for such an update to be order-independent, the memory update of the at least one unit may be performed via atomic addition to a unit variable that does not participate in the triplet update rule.

The description of the triplets can be provided by the description of junctions in the END format.

Some implementations may implement purely mean-firing rate models where there are no events, but where individual units transmit a signal to other units via triplet update rule.

Triplets can be allocated in the system memory according to the pre-synaptic unit so that triplets originating from a common pre-synaptic unit are grouped together. Triplets can be allocated according to the post-synaptic unit. In some implementations, triplets can be allocated in the system memory according to the structure of the neural network. For example, if the neural network has multi-compartmental dendrites, then triplets responsible for connecting the dendritic compartments can be allocated optimally as to immunize memory access when the dynamical on the dendritic tree is evaluated during the system clock cycle.

Some implementations may implement purely event-driven architectures where units trigger events that deliver pulses to post-synaptic units via doublets. Those units that received at least a single pulse during the clock cycle may be tested for an event condition, and if it is satisfied, the after-event rule is executed and corresponding doublet event rules may be executed, so that pulses may be delivered to other units.

An Event Driven Architecture (EDA) may be defined as a generalization of the END format that acts as an abstraction layer configured to isolate computational description from the neuroscience description of the model. The EDA defines memory management, parallelism, and rules triggered by events and enables compilation of the END-code directly into EDA code.

The events in END format and EDA architecture correspond to pulses, whether physical or virtual, software representation of pulses, stereotypical bursts of pulses, or other discrete temporal events.

EDA memory management differs (from the point of view of ownership of variables) from the END framework in the following:

Units own their own variables. When an update rule for a unit A is executed, it may not require access to variables of any other units of the network. Conversely, no rules being executed by other units may require access to the variables of the unit A.

Synapses own their own "synaptic" variables, such as weights, variables such as last_active and/or other variables, and they may refer to (read from and write to) certain variables in the post-synaptic unit. When either presynaptic_rule or postsynaptic_rule is executed, two or more synapses may try to access and modify the same variable of the post-synaptic unit. However, the synapses do not compete for their own synaptic variables.

Junctions own their "junction" variables, but they access and modify variables in the unit_1 and unit_2. When junctions are executed, there may be no competition for parallel access to their junction variables, but there may be competition for the access to unit_1 and unit_2 variables.

Thus, units, synapses, and junctions may be treated as units, doublets, and triplets in terms of ownership of variables. Units own a set of variables, synapses own one set of variables and refer to another set owned by units. Junctions own one set of variables and refer to two other sets of variables owned by two units. This nomenclature can be applied to describe the END 1.0, 2.0 and 3.0 formats, as well as exemplary implementations below.

The class member Event_condition may trigger execution of the following rules:

After_event_rule that acts on the unit that has triggered the event (the trigger unit);

presynaptic_event_rule that acts on synapses (doublets) that point from the trigger unit to other units;

postsynaptic_event_rule that acts on synapses (doublets) that point to the unit from other units The class member Update_rule may be executed at individual time steps of the network simulation and it updates variables in units, synapses (possibly via a background process), and junctions, i.e., in units, doublets, and triplets.

Units, doublets, and triplets as elements may be referred to as the network elements. The END format, therefore, defines (i) elements, (ii) rules that act on elements, and (iii) events that are triggered by elements and cause execution of other rules that act on other (target) elements.

The objectives behind the development of the EDA framework according to certain aspects of the present disclosure include:

elements (e.g., units, doublets, triplets, and/or other elements) that have their own variables and in addition may refer to variables in other elements;

clock-driven rules (rules) that act on variables in elements; and event-driven rules (events) that are triggered by some elements and act on variables in other (target) elements.

The EDA instruction set starts with defining rules that act on abstract (symbolic) variables. Rules may include other rules defined earlier, so as to form a directed graph of rules with no cycles. Elements may be defined by the clock-driven rules that act on the same or other elements. Events may be defined by trigger condition and target rule that are applied to other elements.

One example of an EDA instruction set is shown below in Listing 7. Bold keywords in Listing 7 denote components of the END instruction set, whereas non-bold words denote user-defined names and values.

Listing 7

```
rule_name = rule
code = '....'
code = another_rule_name
init = '....'
```

In Listing 7, the identifier "code" can refer to any string of code, or the name of another rule defined previously. While C-code syntax is used in the Listing 5, it will be appreciated by those skilled in the arts that any other language description (e.g., C#, Python, Perl, and/or other languages) is equally applicable to the disclosure. There may be multiple codes and rules included within a rule that can be executed in the order of inclusion. In some implementations, rules that are used in multiple element types can be defined separately, so that the engine can use its acceleration tricks to execute such rules in parallel. The statement "init" defines static (global within the rule) variables needed to execute the rule, e.g., it defines lookup tables. The "code" may refer to the static variables defined in "init", to instance variables defined in the element (see below) or to other instance variables defined in other element types, e.g., "I+=A.w+B.w" refers to an instance variable I, and to variables w defined in an elements A and B.

```
element_name = element
rule = rule_name
rank = a number or range of numbers
init = '....'
```

The latter is a definition of an element type. Here, "rule" refers to a rule defined earlier or to a string of code. The parameter "rank" specifies the rank order of execution of the rule within a clock cycle. It takes fixed-point value from the interval[0 1]. E.g., rank=0.45 means that this rule may be executed after individual rules with lower rank and before individual rules with higher rank, but in parallel with the rules that have the rank 0.45. If rank is given as an interval, e.g., rank=min:max, then the engine has the freedom of executing this rule any time after individual rules with rank<min and before individual rules with rank>max. If "rank" is missing, it is equivalent to the default value rank=0:1, i.e., the engine has complete freedom of selecting when to execute this rule. If the rank is greater than 1, then the engine skips cycles to execute the rule. For example, rank=2.45 may cause the engine to skip 2 cycles until next execution of the rule. The string "init" defines the names of instance (local) variables of the element and sets their default initial values.

```
id = element_name
A = other_element_name.id
B = other_element_name.id
variable_name = value
```

The latter is a definition of an instance of the element type. Here, "element_name" is the name of an element type defined earlier. The lines "variable_name=value" may set values of instance variables that are different from the default values defined in the "init" statement in the element definition. If the rule_name in the element definition refers to other elements (which is the case for doublets and triplets), then the ids of these elements may be specified here. Notice that one can use any variable name, not necessarily A and B (or Unit_1 and Unit_2 in END), to refer to other elements.

```
event_name = event
trigger_condition = rule_name
trigger_rank = number or number range
target_code = rule_name
target_rank = number or number range
```

The latter is a definition of an event type. Here, "trigger_condition" is a name of a rule or a string code that returns true/false value. This condition (applied to elements; see below) may be evaluated at the rank given by "trigger_rank". When the condition is true, it triggers execution of the "target_code" in the target element (defined below) at the rank "target_rank".

```
event_name
trigger = element_name.id
target = element_name.id
```

The latter is a definition of an instance of the event type. It specifies which element is the "trigger" and which element is the "target" of the event.

A network of randomly connected 800 excitatory and 200 inhibitory neurons (100 of exc->all and inh->exc connections) can be defined with excitatory synapses subject to STDP and no conduction delays (for conduction delays, see next example).

Listing 8

```
QIF = rule
    code = 'v+=0.5f*((0.04f*v+5.0f)*v+140.0f-u+I);
v+=0.5f*((0.04f*v+5.0f)*v+140.0f-u+I); I=0.0f;'
    exc = element
        code = 'u+=0.02f*(0.2f*v-u);'
        code = QIF
        rank = 0
        init = 'float v=-65.0f; float u=-13.0f; float I=0.0f; int
last_spike=-1000'
        1:800 = exc
    inh = element
        code = 'u+=0.01f*(0.2f*v-u);'
        code = QIF
        rank = 0
        init = 'float v=-65.0f; float u=-13.0f; float I=0.0f; int
last_spike=-1000;'
        1:200 = inh
    spike = rule
        code = 'v>30'
    after_spike_reset_exc = event
        trigger_condition = spike
        trigger_rank = 0.1
        target_rule = 'u+=8; last_spike=now'
        target_rank = 0.2
    after_spike_reset_exc
        trigger = exc.1:800
        target = exc.1:800
    after_spike_reset_inh = event
        trigger_condition = spike
        trigger_rank = 0.1
        target_rule = 'u+=2; last_spike=now'
        target_rank = 0.2
    after_spike_reset_inh
        trigger = inh.1:200
        target = inh.1:200
    inh_syn_event = event
        trigger_condition = spike
        trigger_rank = 0.1
        target_rule = 'I-=5.0f'
        target_rank = 0.3
    // make 200*100 such entries
    inh_syn_event
        trigger = inh.<random number between 1 and 200>
        target = exc.<random number between 1 and 800>
    weight_update = rule
        code = 'w += 0.01f + sd; if (w<0.0f) w=0.0f; if (w>10.0f)
w=10.0f; sd *= 0.9f'
    exc_synapse = element
        code = weight_update
        rank = 999:1000// any time within that cycle
        init = 'float w=6.0f; float sd = 0.0f; int last_active = -1000'
        id = exc_synapse
        post = <either exc.id or inh.id with id = random>
    PSP_LTD_rule = rule
        code = 'post.I += w; sd -= LTD(now - post.last_spike);
last_active = now'
        init = 'float LTD = {...}'
    PSP_LTD_event = event
        trigger_condition = spike
        trigger_rank = 0.1
        target_rule = PSP_LTD_rule
        target_rank = 0.3
    PSP_LTD_event
        trigger = exc.<each id>
        target = exc_synapse.<each corresponding id>
    LTP_rule = rule
        code = 'sd += LTP(now-last_active)'
        init = 'float LTP = {...}'
    LTP_event = event
        trigger_condition = spike
        trigger_rank = 0.1
        target_rule = LTP_rule
        target_rank = 0.4
    LTP_event
```

Listing 8

```
        trigger = {for each exc.id and inh.id}
        target = exc_synapse.<each corresponding id>
```

The linker may be configured to group events triggered by 'spike' rule (that are within with the same rank) into a single event, so that the computational engine executes the 'spike' condition once per model simulation step for individual units.

In some implementations, the rank information in provided in the definition of the rule; this way, there may be no need to repeat ranks in the definition of events.

In one or more implementations of spiking neuron networks (e.g., reinforcement learning) it may be beneficial to decouple plasticity adaptation from post-synaptic response generation by the neuron.

Figure 14:
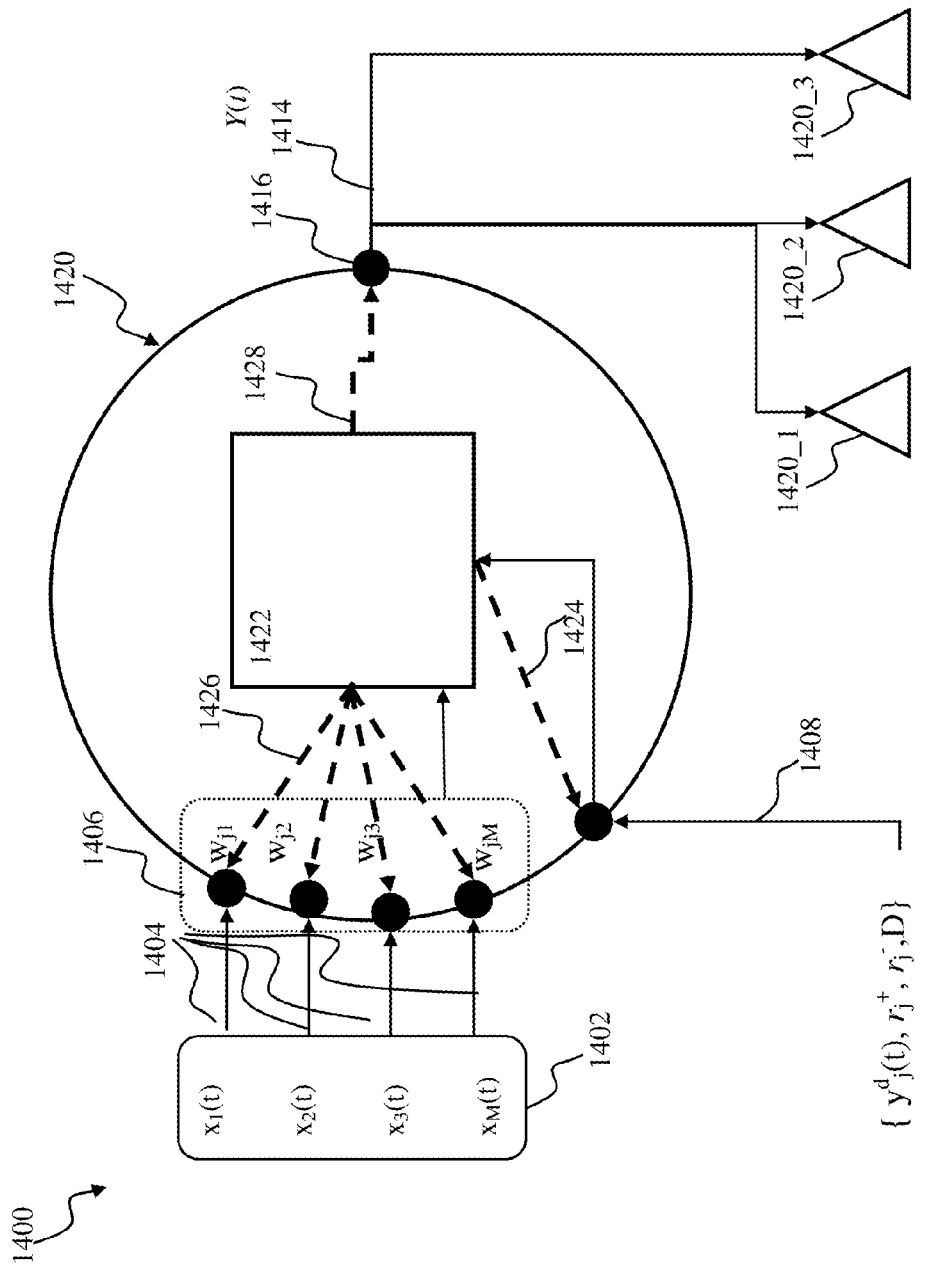
FIG. 14 is a block diagram illustrating spiking neural network for use with event driven updates, in accordance with one or more implementations.

FIG. 14 illustrates event-driven network update mechanisms in accordance with one or more implementations. The network 1400 may comprise at least one spiking neuron 1420, operable according to, for example, a Spike Response Process (SRP) 1422. The neuron 1420 may receive M-dimensional input spiking stream X(t) 1402 via M-input connections 1404. In some implementations, the M-dimensional spike stream may correspond to M-input synaptic connections into the neuron 1420. As shown in FIG. 14, individual input connections may be characterized by a connection parameter 1406 $w_{ij}$ that may be configured to be adjusted during learning. In one or more implementation, the connection parameter may comprise connection efficacy (e.g., weight). In some implementations, the parameter 1406 may comprise synaptic delay. In some implementations, the parameter 1406 may comprise probabilities of synaptic transmission.

In some implementations, the neuron 1420 may be configured to receive external input via the connection 1408. In one or more implementations, the input 1408 may comprise training input. Training input may include positive and/or negative reinforcement signal, which is denoted as $r^+$, $r^-$ in FIG. 14. According to some implementations, a positive reinforcement signal spike stream may be expressed as:

$$r^+(t)=\Sigma_i \delta(t-t_i^+), \; r^-(t)=\Sigma_i \delta(t-t_i^-), \quad \text{(Eqn. 1)}$$

where $t_i^+$, $t_i^-$ denote the spike times associated, for example, with positive and negative reinforcement, respectively. In some implementations, spike time may describe time of spike receipt expressed as time of day in, e.g., ms, time relative to an event (e.g., ms since last spike, or from start of operation), and/or in counter value relative an event. In one or more implementations, the spike time may describe spike generation time communicated via, e.g., spike payload, and/or a queue.

In some implementations of supervised learning, a supervisory spike may be used to trigger neuron post-synaptic response.

In some implementations of reinforcement learning, an external signal (e.g., reinforcement spike) may cause a neuron to enter an exploratory regime. In some implementations, a neuron may enter an exploratory regime by increasing synaptic weights for a short period of time.

The neuron 1420 may be configured to generate output Y(t) (e.g., a post-synaptic spike) that may be delivered to the desired targets (e.g., other neurons 1420_1, 1420_2, 1420_3) via output connections 1414. As shown in FIG. 14, individual output connections 1414 may be characterized by a connection parameter 1416 that may be adjusted during learning. In one or more implementation, the connection parameter 1416 may comprise connection efficacy (e.g., weight). In some implementations, the parameter 1416 may comprise synaptic delay. In some implementations, the parameter 1416 may comprise synaptic transmission probability.

The neuron 1420 may be configured to implement controller functionality, such as described for example in U.S. patent application Ser. No. 13/487,533, entitled "STOCHASTIC SPIKING NETWORK LEARNING APPARATUS AND METHODS", incorporated supra, in order to control, for example, a robotic arm. The output signal y may include motor control commands configured to move a robotic arm along a desired trajectory. The process 1422 may be characterized by a process internal state q. The internal state q may, for example, comprise a membrane voltage of the neuron, conductance of the membrane, and/or other parameters. The process 1422 may be characterized by one or more learning parameter which may comprise synaptic weights 1406, 1416, response generating (firing) threshold, resting potential of the neuron, and/or other parameters. In one or more implementations, the parameters w may comprise probabilities of signal transmission between the units (e.g., neurons) of the network.

The input signal x(t) may comprise data used for solving a particular control task. In one or more implementations, such as those involving a robotic arm and/or autonomous robot, the signal x(t) may comprise a stream of raw sensor data (e.g., proximity, inertial, and/or terrain imaging) and/or preprocessed data (e.g., velocity, extracted from accelerometers, distance to obstacle, and/or positions). In some implementations, such as those involving object recognition, the signal x(t) may comprise an array of pixel values (e.g., RGB, CMYK, HSV, HSL, and/or grayscale) in the input image, or preprocessed data (e.g., levels of activations of Gabor filters for face recognition, contours, and/or other preprocessed data). In one or more implementations, the input signal x(t) may comprise desired motion trajectory, for example, in order to predict future state of the robot on the basis of current state and desired motion, and/or other parameters that may be related to state of the robot and/or its environments.

In one or more implementations, network 1400 may be implemented using High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, incorporated herein by reference in its entirety. In one or more implementations, the HLND framework may be augmented to handle event based update methodology described herein.

The neuron process 1422 may be configured to effectuate event-based updates. In one or more implementations, the event-based updates may comprise multiple event types (e.g., dendritic, axonic, custom, and/or other event types) configured to effectuate various aspects of event-based functionality as described in detail below.

Figure 19:
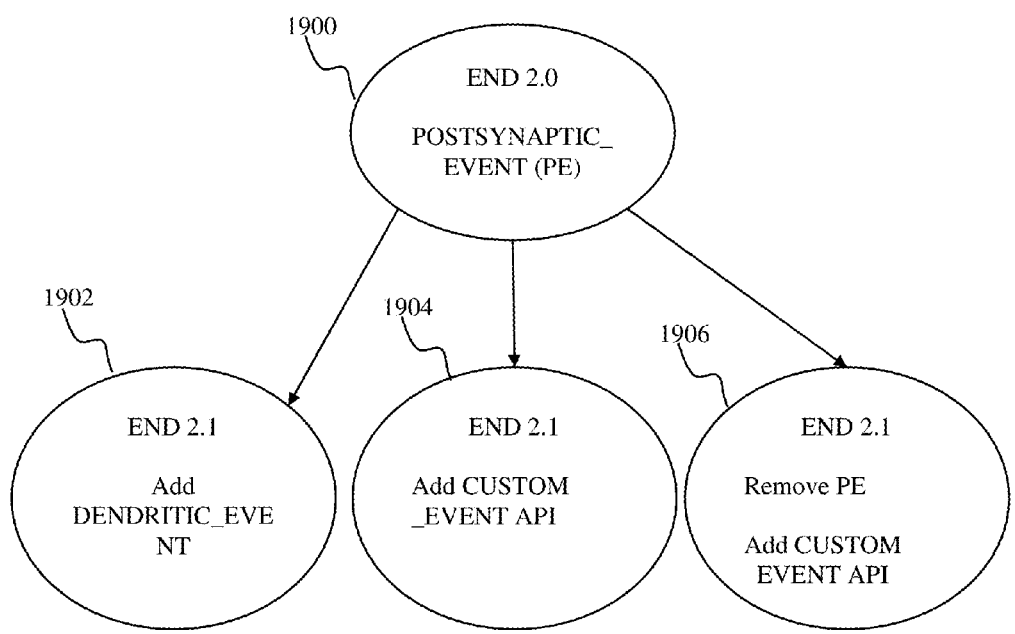
FIG. 19 is a block diagram illustrating END event framework extension in accordance with one or more implementation.

In some implementations, in order to facilitate event-based update functionality, END 2.0 implementation may be extended as described below with respect to FIG. 19. In some implementations, the END 2.0 format 1900 may comprise a POSTSYNAPTIC_EVENT (PE). In one or more implementations of extended END framework (e.g., the END 2.1 implementation 1902 in FIG. 19) an additional single DENRITIC_EVENT may be implemented while leaving the POSTSYNAPTIC_EVENT so as to allow for backward compatibility with the current END 2.0 format.

In some implementations (e.g., the END 2.1 implementation 1904 in FIG. 19), a CUSTOM_EVENT API may be provided to handle pre-synaptic and/or event-triggered updates without generating post-synaptic responses, as described in detail above. The END 2.1 implementation 1904 is backward compatible with the END 2.0 format.

In some implementations (e.g., the END 2.1 implementation 1906 in FIG. 19), the POSTSYNAPTIC_EVENT may be removed and CUSTOM_EVENT API may be provided to handle pre and/or post updates described above. While the END 2.1 implementation 1906 is not backward compatible with the current END 2.0 format, it provides a unified and flexible approach to event handling and may, advantageously, result in a faster code execution, due to, for example, handling of fewer logical conditions.

Unit type definition may comprise dendritic and/or axonic event conditions:

```
<unit_type>
    ... members of END 2.0 unit type definition (e.g. name,
update_rule)
        dendritic_event_condition
        after_dendritic_event_rule
``` where
dendritic_event_condition
defines a logical statement configured to detect dendritic events, for example, 'denritic_event_flag==true'. In some implementations, the event rule may be executed at individual clock cycles (model time step). When the class is derived from a base class, then the dendritic_event_condition of the subclass may replace the dendritic_event_condition of the base class.

The unit definition member
after_dendritic_event_rule
may comprise the code that may be executed when a dendritic event is detected. For a derived subclass, the subclass after_dendritic_event_rule may be executed before the after_dendritic_event_rule of the base class.

Synaptic classes may be augmented by dendritic event:

```
<synaptic_type>
... members of END 2.0 synapse type (e.g. presynaptic_event_rule)
dendritic_event_rule
``` where the code of dendritic_event_rule triggered by generating dendritic_event of the post-synaptic unit. In some implementations, the dendritic event rule may be configured to execute modulated STDP.

In some implementations, an internal (also referred to as the dendritic) event may be defined to modify input connection (e.g., adjust synaptic weights 1406) of the neuron 1420, as illustrated by the broken arrows 1426 in FIG. 14.

In one or more implementations, the dendritic event may be triggered by an external trigger. In one such implementation, the external trigger may comprise reinforcement signal 1408, shown in FIG. 14. In some implementations, the external signal 1408 may comprise a signal generated by another network entity, such as for example, a timer. In one or more implementations, the signal 1408 may comprise an overflow alarm associated with a buffer, configured to store input and/or output spiking activity (e.g., spike timing) of the network. One implementation of the buffer overflow event generation is described in co-owned U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety.

In some implementations, the dendritic event may be triggered internally by the process 1422 of the neuron 1420 of FIG. 14. In one or more implementations, the internal event may comprise an internal time expiration. The internal time expiration may be an overflow indicator associated with an internal buffer that may store neuron spiking history (pre-synaptic and/or post-synaptic). It will be appreciated by those skilled in the arts that many other sources of internal and/or external event triggers may exist, such as for example, related to the state of the process 1422.

In accordance with some implementations, the internal event may be used to implement synaptic updates without causing the post-synaptic response propagation to the targets (e.g., the neurons 1420_1, 1420_2, 1420_3 in FIG. 14). By way of illustration, the external reinforcement signal 1408 may be used to trigger plasticity updates of one or more input connections 1404 (e.g., modify weights 1406) based on the neuron prior performance, in one or more implementations.

In one or more implementations, performing synaptic updates without causing post-synaptic responses may reduce undesired network spiking activity (e.g., noise). Such undesired spiking may often cause malfunction of a plant (e.g., motor). According to some implementations of motor control, a high-rate reward signal (e.g., 1 Hz-100 Hz) may be used in conjunction with dendritic events to improve learning convergence of a motor controller without causing unnecessary (e.g., repetitive) motor control commands thereby increasing plant longevity. Responsive to the learning process reaching a target state, an axonic event may be used in order to cause motor control output.

In some implementations, an internally triggered dendritic event (e.g., pre-synaptic buffer overflow) may cause synaptic updates so that the buffer content may be cleared and integrity of the neuron process 1422 preserved.

In some implementations, the dendritic event may cause plasticity update of the external signal connection 1408, as shown by the broken arrow 1424 in FIG. 14.

Event-based data communication in a spiking neuron network may be implemented by configuring spikes to carry payload. Spikes may be used to describe discrete temporal events. Such events may be characterized by event time (e.g., time of spike generation or receipt) and do not communicate additional data. In some implementations, event time may describe time of spike receipt, expressed, e.g., as time of day in seconds, milliseconds, microseconds and/or other units, elapsed time relative to an event (e.g., ms since last spike, or from start of network operation), and/or in counter value relative an event. In one or more implementations, the spike time may describe spike generation time communicated via, e.g., spike payload, and/or a spike queue.

In one or more implementations of the event-based data communication of the disclosure, neurons and/or connections (e.g., 1420, 1402 of FIG. 14) may be configured to communicate spikes that have payload associated therewith. The payload may correspond to two or more bits of information that may be communicated from a source (e.g., a pre-synaptic neuron and/or a teacher) to a target (e.g., a post-synaptic neuron). In some implementations, such spikes with payload may be characterized by a spike amplitude and/or finite duration (spike width). Area associated with spike amplitude and width may be utilized to encode the payload (e.g., greater area may correspond to a large number of bits in the payload).

In one or more implementations, the payload may be stored in a buffer of presynaptic unit and the connection may be configured to access the presynaptic neuron memory buffer.

In some implementations, the payload may be stored in a buffer of the connection and the postsynaptic unit may be configured to access the connection memory buffer.

In one or more implementations, the payload may be stored in a buffer of the connection. The connection may be configured to modify the payload based on one or more parameters (e.g., state) of the presynaptic unit. This configuration may allow for multiple fan-out synapse classes from a given unit.

In some implementations, the payload may be packaged by the network update engine into a data package that may be delivered by the connection.

Spikes may be configured to communicate two or more types of information. In some implementations, spikes may be assigned a type (e.g., 'color') to denote type of information the spike may carry.

Spikes may be configured to directly manipulate a state of the target (e.g., a postsynaptic neuron) to implement a spiking neuron classifier comprising conditionally independent subsets as described in detail U.S. patent application Ser. No. 13/756,382, filed Jan. 31, 2013 and entitled "REDUCED LATENCY SPIKING NEURON CLASSIFIER APPARATUS AND METHODS", the foregoing being incorporated herein by reference in its entirety. As described in the above-referenced application, the connections between the neurons of sub-classifiers and the aggregation layer may be configured to update a state of the aggregation layer neurons based on the state of the sub-classifier neurons. Such configuration may enable rapid communication of multiple sub-classifier estimates to the aggregation layer thereby reducing latency that may be associated with spike latency encoding thus increasing speed of classifier operation.

FIGS. 15A-15E illustrate exemplary uses of event-based data communication in a spiking neuron network in accordance with one or more implementations.

FIG. 15A depicts operation of a network comprising postsynaptic response generation and an input connection efficacy update triggered by a sensory input event, in accordance with one or more implementations. The network 1500 of FIG. 15A may comprise a neuron 1502 configured to receive sensory input 1504. The neuron 1502 may be operable in accordance with a learning process configured to update neuron state based on the sensory input 1504, such as the neuron 1420 described with respect to FIG. 14 above. In one or more implementations, the process may comprise a stochastic as described in detail, for example, in a co-owned U.S. patent application Ser. No. 13/487,533, filed Jun. 4, 2012 and entitled "STOCHASTIC SPIKING NETWORK LEARNING APPARATUS AND METHODS", the foregoing being incorporated herein by reference in its entirety. As used herein, the term sensory input is used to describe input into a neuron that is configured to directly affect neuron excitability (e.g., membrane potential) using for example a spike response model and/or Izhikevich model, described in detail in U.S. patent application Ser. No. 13/487,533, filed Jun. 4, 2012 and entitled "STOCHASTIC SPIKING NETWORK LEARNING APPARATUS AND METHODS", incorporated supra. In some implementations, the sensory input may comprise one or more spikes (e.g., spikes 1201, 1202, 1203 of FIG. 12 associated with a presynaptic unit). The neuron process may be configured to update neuron excitability based on the input 1504. Responsive to neuron excitability reaching a super-threshold condition (e.g., firing potential), the neuron may generate a response 1510. In one or more implementations, the neuron process may be characterized by a dynamic adjustment of the firing threshold, as described in detail in co-owned U.S. patent application Ser. No. 13/623,820, filed Sep. 20, 2012 and entitled "APPARATUS AND METHODS FOR ENCODING OF SENSORY DATA USING ARTIFICIAL SPIKING NEURONS", the foregoing being incorporated herein by reference in its entirety.

In some implementations, the neuron response may comprise one or more spikes (e.g., 1211, 1212, 1213 in FIG. 12). Based on one or more events associated with the sensory input 1504, and the response 1510, efficacy 1506 of input connections 1504 and/or output connections 1510 of the neuron 1502 may be updated. In some implementations, the update may comprise one or more spike timing dependent plasticity (STDP) rules. In some implementations, the plasticity rule may comprise activity based plasticity mechanism such as described in co-pending U.S. patent application Ser. No. 13/774,934, entitled "APPARATUS AND METHODS FOR RATE-MODULATED PLASTICITY IN A SPIKING NEURON NETWORK", filed Feb. 22, 2013, U.S. patent application Ser. No. 13/660,967, entitled "APPARATUS AND METHODS FOR ACTIVITY-BASED PLASTICITY IN A SPIKING NEURON NETWORK", filed Oct. 25, 2012, and/or U.S. patent application Ser. No. 13/691,554, entitled "RATE STABILIZATION THROUGH PLASTICITY IN SPIKING NEURON NETWORK", filed Nov. 30, 2012, each of the foregoing being incorporated herein by reference in its entirety.

In one or more implementations, the plasticity rule may incorporate one or more feedback inputs (not shown) providing input context, as described in detail in U.S. patent application Ser. No. 13/465,924, entitled "SPIKING NEURAL NETWORK FEEDBACK APPARATUS AND METHODS", filed May 7, 2012, co-pending and co-owned U.S. patent application Ser. No. 13/540,429, entitled "SENSORY PROCESSING APPARATUS AND METHODS", filed Jul. 2, 2012. The context input may comprise input of one sensory modality (e.g., audio) configured to facilitate processing (e.g., object detection) in input of another sensory modality (e.g., visual).

The plasticity rule may be configured based on activity of other neurons of the network (e.g., neurons of the same processing layers) that may be configured to receive the input 1504. In one or more implementations the plasticity rule may comprise conditional plasticity mechanism described in detail in U.S. patent application Ser. No. 13/541,531, entitled "CONDITIONAL PLASTICITY SPIKING NEURON NETWORK APPARATUS AND METHODS", filed Jul. 3, 2012 and/or U.S. patent application Ser. No. 13/710,042, entitled "CONTRAST ENHANCEMENT SPIKING NEURON NETWORK SENSORY PROCESSING APPARATUS AND METHODS", filed Dec. 10, 2012, each of the foregoing incorporated herein by reference in its entirety.

In one or more implementations, the plasticity mechanism for connections 1504 and/or connections 1510 may comprise multiple plasticity rules that may be selected in real time. The input 1504 may comprise one or more spikes with payload configured to indicate one (or more) plasticity rules that may be used for the efficacy adjustment. In one implementation, the payload may comprise an integer number (characterized by two or more bits) configured to select one (of several) rules.

FIG. 15B depicts an efficacy update of an input connection into a neuron that may be triggered by a teaching signal event, in accordance with one or more implementations. The network 1520 of FIG. 15B comprises a neuron 1522 receiving sensory input 1524. The neuron 1522 may be operable in accordance with a dynamic process configured to update neuron state based on the input 1524, such as the neuron 1420 described with respect to FIG. 14 above. In one or more implementations, the process may comprise a stochastic process configured to implement reinforcement learning, supervised learning, unsupervised learning or a combination thereof as described in detail, for example, in a co-owned U.S. patent application Ser. No. 13/487,533, filed Jun. 4, 2012 and entitled "STOCHASTIC SPIKING NETWORK LEARNING APPARATUS AND METHODS", incorporated supra. The operation of the neuron 1522 may be based on a teaching signal 1528. In some implementations of reinforcement learning, the teaching signal may correspond to a target output (e.g., a correct category label in a classification application). In one or more implementations, the teaching signal received via the connection 1528 may comprise one or more spikes. As used herein, the term teaching signal is used to describe input into a neuron that is used to modify one or more parameters and does not directly change neuron excitability. The neuron process may be configured to identify the input via the connection 1528 as teaching signal. In some implementations, the identification may be based on a connection parameter (e.g., address, type, and/or other parameter). In some implementations, the identification may be based on a spike type.

Based on one or more events associated with the teaching input 1528, efficacy 1526 of input connections 1524 may be updated. In some implementations, the update 1530 may comprise one or more plasticity rules. In some implementations, the update 1530 may be characterized by an absence of a response generation by the neuron 1522. In one or more implementations, the mechanism illustrated in FIG. 15B may be used to update efficacy (e.g., weight) of input connections into neuron based on a teaching input without necessitating generation of the response by the neuron. In one or more implementations, efficacy of output connections (e.g., 1510 of the neuron 1502 in FIG. 15A) may be updated based on the one or more events associated with the teaching input 1528.

In some implementations, the plasticity rule used for a connection update may be modulated by the timing of the teaching signal 1528. In one such implementation, weight 1406 of the j-th connection 1404 in FIG. 14 may be adjusted as follows:

$$w_j \propto \exp[-(t_{out}-t_{in}^j)]\exp[-(t_{out}-t_{ext})] \qquad \text{(Eqn. 2)}$$

where:

$t_{out}$—denotes time of the most recent output (post-synaptic spike) generated by the neuron;

$t_{in}^j$—denotes time of one or more inputs the most recent inputs (pre-synaptic spike(s)) received by the neuron via the connection j;

$t_{ext}$—denotes time of the external (trigger) signal.

FIG. 15C depicts delivery rule modification for a post-synaptic response by a payload associated with an input spike into a neuron, in accordance with one or more implementations. The network 1540 of FIG. 15C comprises a neuron 1542 configured to receive sensory input 1544. The neuron 1542 may be operable in accordance with a learning process configured to update a neuron state (e.g., excitability) based on the input 1544. When neuron excitability reaches a super-threshold condition, the neuron may generate a response 1550. The neuron process may be configured to send one or more parameters via spike payload associated with a delivery rule for the response 1550. The spike type may be used to indicate that the payload may comprise delivery rule parameters. In some the implementations, the delivery rule parameter may comprise a target address configured so that (i) connection 1550_1 may deliver neuron response to one target destination, and (ii) the connection 1550_2 may deliver neuron response to another target destination. In one or more implementations, the delivery rule parameter may comprise a delay configured for individual and/or all output connections (e.g., 1550_1, 1550_2 in FIG. 15C). In some implementations wherein the delivery rule may comprise execution of connection update (e.g., plasticity rule) and/or unit process (e.g., excitability update), the delivery rule parameter may comprise (1) a flag indicating as to whether to perform one or both portions of the delivery rule; (2) a parameter associated with individual update portions (e.g., STDP rule): (3) a parameter of unit spike response model (e.g., Izhikevich model), and/or other information.

FIG. 15D illustrates post-synaptic rule modification delivered to the neuron via an input spike payload, in accordance with one or more implementations. The network 1560 of FIG. 15C comprises a neuron 1562 configured to receive sensory input 1564. The neuron 1562 may be operable in accordance with a learning process configured to update neuron state (e.g., excitability) based on the input 1564, such as the neuron 1420 described with respect to FIG. 14 above. Responsive to excitability reaching a super-threshold condition, the neuron 1566 may generate a response 1570. Based on the response 1570, the neuron 1562 may be configured to trigger efficacy update for the output connection 1570. In one or more implementations, the efficacy update may comprise one or more STDP rules. The neuron 1566 process may be configured to receive one or more parameters via input 1564 (e.g., spike payload). The spike type may be used to indicate that the payload may comprise one or more post-rule parameters, illustrated in FIG. 15D by a broken line arrow 1566. In some the implementations wherein the post-rule may comprise one or more STDP rules, the post-rule parameter may comprise an index indicating the rule of the one or more STDP rules that is to be executed. In one or more implementations, the post-rule parameter may comprise timing information (e.g., propagation delay and/or time of pre-synaptic input) that may be used by the plasticity rule.

In one or more implementations, a spiking neuron network may comprise units of one or more types (e.g., units 1582 in FIG. 15E) and synapses (e.g., 1584, 1586 in FIG. 15E) of one or more types. In some implementations, units and/or synapses of a given type may be operable in accordance with a respective update rule.

Units of the network (e.g., 1502, 1522, 1582, 1588 of FIGS. 15A-B, 15E, respectively) may be operated in accordance with one or more unit-update rules. In one or more implementations, the network may comprise one or more update rules configured to be applied to the units of the network. In one or more implementations, unit update rule may be configured to: determine firing rate of the unit; update parameters (e.g., firing threshold) of the unit dynamic process; and/or modify unit 'membrane potential'; above certain value, the unit generates a spiking event. In some implementations, unit update rule may be configured to based on a acomparison of input into the unit to a template, e.g., as used in latency pattern detection described, for example, in commonly owned and co-pending U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", each incorporated herein by reference in its entirety. Mapping between individual units and respective one or more rules may be provided as a part of the network definition. In some implementations, a unit of a given type may be configured to comprise one or more update rules. During update, the rules of such unit may be automatically invoked without the need for a rule mapping.

The unit update rules may be executed with a given periodicity. In some implementations, the periodicity may be characterized by a constant and/or varying interval period. As a part of the update rule execution, memory of the respective unit may be accessed (e.g., read and/or write). Based on the update rule execution, unit parameters (e.g., excitability) may be modified. A unit may generate an event (also called spike) based on the unit transiting to super-threshold state. A payload may be assigned to the spike by the unit as a part of the spike generation process.

The event (spike) may trigger spike delivery via outgoing synapses (e.g., 1510 in FIG. 15A); and/or execution of plasticity rules for incoming (e.g., 1506 in FIG. 15A) and/or outgoing synapses. In some implementations, synapse update rule may be effectuated using a spike delivery, as described below. A synapse update rule (e.g., SPIKE_EVENT_RULE described in Listing 10) may be invoked based on an event (e.g., a spike) of a pre-synaptic unit associated with the synapse. In some implementations, execution of the SPIKE_EVENT_RULE may comprise:

update of synapse variables (e.g., update the weight of the synapse based on the timing of the pre and post-synaptic units); and delivery of the spike.

The spike delivery may comprise updating parameters of a post-synaptic unit(s) associated with the synapse.

An individual synapse may couple two individual units (also referred to as the pre-synaptic unit and the post-synaptic unit) of the network. Synapses of the network (e.g., 1504, 1510, 1586 of FIGS. 15A-B, 15E, respectively) may be operable in accordance with one or more synapse rules. In one or more implementations, the synapse rules may be executed with a given periodicity. In some implementations, the synapse rule execution periodicity may be characterized by a constant and/or varying interval period.

In some implementations, the synapse rule execution may be based on an event (e.g., the event/spike of the pre-synaptic unit). Execution of the synapse rule may be configured to
(i) access (read and/or write) parameters of the synapse;
(ii) access at least one variable of the post-synaptic unit; and
(iii) to read the payload configured by the pre-synaptic unit. Two categories of synapse rules may be implemented: (i) update rules; and (ii) plasticity/event rule. The synapse-update rule may be configured to be executed periodically.

The synapse-plasticity/event rule may be configured to be triggered by the spike/event of the pre-synaptic unit associated with the synapse. That is, responsive to the pre-synaptic unit (e.g., 1502 in FIG. 15A) generating a spike, the synapse-plasticity/event rule for the fan-out synapses (e.g., 1510 in FIG. 15A) for that unit may be triggered.

FIGS. 20A-20D illustrate exemplary implementations of using spikes with payload for communicating data in spiking neuron networks.

In one or more implementations of a rate coding model, unit and synapse classes may be configured as follows:
(i) the output of a unit may be based on the unit response (firing) rate;
(ii) synapses may be configured to communicate rate of the pre-synaptic unit as spike payload; and
(iii) synaptic plasticity may be configured based on synapse weight, pre-synaptic unit rate, and/or post-synaptic unit rate.

One exemplary realization of a rate coding model in a spiking neuron network comprising the payload mechanism described herein is presented in FIG. 20A.

In one or more implementations of a rate coding model, a unit of the network may be configured to generate a spike/ event responsive to rate changes. One exemplary realization of such unit configuration is presented in FIG. 20B.

In some implementations, a synapse communicating spikes with payload may be configured to effectuate a junction based on synapse access to variables of pre-synaptic unit. In one or more implementations, the junction functionality may be realized by, for example, adding a synapse comprising periodically triggered update rule, as follows:

```
Listing 9

1    . DEFINE SYNAPSE Junction_Synapse
2    {
3        UPDATE_RULE
4        {
5            // Implement periodic synapse dynamics here
6        }
7    }
```

FIGS. 20D-20E illustrate update rule within a spiking neuron network being configured based on a spike payload, in accordance with one or more implementations. The PRESYNAPTIC_EVENT_RULE may be configured to implement a user definced STDP rule based on memory content of pre-synaptic unit, as illustrated in FIG. 20D. In one or more implementations, PRESYNAPTIC_EVENT_RULE may be configured to access pre-synaptic, post-synaptic unit memory and/or synapse variables. The update rule may comprise two or more STDP rules (e.g., rules 'A', 'B' in FIG. 20D). Individual rules may be activated (e.g., selected) based on information (e.g., flag value) of the spike payload.

FIG. 20F illustrates programming code configured to implement a neuron network, in accordance with one or more implementations.

In the realization illustrated in FIG. 20F payload may be used in a spike delivery rule. Event (spike) generation by the post-synaptic unit may be configured based on the payload. As illustrated at line 116 of FIG. 20F, the payload may be determined in the spike delivery using pre-synaptic unit variables.

In some implementations, the pre-synaptic unit may be configured to update the payload variable as:

```
Listing 10 payload = ff_input_buffer > ff_spike_threshold.
```

Payload determination in a pre-synaptic unit may simplify the spike delivery rule, expressed in some implementations as follows:

```
Listing 11 post.spike = pre.payload.
```

In realizations described by Listings 10-11 spike generation by the post-synaptic unit may be configured based on the payload.

FIG. 20F illustrates the use of payload in the pre-rule, e.g., at lines 137-167. The plasticity rule (e.g., STDP) may be configured to use the payload generated/updated by the pre-synaptic unit. In the example of FIG. 20F, the payload provides information about time history of the pre-synaptic unit spiking activity. The spike time history may be used in the plasticity (e.g., STDP) rule as illustrated in FIG. 20F.

In one or more implementations of, for example, teaching, spike payload may be utilized in order to trigger an appropriate unit update rule. The listing presented in FIG. 20C may illustrates the use of spikes with payload for effectuating a multi-compartment neuron 1588 shown in FIG. 15E, in accordance with one or more implementations. The network 1580 of FIG. 15E may comprise the multi-compartment neuron 1588 configured to receive input 1584. The neuron 1588 may comprise a pair of units 1582 connected via an internal synapse 1586. The Information related to the state of the unit 1582 may be communicated to the unit 1588 via the connection 1586. The state of the neuron 1588 may be adjusted based on the state information of the unit 1582. When unit 1588 excitability reaches a super-threshold condition, the neuron 1588 may generate a response 1590.

As illustrated in FIG. 20C, incoming spikes may be classified into, e.g., spikes that may cause plasticity rule execution; and/or spikes that may trigger unit event (e.g., spike generation).

Figure 15E:
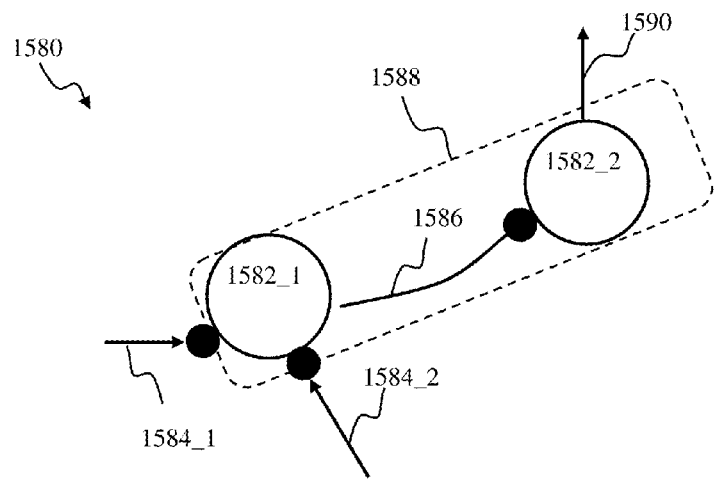
FIG. 15E is a graphical illustration depicting use of spikes with payload for effectuating a multi-compartment neuron, in accordance with one or more implementations.

Operation of the network 1580 of FIG. 15E in accordance with the listing of FIG. 20C may be as follows:
 (i) a multi-compartment unit 1588 may comprise two units 1582 connected via synapse 1586;
 (ii) unit 1582_1 may receive inputs via connections 1584_1 and 1584_2;
 (iii) unit 1582_1 may be configured to generate an event (spike) responsive to one (or both) inputs 1584;
 (iv) incoming (1584) and/or outgoing (1586) synapses may be configured to based on the event generated by the unit 1582_1;
 (v) the unit 1582_1 may configure payload information for transmission via the "Payload Synapse" 1586; in some implementations, the payload information may be configured to inform the post-synaptic unit 1582_2 that the pre-synaptic unit 1582_1 has spiked because of input via 1584_1;
 (vi) the "Payload Synapse" 1586 may carry the payload information from the unit 1582_1 to the unit 1582_2;
 (vii) responsive to the receipt of the payload information (e.g., the pre-synaptic unit 1582_1 has spiked because of input via 1584_1), the post-synaptic unit 1582_2 may generate an event; in some realizations, the event may comprise a spike delivered via the connection 1590.

In one or more implementations, the input 1582_2 may be referred to as a teaching input (implementing, e.g., functionality of a climbing fiber in biological neuron networks); and the input 1582_1 may be referred to as the context or sensory input capable of causing the post-synaptic response. Operation of the network 1580 of FIG. 15E in accordance with the listing of FIG. 20C may be summarized as follows: the teaching input may generate an event in unit 1582_1; the fan-in (1584) and/or fan-out (1586) synapses may be configured to use the event to trigger their respective update rules; the response generated by the unit 1581_1 based on the teaching input may not be 'visible' outside the composite unit 1588.

Payload mechanism may be utilized in order to store information about an input spike within the unit. In one or more implementations such as illustrated in the listing of FIG. 20D, the spike may correspond to most recent spike and the information may comprise timing (e.g., time of receipt) of that spike (pre-unit.last_spike in FIG. 20D). Responsive to a request to access this information during, for example, execution of a synaptic update, the information (e.g., time of receipt) may be provided to the synapse via spike payload. Such configuration may reduce memory size that may be associated with synapse construction thereby improving network computational efficiency, reducing size and/or cost of a neuromorphic apparatus that may be associated with operating the network.

Payload mechanism of the present disclosure may be employed for implementing event rules in the network. In some implementations, a parameter associated with the pre-synaptic unit (e.g., the unit 1582_1 in FIG. 15E) may be utilized, for example, by the post-synaptic unit 1582_2 when triggering an event rule (e.g., plasticity rule for the connection 1586 between the pre-synaptic and the post-synaptic neuron).

Figure 16A:
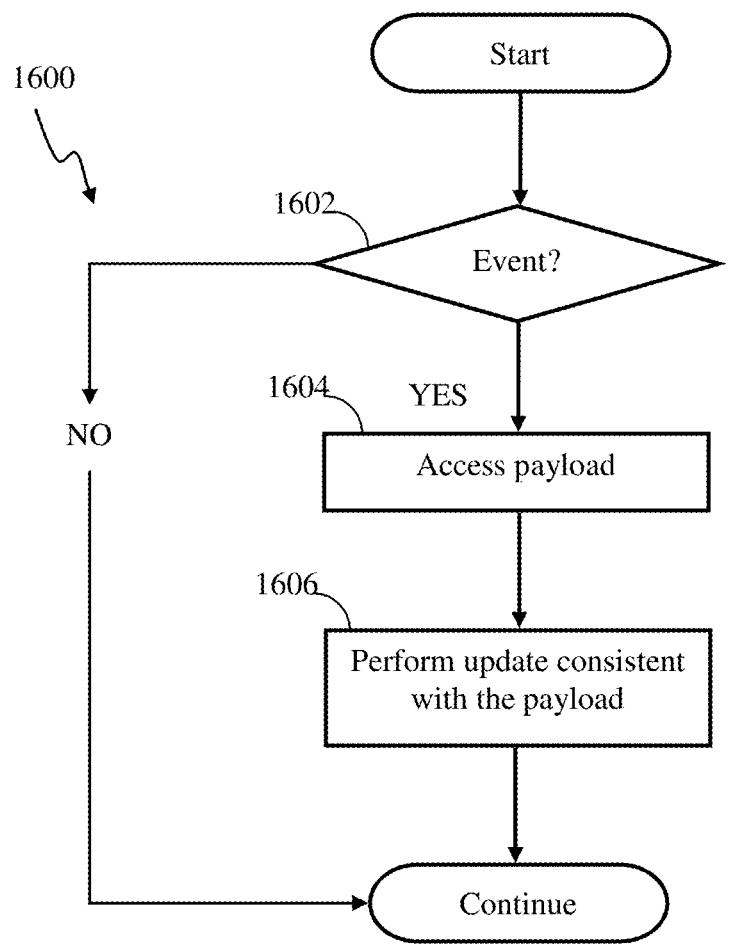
FIG. 16A is a logical flow diagram illustrating use of spike payload for network updates, in accordance with one or more implementations.
Figure 16B:
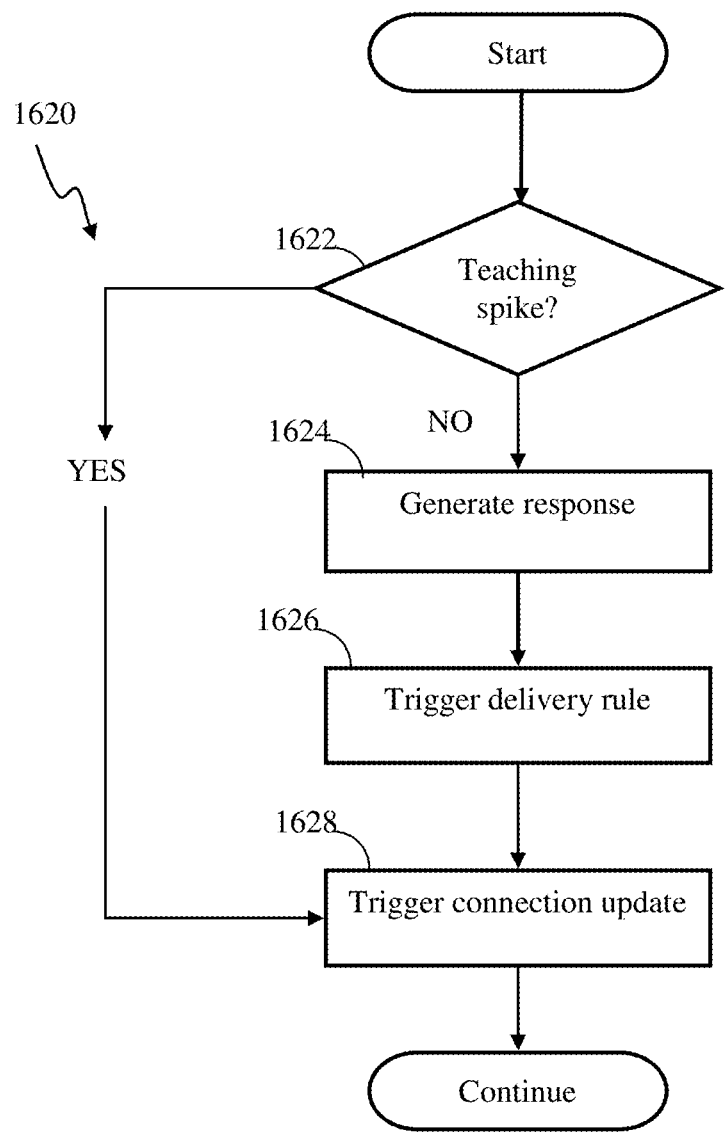
FIG. 16B is a logical flow diagram illustrating network update configured based on spike type for use with neural network of FIG. 14, in accordance with one or more implementations.
Figure 16C:
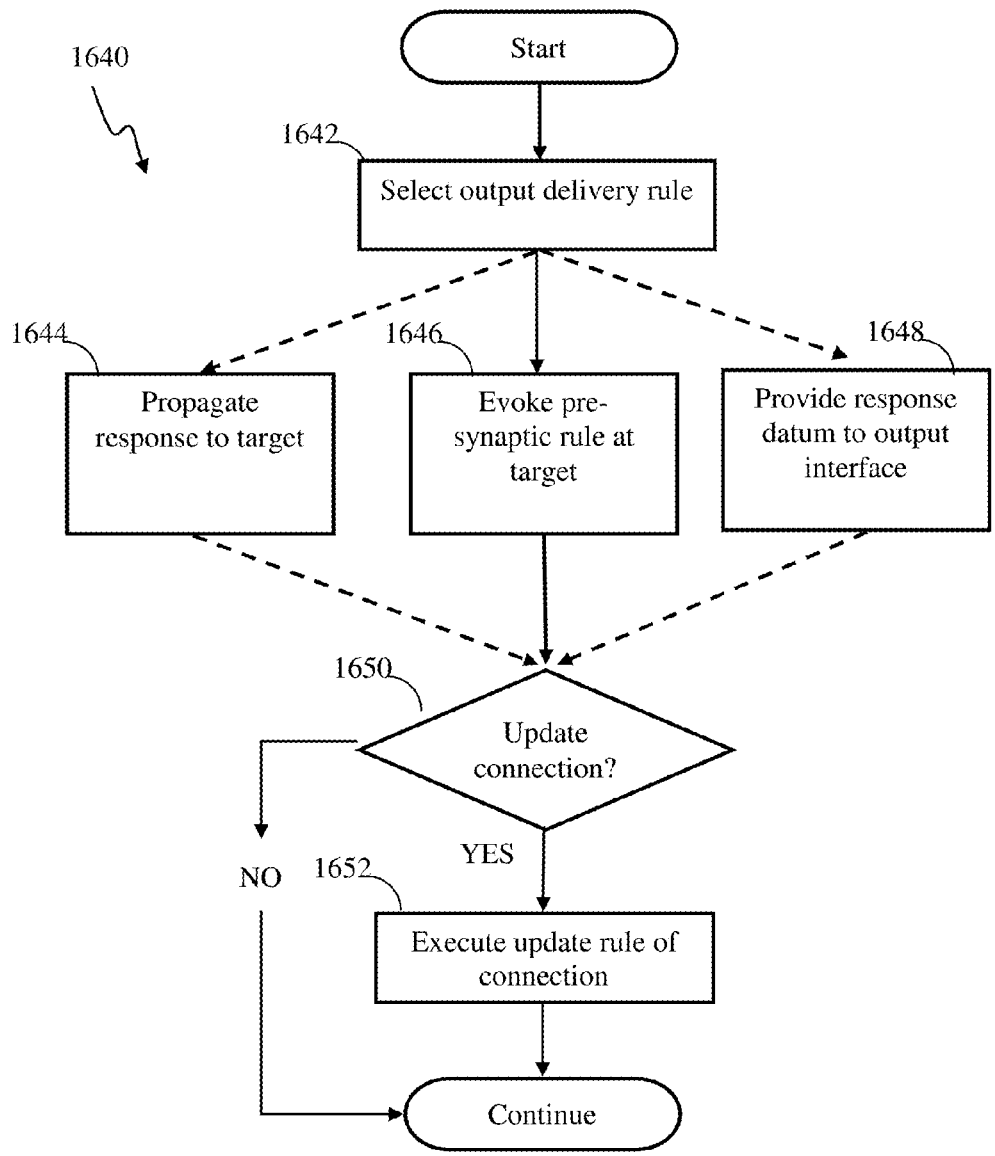
FIG. 16C is a logical flow diagram illustrating efficient update of synaptic weights, for use with neural network of FIG. 14, in accordance with one or more implementations.
Figure 17:
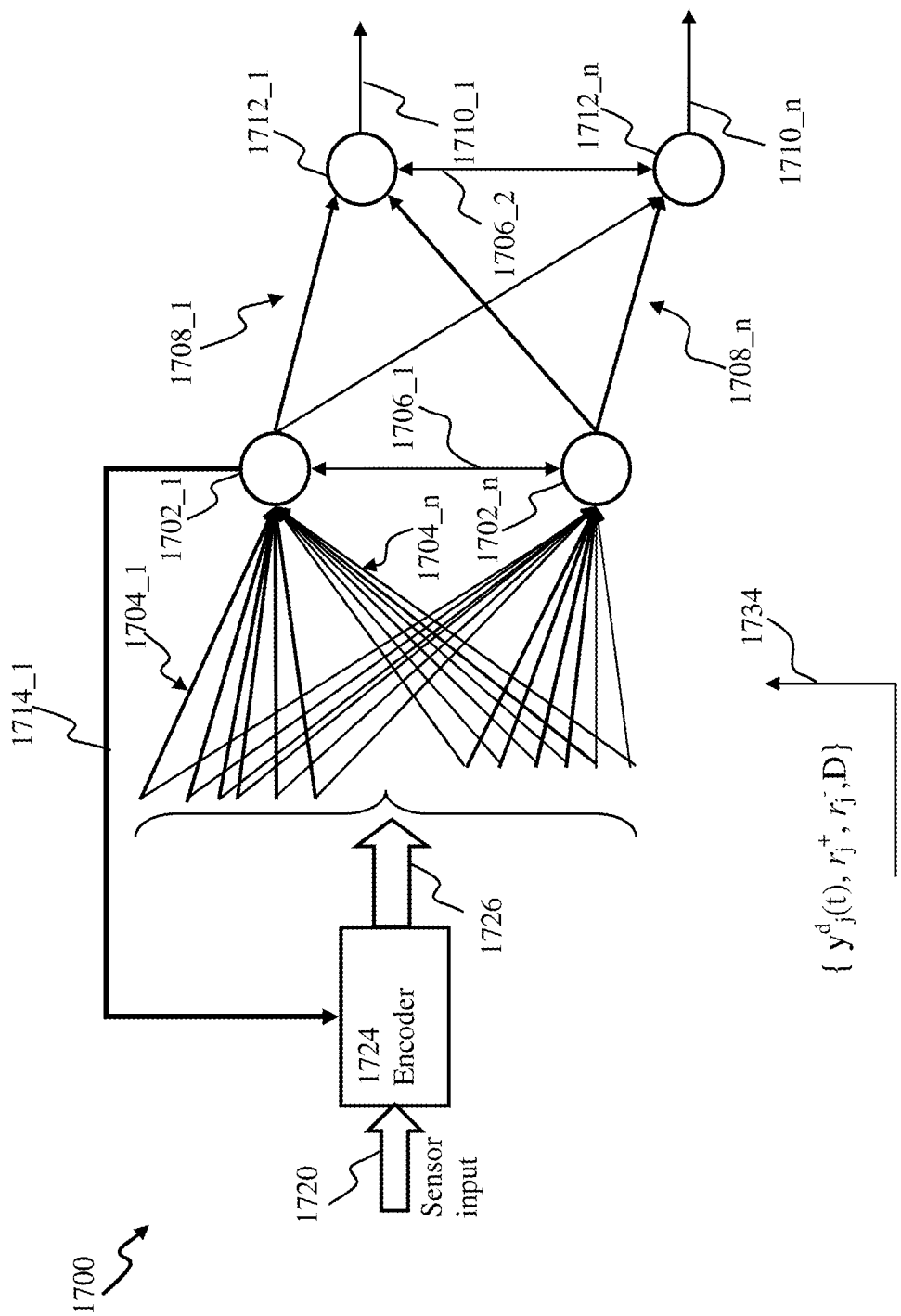
FIG. 17 is a block diagram illustrating sensory processing apparatus configured to implement event driven update mechanism in a spiking network, in accordance with one or more implementations.

FIGS. 16A-16C illustrate exemplary methods of using spikes with payload for communicating data in spiking neuron networks. In one or more implementations, the operations of methods 1600, 1620, 1640 of FIGS. 16A-16C, respectively, may be effectuated by a processing apparatus comprising a spiking neuron network such as, for example, the apparatus 1700 of FIG. 17, described in detail below.

FIG. 16A illustrates a method of using spike with payload for network updates, in accordance with one or more implementations.

At operation 1602 a determination may be made as to whether an event has occurred. In some implementations, the event may be based on one or more inputs into a neuron (e.g., inputs 1402, 1408 in FIG. 14). In one or more implementations, the event may be based on a response being generated by the neuron (e.g., the output 1414 in FIG. 14). In some implementations, the event may be based on a timer event configured to effectuate cyclic network updates as prescribed and/or dynamically configured intervals.

At operation 1604, a payload of a spiking input may be accessed. In some implementations, the input may comprise sensory input, e.g., the input 1504 described above with respect to FIG. 15A. In some implementations, the input may comprise teaching signal, e.g., the input 1528 described above with respect to FIG. 15B. In one or more implementations, the payload may be characterized by payload type.

At operation 1604, a network update may be performed in accordance with the payload. In some implementations, the update may comprise spike generation by the neuron (e.g., as illustrated and described with respect to FIG. 15A, above); efficacy update of input connections based on a teaching signal (e.g., as illustrated and described with respect to FIG. 15B, above); delivery rule modification (e.g., as illustrated and described with respect to FIG. 15C, above); post-synaptic rule modification (e.g., as illustrated and described with respect to FIG. 15D, above); and/or other operations.

FIG. 16B illustrates a method of network update configured based on spike type for use with neural network of FIG. 14, in accordance with one or more implementations.

Based on an event (e.g., the event of operation 1602 of FIG. 16A) a determination may be made at operation 1622 whether the event is based on a teaching spike (e.g., spike delivered via the connection 1408 and/or spike type described with respect to FIG. 15B, above).

When it is determined at operation 1622 that the spike comprises a teaching input, the method may proceed to step 1628, where a connection update may be triggered. In some implementations, the update of step 1628 may be configured to adjust efficacy of one or more connections providing input into a neuron (e.g., the connections, 1524 of FIG. 15B). In some implementations, the update may be effectuated by the update rule associated with the connection entity of the network, the neuron connection update rule, and/or a stand-alone connection update engine of the network.

When it is determined at operation 1622 that the spike does not comprise the teaching input, the method may proceed to step 1624 where neuron state (e.g., excitability) may be updated in accordance with the sensory input. Based on the updated neuron state, a response may be generated by the neuron at operation 1624.

At operation 1626 a response delivery rule may be triggered. In one or more implementations, the response delivery may comprise a provision of the one or more response spikes to a target destination (e.g., a neuron). In some implementations, the response delivery may comprise application of plasticity rule to the output connection (e.g., 1510 in FIG. 15A).

FIG. 16C illustrates one exemplary implementation of an external event rule. The external event rule may be used with method 1600 of FIG. 16A described above, according to some implementations. Operations of method 1640 may be effectuated based on an event (e.g., a spike) associated with a pre-synaptic unit.

At step 1642 of method 1640, an output delivery rule may be selected for one or more targets (e.g., the neurons 1420_1, 1420_2, 1420_3 in FIG. 14). In one or more implementations, network (e.g., the network 1400 of FIG. 14) may support one or more different output (e.g., spike delivery) rules.

In one or more implementations, the target selection may be effectuated via the HLND framework at the compile time.

In some implementations, the response delivery rule may comprise propagating neuron post-synaptic response to the appropriate target, as illustrated by the rule of step 1644 of method 1640. In one or more implementations, the post-synaptic response propagation may comprise applying an output signal to the target. By way of non-limiting example, this may include applying a drive current to a motor, or applying a control signal (e.g., pulse-width modulated voltage) to a motor controller.

In some implementations, the response delivery rule may comprise posting weight adjustment that may be based on the timing between input spikes delivered by the connection (tin) and timing of output responses (output spiked) tout generated by the neuron (i.e., STDP rule), as illustrated by the weight adjustment at step 1628 of method 1620.

In some implementations, the response delivery rule may comprise posting weight adjustment that may be based on the timing between input spikes delivered by the connection (tin), timing of output responses (output spiked) tout generated by the neuron (i.e., STDP rule), and timing of the trigger associated with the dendritic event, as illustrated by the weight adjustment at step 1628 of method 1620. In one or more implementations, the dendritic event trigger may comprise an external signal (e.g., reinforcement spike) delivered to the neuron 1420 via the connection 1408 in FIG. 14. In some implementations, the plasticity of step 1628 may be effectuated using methodology of Eqn. 2.

In some implementations (not shown), the connection plasticity rule may comprise connection delay, and/or transmission probability adjustment.

Advantageously, exemplary implementations of the present innovation may be useful in a variety of devices including without limitation prosthetic devices, autonomous and robotic apparatus, and other electromechanical devices requiring sensory processing functionality. Examples of such robotic devises include one or more of manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), and/or other robotic devices.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data Implementations of the principles of the disclosure may be applicable to a wide assortment of applications including computer human interaction (e.g., recognition of gestures, voice, posture, face, and/or other applications), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, the disclosure can be used to simplify tasks related to motion estimation, such as where an image sequence may be processed to produce an estimate of the object position (and hence velocity) either at individual points in the image or in the 3D scene, or even of the camera that produces the images. Examples of such tasks may be: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In some implementations, portions of the object recognition system may be embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the disclosure may be described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed:

1. A computerized neuron apparatus, comprising:
    at least one processor configured to execute computer program modules, the computer program modules being configured to effectuate a neural network, the neural network comprising:
        a first unit comprising a first unit memory;
        a second unit comprising a second unit memory, the second unit being updated according to a first update rule; and
        a connection operably coupling the first unit with the second unit, the connection comprising a connection memory, the connection updated according to a second update rule and communicating a neural activity payload comprising at least one bit of a parameter for the first update rule, the at least one bit stored in the first unit memory, and the neural activity payload being communicated to the second unit responsive to an event associated with the first unit.

2. The apparatus of claim 1, wherein:
    the second unit memory is updated in accordance with the first update rule;
    the first unit generates an output comprising a plurality of neural activities, each neural activity being characterized by one of a plurality of neural activity types; and
    communication of an individual spike from the first unit to the second unit comprises communication of the at least one bit, the parameter comprising information related to one of the plurality of neural activity types.

3. The apparatus of claim 2, wherein each neural activity is characterized by an area configured to encode the at least one bit.

4. The apparatus of claim 2, wherein the plurality of neural activities comprises:
    a first neural activity type configured to cause a response generation by the second unit and execution of the connection memory update in accordance with the second update rule; and
    a second neural activity type configured to cause execution of the connection memory update in accordance with the second update rule, the connection memory update being characterized by an absence of the response.

5. The apparatus of claim 1, wherein:
    the connection is characterized by connection efficacy, the connection efficacy being adjusted in accordance with the second update rule and the at least one bit; and
    an adjustment of the connection efficacy advances a time of a response by the second unit generated based on the at least one bit.

6. The apparatus of claim 1, wherein:
    the connection is characterized by a connection efficacy, the connection efficacy being adjusted in accordance with the second update rule and the at least one bit; and
    an adjustment of the connection efficacy delays a time of a response by the second unit generated based on the at least one bit.

7. The apparatus of claim 1, wherein:
    the second update rule comprises a plurality of spike timing dependent plasticity (STDP) rules configured based on a time of the event, each one of the plurality of STDP rules being used independently from one another; and
    the parameter indicates a rule of the plurality of STDP rules for efficacy adjustment.

8. A method of operating a neural network comprising a first unit including a first unit memory, a second unit including a second unit memory, and a connection operably coupling the first unit with the second unit, the method comprising:
    communicating, via the connection, a neural activity payload comprising at least one bit of a parameter for an efficacy update, the at least one bit stored in the first unit memory, the neural activity payload communicated to the second unit responsive to an event associated with the first unit.

9. The method of claim 8, further comprising updating the second unit memory in accordance with the parameter.

10. An apparatus, comprising:
a first unit comprising a first unit memory;
a second unit comprising a second unit memory, the second unit updated according to a first update rule; and
at least one processor coupled to the first unit, the at least one processor configured to communicate, via a connection operably coupling the first unit with the second unit, a neural activity payload comprising at least one bit of a parameter for an efficacy update, the at least one bit stored in the first unit memory, and the neural activity payload being communicated to the second unit responsive to an event associated with the first unit.

11. An apparatus, comprising:
a first means for generating activity, the first means for generating activity comprising a first means for storing;
a second means for generating activity comprising a second means for storing, the second means for generating activity being updated according to a first update rule; and
means for communicating a neural activity payload comprising at least one bit of a parameter for an efficacy update, the at least one bit stored in the first means for storing, and the neural activity payload being communicated to the second means for generating activity responsive to an event associated with the first means for generating activity.

\* \* \* \* \*